US007422150B2

(12) United States Patent
Chung

(10) Patent No.: US 7,422,150 B2
(45) Date of Patent: Sep. 9, 2008

(54) ELECTRONIC VOTING APPARATUS, SYSTEM AND METHOD

(75) Inventor: Kevin Kwong-Tai Chung, Princeton, NJ (US)

(73) Assignee: Avante International Technology, Inc., Princeton Junction, NJ (US)

( * ) Notice: Subject to any disclaimer, the term of this patent is extended or adjusted under 35 U.S.C. 154(b) by 290 days.

(21) Appl. No.: 10/416,738

(22) PCT Filed: Nov. 1, 2001

(86) PCT No.: PCT/US01/45769

§ 371 (c)(1),
(2), (4) Date: May 13, 2003

(87) PCT Pub. No.: WO02/070998

PCT Pub. Date: Sep. 12, 2002

(65) Prior Publication Data

US 2004/0046021 A1 Mar. 11, 2004

Related U.S. Application Data

(60) Provisional application No. 60/252,012, filed on Nov. 20, 2000, provisional application No. 60/253,480, filed on Nov. 28, 2000, provisional application No. 60/253,778, filed on Nov. 29, 2000, provisional application No. 60/250,178, filed on Nov. 30, 2000, provisional application No. 60/251,920, filed on Dec. 7, 2000, provisional application No. 60/266,627, filed on Feb. 6, 2001, provisional application No. 60/272,567, filed on Mar. 1, 2001, provisional application No. 60/278,017, filed on Mar. 22, 2001, provisional application No. 60/278,527, filed on Mar. 24, 2001.

(51) Int. Cl.
*G06K 17/00* (2006.01)

(52) U.S. Cl. ....................... 235/386; 235/375; 235/381; 235/383; 235/385; 705/12

(58) Field of Classification Search ................. 235/386, 235/375, 381, 383, 385; 705/12
See application file for complete search history.

(56) References Cited

U.S. PATENT DOCUMENTS 3,163,758 A 12/1964 Treacy (Continued)

FOREIGN PATENT DOCUMENTS

EP 0199683 10/1986

(Continued)

OTHER PUBLICATIONS

A. Riera, J. Borrell, J. Rifa, "An uncoercible verifiable electronic voting protocol," Proceedings of IFIP SEC '98, Online, Sep. 4, 1998, pp. 206-215, XP002272039, Austria.

(Continued)

*Primary Examiner*—Michael G. Lee
*Assistant Examiner*—Allyson N Trail
(74) *Attorney, Agent, or Firm*—Clement A Berard, Esq.; Dann, Dorfman, Herrell & Skillman, PC

(57) ABSTRACT

The voting apparatus, system and method of the invention provides at least two independently means for recording and counting votes, e.g., one associated with the voting apparatus and one separate therefrom. A preferred voting apparatus, system and method may provide triple data redundancy in that each vote is recorded by three independent and verifiable means: i.e. by recording in one or more electronic memory devices included in the voting machine and/or system, by recording in the memory of a smart card separate from the voting machine and/or system, and/or by a confirmatory printed record for each voter. The invention may utilize a voting session identifier to provide transparency of the vote and to maintain the anonymity of the votes and voters.

31 Claims, 15 Drawing Sheets

U.S. PATENT DOCUMENTS

| | | | | |
|---|---|---|---|---|
| 3,648,022 | A | 3/1972 | Cook | |
| 3,653,587 | A | 4/1972 | Hammond et al. | |
| 3,710,105 | A | 1/1973 | Oxendine, Jr. et al. | |
| 3,722,793 | A | 3/1973 | Aronoff | |
| 3,739,151 | A | 6/1973 | Moldovan, Jr. et al. | |
| 3,790,072 | A | 2/1974 | Moldovan, Jr. | |
| 3,941,976 | A | 3/1976 | Huhn | |
| 3,944,788 | A | 3/1976 | Comisar et al. | |
| 3,977,357 | A | 8/1976 | O'Neal et al. | |
| 4,010,353 | A | 3/1977 | Moldovan, Jr. et al. | |
| 4,015,106 | A | 3/1977 | De Phillipo | |
| 4,021,780 | A | 5/1977 | Narey et al. | |
| 4,101,784 | A | 7/1978 | Key et al. | |
| 4,153,895 | A | 5/1979 | Weisbrod et al. | |
| 4,300,123 | A | 11/1981 | McMillen et al. | |
| 4,357,596 | A | 11/1982 | Feilchenfeld | |
| 4,373,134 | A | 2/1983 | Grace et al. | |
| 4,459,021 | A | 7/1984 | Blazek | |
| 4,479,194 | A | 10/1984 | Fogg et al. | |
| 4,641,240 | A | 2/1987 | Boram | |
| 4,649,264 | A | 3/1987 | Carson | |
| 4,760,247 | A | 7/1988 | Keane et al. | |
| 4,774,665 | A | 9/1988 | Webb | |
| 4,807,908 | A | 2/1989 | Gerbel | |
| 4,813,708 | A | 3/1989 | Narey | |
| 5,038,392 | A | 8/1991 | Morris et al. | |
| 5,073,700 | A | 12/1991 | D'Onofrio | |
| 5,126,731 | A | 6/1992 | Cromers, Jr. | |
| 5,164,601 | A | 11/1992 | Nordstrom | |
| 5,189,288 | A | 2/1993 | Anno et al. | |
| 5,191,525 | A | 3/1993 | LeBrun et al. | |
| 5,213,373 | A | 5/1993 | Ramos | |
| 5,218,528 | A | 6/1993 | Wise et al. | |
| 5,247,166 | A | 9/1993 | Cannon et al. | |
| 5,248,872 | A | 9/1993 | Stewart | |
| 5,278,753 | A | 1/1994 | Graft, III | |
| 5,365,026 | A | 11/1994 | Cromers, Jr. et al. | |
| 5,377,099 | A | 12/1994 | Miyagawa | |
| 5,400,248 | A * | 3/1995 | Chisholm .................... | 705/12 |
| 5,474,295 | A | 12/1995 | Demshuk | |
| 5,495,532 | A | 2/1996 | Kilian et al. | |
| 5,497,318 | A | 3/1996 | Miyagawa et al. | |
| 5,548,326 | A | 8/1996 | Michael | |
| 5,572,601 | A | 11/1996 | Bloomberg | |
| 5,583,329 | A * | 12/1996 | Davis et al. ............... | 235/50 A |
| 5,585,612 | A | 12/1996 | Harp, Jr. | |
| 5,610,383 | A | 3/1997 | Chumbley | |
| 5,612,870 | A | 3/1997 | Welner | |
| 5,612,871 | A | 3/1997 | Skogmo | |
| 5,640,200 | A | 6/1997 | Michael | |
| 5,710,420 | A | 1/1998 | Martin et al. | |
| 5,719,386 | A | 2/1998 | Hsieh et al. | |
| 5,732,222 | A | 3/1998 | Miyagawa et al. | |
| 5,758,325 | A | 5/1998 | Lohry et al. | |
| 5,821,508 | A | 10/1998 | Willard | |
| 5,875,432 | A | 2/1999 | Sehr | |
| 5,878,399 | A | 3/1999 | Peralto | |
| 5,978,466 | A | 11/1999 | Quattrocchi | |
| 6,014,438 | A | 1/2000 | Quattrocchi | |
| 6,081,793 | A | 6/2000 | Challener et al. | |
| 6,092,051 | A | 7/2000 | Kilian et al. | |
| 6,250,548 | B1 | 6/2001 | McClure et al. | |
| 6,412,692 | B1 | 7/2002 | Miyagawa | |
| 6,457,643 | B1 | 10/2002 | Way | |
| 6,505,778 | B1 | 1/2003 | Reddersen et al. | |
| 6,540,138 | B2 | 4/2003 | Hall et al. | |
| 6,550,675 | B2 | 4/2003 | Davis et al. | |
| 6,581,824 | B1 | 6/2003 | McClure et al. | |
| 6,607,126 | B2 | 8/2003 | Altini et al. | |
| 6,607,137 | B2 | 8/2003 | Morales | |
| 6,641,033 | B2 | 11/2003 | McClure et al. | |
| 6,662,998 | B2 | 12/2003 | McClure et al. | |
| 6,688,517 | B1 | 2/2004 | McClure et al. | |
| 6,726,090 | B1 | 4/2004 | Kargel | |
| 6,739,508 | B2 | 5/2004 | Ushioda et al. | |
| 6,741,738 | B2 | 5/2004 | Taylor | |
| 6,769,613 | B2 | 8/2004 | McDermott | |
| 6,799,723 | B2 | 10/2004 | Kotob et al. | |
| 6,817,515 | B2 | 11/2004 | Winnett | |
| 6,854,644 | B1 | 2/2005 | Bolton et al. | |
| 6,865,543 | B2 | 3/2005 | Gibbs, Sr. | |
| 6,942,142 | B2 | 9/2005 | Barmettler et al. | |
| 6,968,999 | B2 | 11/2005 | Reardon | |
| 7,032,821 | B2 | 4/2006 | McClure et al. | |
| 7,080,779 | B2 | 7/2006 | Cummings | |
| 7,100,828 | B2 | 9/2006 | Cummings | |
| 7,111,782 | B2 | 9/2006 | Homewood et al. | |
| 7,117,356 | B2 | 10/2006 | La Cous | |
| 7,128,263 | B1 | 10/2006 | Nguyen et al. | |
| 7,152,045 | B2 | 12/2006 | Hoffman | |
| 7,152,792 | B2 | 12/2006 | Gaston | |
| 7,178,730 | B1 | 2/2007 | Jamison et al. | |
| 7,222,787 | B2 | 5/2007 | Cummings | |
| 7,231,082 | B2 | 6/2007 | Lenoir | |
| 7,243,846 | B2 | 7/2007 | Reardon | |
| 2001/0013547 | A1 | 8/2001 | Kotob et al. | |
| 2001/0035455 | A1 | 11/2001 | Davis et al. | |
| 2002/0029163 | A1 | 3/2002 | Joao | |
| 2002/0072961 | A1 | 6/2002 | McDermott et al. | |
| 2002/0074399 | A1 | 6/2002 | Hall et al. | |
| 2002/0078358 | A1 | 6/2002 | Neff et al. | |
| 2002/0084325 | A1 | 7/2002 | Reardon | |
| 2002/0091673 | A1 | 7/2002 | Seibel et al. | |
| 2002/0092908 | A1 | 7/2002 | Chumbley | |
| 2002/0161628 | A1 | 10/2002 | Poor, Jr. et al. | |
| 2002/0175514 | A1 | 11/2002 | Warther | |
| 2002/0194060 | A1 | 12/2002 | Chemomorov | |
| 2003/0042731 | A1 | 3/2003 | Li | |
| 2003/0066872 | A1 | 4/2003 | McClure et al. | |
| 2004/0016803 | A1 | 1/2004 | Cummings | |
| 2004/0060983 | A1 | 4/2004 | Davis et al. | |
| 2004/0169077 | A1 | 9/2004 | Petersen et al. | |
| 2004/0195323 | A1 | 10/2004 | Vadura et al. | |
| 2004/0217168 | A1 | 11/2004 | Cummings | |
| 2005/0161507 | A1 | 7/2005 | Openshaw, II et al. | |
| 2005/0211778 | A1 | 9/2005 | Biddulph | |
| 2006/0000906 | A1 | 1/2006 | Reardon | |

FOREIGN PATENT DOCUMENTS

| | | |
|---|---|---|
| EP | 0 419 335 A1 | 3/1991 |
| EP | 0556853 | 8/1993 |
| FR | 2 739 474 A1 | 4/1997 |
| IT | 1234224 | 5/1992 |
| JP | 7-57014 | 3/1995 |
| JP | 9-160988 | 6/1997 |
| WO | 96/02044 | 1/1996 |
| WO | WO99/52058 | 10/1999 |
| WO | 00/79469 | 12/2000 |

OTHER PUBLICATIONS

Benaloh J et al, "Receipt-Free Secret-Ballot Elections (Extended Abstract)," Proceedings of the Annual ACM Symposium on the Theory of Computing, XX, XX, 1994, pp. 544-553, XP002099996.

Jinn-Ke Jan et al, "A Secure Electronic Voting Protocol With IC Cards," Security Technology, 1995. Proceedings, Institute of Electrical and Electronics Engineers 29th Annual 1995 International Carnahan Conference on Sanderstead, UK Oct. 18-20, 1995, New York, NY USA, Oct. 18, 1995, pp. 259-265, XP010196424.

esp@cenet—Document Bibliography and Abstract, "Voting Method And Means For Carrying Out This Method," Patent No. EP0419335, Publication Date: Mar. 27, 1991, Applicant: PGS SARL, Printed Apr. 29, 2004, 1 Page.

esp@cenet—Document Bibliography and Abstract, "No Engligh Title Available," Patent No. FR2739474, Publication Date: Apr. 4, 1997, Printed Apr. 29, 2004, 1 Page.
English Language-Abstracts, For FR 2739474 A1 (WPI ACC No. 1997-238623/199722) and for EP 419335 A (WPI ACC No. 1991-088914/199113), <http://www.dialogclassic.com/COMMAND.HTML>, Printed Apr. 29, 2004, 1 Page.
Scientific Translation Services, FR 2739474, English Translation of pp. 5-6, and figures (Translated May 2004), 9 Pages.
Scientific Translation Services, "*Novel Voting Process and Means For Carrying Out Same*," [EPO 0 419 335 A1] English Translation of coloum 1-10, (Translated May 2004), 8 pages.
European Patent Office, "*Communication and Supplementary European Search Report*," EP No. 0127 3930.6-2221-US0145769, Mar. 24, 2004, 5 Pages.
Surveys International, TouchVote, ACEEEO Conference, "Information Technology in Elections", Warsaw, Poland, 2 Pages Jun. 14-16, 2000.
UniLedt Corporation, The Patriot Voting System,http://www.unilect.com/patrpak.html, 4 Pages, 1996.
Hart Interactive eSlate Electronic Voting System, http://www.worldwideelection.com/GoveSlate.cfm, 2 Pages 1998-2000.
VoteHere.net, http://votehere.net/VH-Content-v2.0/platinuminfo.html, 1 Page 1999-2000.
Webvote Inc., Laptop Software for the New Generation of Voting, http://www.webvote-inc.com/laptop.htm, 2 Pages, 1999.
Federal Election Commission, "Performance And Test Standards For Punchcard, Marksense, And Direct Recording Electronic Voting Systems", Jan. 1990, pp. (including 1-xvi, 12-19, 28-35, 45-55, C1-C3 and E1-E10.
Alan Dechert, "The Voter Certified Ballot", Granite Bay, CA., http://www.go2zero.com/votereform.html, Feb. 13, 2001, 15 Pages.
Mike McLaughlin, "Voting Receipt", http://catles.ncl.ac.uk/Risks/2.22.html, 1986, 1 page.
Robert Wright, "Recasting The Voting Process",www.varbusiness.com, Mar. 5, 2001, 4 Pages.
Rebecca Mercuri, "A Better Ballot Box?", IEEE Spectrum, Oct. 2002, pp. 46-50.
Mike He, Rogerio Almeida and Edson Gissoni, "National Semiconductor and Unisys Equip Brazil with New Voting Machines for Fast and Accurate Election Results in the Fall," National Semiconductor, http://www.national.com/news/item/0,735,757,00.html, May 6, 2002, 3 Pages.
Holli Riebeek, "Brazil Holds All-Electronic National Election," Oct. 15, 2002, 1 Page.
Peter G. Neumann, "Internet and Electronic Voting," The Risk Digest, vol. 21, Issue 14, http://www.notablesoftware.com/Papers/Risks2114.html, Dec. 12, 2000, 3 Pages.
Peter G. Neumann, "Security Criteria for Electronic Voting," http://www.csl.sri.com/users/neumann/ncs93.html, c 1993, 7 Pages.
Michael Stanton, "The Importance of Recounting Votes," http://www.notablesoftware.com/Press/electronic_voting_in_brasil.htm, Nov. 13, 2000, 3 Pages.
Bruce Schneier, "Voting and Technology", Crypto-Gram, http://www.notablesoftware.com/Press/Schneier.html, Dec. 15, 2000, 3 Pages.
Rebecca Mercuri, "Electronic Voting," http://www.notablesoftware.com/evote.html, Oct. 15, 2001, 8 Pages.
CALTECH-MIT, "Voting What Is What Could Be," Jul. 2001, 95 pages.
International Search Report, PCT/US-1/45769, Jan. 6, 2003, 4 Pages.
Faulkner & Gray, "1998 Advanced Card Technology Sourcebook," 1997, ISBN 1-57987-009-0, pp. 146-154.
E-mail message from: R. Mercuri [notable @ mindspring.com] To: Clement Berard; plesko @ simmonscooper.com, Avante Patent 7036730 and infringment suit Jul. 13, 2006, 4 pgs.
Rebecca Mercuri, "Electronic Voting",http:// web.archive.org/web/20010201193800/http://www.notablesoftware.com/; updated Jan. 28, 2001; 11 pages.
Bruce Schneier, Crypto-Gram Newsletter, Dec. 15, 2000, http://www.counterpane.com; 17 pages.
Rebecca Mercuri, Explanation of Voter-Verified Ballot Systems, The Risks Digest, ACM Comm. on Computers & Public Policy, vol. 22: 17, Jul. 24, 2002, 15:54:47-0400, 2 pages.
Yahoo Finance, Press Release, Inventor of Electronic Voting Verification System Takes Industry Giants to Court for Patent Infringement; Wed. Jul. 12, 2006 11:19 am, 2 pages.
Rebecca Mercuri, "Why Computers Shouldn't Count Votes", Princetion ACM/IEEE Computer Society Chapters, Nov. 2000 Joint Meeting, Thurs. Nov. 16, 2000, 8:00 pm, 2 pages.
Douglas Dixon, Technology & The Polls: Rebecca Mercuri, Nov. 15, 2000 U.S. 1 Newspaper, Princetion1info.com, http://notablesoftware.com/Press/dixon.html, 7 pages.
R. Mercuri, The FEC Proposed Voting Systems Standard Update, A Detailed Comment, Submitted to Fed. Election Commission, Sep. 10, 2001, FEC Not 2001-9, vol. 66, No. 132, 8 pages.
Terri Gauchat, [Abstract] Computer Assisted Vote Tallying, An Overview of the Problems, Implications, and Solutions, Univ. of Waterloo, Term Res Project, Apr. 11, 1991, 14 pages.
Ltr. to Paul Lesko, Esq. Jun. 28, 2006, Re: U.S. Appl. No. 10/255,348, "Electronic Voting Apparatus, System and Method", From Nancy L. Reeves, Walker & Jocke, 5 pages.
Cheung, Document submitted to Patent Office, Archive Date Jul. 11, 2000, ACCUVote-TS, http://web.archive.org/web/20000711160152/www.globalelection.com., 5 pages.
AccuVote TS reference, Archive Date Oct. 12, 1999, http://web.archive.org/web/19991012074217/www.gesn.com/Product . . . , 3 pages.
Roy G. Saltman, Accuracy, Integrity, and Security in Computerized Vote-Tallying Computer Science & Technology, NBS Special Pub. 500-158, Aug. 1998, 109 pages.
Michael Ian Shamos, CFP'93-Electronic Voting- Evaluating the Threat, Mar. 1993, CPSR, http://web.archive.org/web20011224071421/www.cpsr.org/conference.. , 9 pages.
Description of AccuVote OS, Archived Oct. 12, 1999, "The AccuVote" http://web.archive.org/web/19991012093810/www.gesn.com/Product. 3 pages.
Description of GEMS, Archived Nov. 9, 1999, http://web.archive.org/web/19991109003219/www.gesn.com/Product.. 4 pages.
Excerpts from current AccuVote TSX Pollworkers Guide, AccuVote-TSX Pollworker's Guide, Diebold Election Systems, Revision 5.0, Mar. 22, 2005, 3 pages.
Monterey County Election Dept., Early voting Information, http://www.mocovote.org/toughscreen/index.htm, dated prior to Nov. 7, 2000, 8 pages.
A. Riera, J. Borrell, J. Rifa, "An uncoercible verifiable electronic voting protocol," Proceedings of IFIP SEC '98, Online, Sep. 4, 1998, XP002272039, 10 Pages.
D. Dill, R. Mercuri, P. Neumann, D. Wallach, "Frequently Asked Questions about DRE Voting Systems", http://www.verifiedvoting.org/drefaq/asp, printed Aug. 24, 2004, 7 pages.
The Open Voting Consortium, "Frequently Asked Questions (FAQ)", © 2004 http://www.openvotingconsortium.org/faq.html, printed Aug. 24, 2004, 17 pages.
Verified Voting Foundation, "E-Voting Misconceptions", http://www.verifiedvoting.org/article.asp?id+2609, printed Aug. 24, 2004, 3 pages.
A. Dechert, "Statement at Utah State Capital", Jul. 13, 2004, http://www.openvotingconsortium.org/ad/alan-ut-7-13.html, printed Aug. 24, 2004, 2 pages.
M. Shamos, "Paper v. Electronic Voting Records—An Assessment", Apr. 2004, http://euro.ecom.cmu.edu/people/faculty/mshamos/paper.htm, printed Aug. 24, 2004, 20 pages.
A. Dechert, "OVC Response to Paper v. Electronic Voting Records—An Assessment, by Michael Ian Shamos", Jul. 30, 2004, http://gnosis.python-hosting.com/voting-project/July.2004/0240.html, printed Aug. 24, 2004, 6 pages.
K. Zetter, "California Bans E-Vote Machines", Apr. 30, 2004, http://www.wirednew.com/news/evote/0,2645,63298,00.html?tw=wn_story_page_prev2, printed Jun. 22, 2004, 3 pages.
Associated Press "Prototype E-Vote Printer Fails to Satisfy" © 2005, Feb. 3, 2005, 2 pages, http://start.earthlink.net/channel/news/print?guid=20050203/4201afd0_3ca6_15526200502 . . . .

R. Mercuri, "Computer Security Act and Computerized Voting Systems", Nov. 27, 1992, Risks Digest vol. 14: Issue 11, pp. 3-4.
Westinghouse DataScore Systems, "Optical Mark Reader Systems", no date marked; prior to Mar. 30, 2007; 13 pages.
Tallone, "Business Point of View: A Better Voting System", ca. 2004, 2 pages.
Election Systems & Software, "Integrated Hardware Solutions", © 2001 (on last sheet, but date "Oct. 6, 2004" on sheet AV-17423), 14 pages.
National Computer Systems, "Precept Image System", © 1991 or 1992, 10 pages.
*The Risks Digest*, vol. 21: Issue 23; Jan. 30, 2001; 12 pages.
*Defendants' Preliminary Claim Construction and Preliminary Identification of Extrinsic Evidence, Avante International Technology Corporation*, Plaintiff, v. *Diebold Election Systems*, et al, Defendants; United States Easter District of Missouri Eastern Division: Cause No. 4:06-cv-00978 TCM, Apr. 17, 2007, 3 pages.
*Defendants' Proposed Construction For 730 Patent, Avante International Technology Corporation*, Plaintiff, v. *Diebold Election Systems*, et al, Defendants; United States Easter District of Missouri Easter Division: Cause No. 4:06-cv-00978 TCM, Apr. 17, 2007, 3 pages.
*Defendants' Proposed Construction For '944 Patent, Avante International Technology Corporation*, Plaintiff, v. *Diebold Election Systems*, et al, Defendants; United States Easter District of Missouri Eastern Division: Cause No. 4:06-cv-00978 TCM, Apr. 17, 2007, 17 pages.
*Defendants' Proposed Construction For '313 Patent, Avante International Technology Corporation*, Plaintiff, v. *Diebold Election Systems*, et al, Defendants; United States Easter District of Missouri Eastern Division: Cause No. 4:06-cv-00978 TCM, Apr. 17, 2007, 6 pages.
*Joint Claim Construction and Prehearing Statement, Avante International Technology Corporation*, Plaintiff, v. *Diebold Election Systems*, et al, Defendants; United States Easter District of Missouri Eastern Division: Cause No. 4:06-cv-00978 TCM, Apr. 24, 2007, 63 pages.
*Defendants' Initial Claim Construction Brief, Avante International Technology Corporation*, Plaintiff, v. *Diebold Election Systems*, et al, Defendants; United States Easter District of Missouri Eastern Division: Cause No. 4:06-cv-00978 TCM, May 8, 2007, 245 pages.
"*Motion for Leave to File Amended Counterclaim" and "Amended Answer and Counterclaim of Diebold Election Systems", Avante International Technology Corporation*, Plaintiff, v. *Diebold Election Systems*, et al, Defendants; United States Easter District of Missouri Eastern Division: Cause No. 4:06-cv-00978 TCM, May 14, 2007, 40 pages.
"*Defendant Election Systems & Software, Inc's Motion for Leave to File First Amended Answer to Plaintiff's Third Amended Complaint and Memorandum of Law in Support of Motion," and "First Amended Answer of Election Systems & Software, Inc. To Plaintiff's Third Amended Complaint and Amended Counterclaim of Election Systems & Software, Inc.", Avante International Technology Corporation*, Plaintiff, v. *Diebold Election Systems*, et al, Defendants; United States Easter District of Missouri Eastern Division: Cause No. 4:06-cv-00978 TCM, May 14, 2007, 30 pg.
"*Defendant Sequoia Voting Systems' Motion for Leave to Amend Its Answer, Affirmative Defenses and Counterclaims to State Additional Facts Supporting Its Counterclaim For Inequitable Conduct" and "Amended Answer, Affirmative Defenses and Couterclaims of Sequoia Voting Systems", Avante International Technology Corporation*, Plaintiff, v. *Diebold Election Systems*, et al, Defendants; United States Easter District of Missouri Easter Division: Cause No. 4:06-cv-00978 TCM, May 14, 2007, 35 pages.
*Defendants' Response to Plaintiff Avante's Claim Construction Brief, Avante International Technology Corporation*, Plaintiff, v. *Diebold Election Systems*, et al, Defendants; United States Easter District of Missouri Eastern Division: Cause No. 4:06-cv-00978 TCM, May 21, 2007, 64 pg.
Global Election Systems, Inc., "AccuVote-TS", http://www.archive.org/web/20000830141622/http:/www.gesn.com/AccuVote-TS/accuvot . . . , Web Archive date Aug. 30, 2004, 4 pages.
VoteHere, Inc., "November Election in Arizona and California will be first-ever cooperative trial of online voting", "VoteHere Platinum" and "Votehere Gold", http://web.archive.org/web/20001019071003/votehere.net/VH-Content-v2.0/default.htm, Web Archive date Oct. 19, 2000, 5 pages.
Diebold Election Systems, "Election Solutions Diebold Election Systems Solutions", "Election Solutions AccuVote-TS", "Election Solutions AccuVote-OS", and "Election Solutions Global Election Management Systems—GEMS", http://web.archive.org/web/20020811050628/www.diebold.com/solutions/elections/solutio . . . , Web Archive date Oct. 3, 2002, 10 pages.
Peripheral Dynamics, Inc., "Pagescan II", no date marked; prior to Mar. 29, 2007; 2 pages.
Avante International Technology, Inc., "Optical Vote-Trakker: A "Mark-Sense" Absentee & Precinct-Based Voting System that Minimizes Both Voter and System Errors", Jan. 2004, 7pg.
European Patent Office, "Communication Pursuant to Article 96(2) EPC", Application No. 01273930.6, Aug. 5, 2004, 10 pages.
European Patent Office, "Communication Pursuant to Article 96(2) EPC", Application No. 01273930.6, Jan. 20, 2005, 10 pages.
European Patent Office, Communication, Application No. 01273930.6, Oct. 15, 2004, 8 pages.
D. Dixon, "Technology & the Polls: Rebecca Mercuri", Nov. 15, 2000, 8 pages.
U.S. Appl. No. 60/458,961, filed Apr. 1, 2003, entitled "An Improved Voting Machine" by Homewood et al., 23 pages.
Internet Archive Wayback Machine, VoteHere.net, The Secure Internet Voting Company, http://web.archive.org/web/*/http"//votehere, allegedly Oct. 19, 2000, printed May 8, 2007 pp. HL00068-HL00092.
Avante International Technology, Inc., "Optical Vote-Trakker™ : A "Mark-Sense" Absentee & Precinct Based Voting System that Minimizes Both Voter and System Errors", link available at http://www.vote-trakker.com/optical.html, Jan. 2004, 10 pages.
Avante International Technology, Inc., "Avante Optical Vote-Trakker™", © 2001-2004, printed Jun. 11, 2007, 2 pages.
Avante International Technology, Inc., "Avante Vote-Trakker™"and "Avante Vote-Trakker™ Overview", Mar. 16, 2004, printed Jun. 11, 2007, 6 pages.
Avante International Technology, Inc., "Avante Vote-Trakker™ EVC308-SPR" and "Avante Vote-Trakker™ EVC308-SPR-FF", © 2001-2004, printed Jun. 11, 2007, 6 pages.
Avante International Technology, Inc., "Accessible Voting Integrating the Touch-Screen Accessibility of DRE System with the Optical Scanning Paper Ballots", © 2001-2004, certain parts updated Mar. 16, 2004, Apr. 8, 2004 and May 18, 2004, printed Jun. 11, 2007, 17 pages.
Federal Election Commission, "Voting Systems Performance and Test Standards" Overview and vols. I & II, 2002, 307 pages.
*Diebold Election Systems's Motion for Summary Judgement of Non-Infringement of U.S. Patent No. 7,036,730, Avante International Technology Corporation*, Plaintiff, v. *Diebold Election Systems*, et al, Defendants; United States Easter District of Missouri Eastern Division: Cause No. 4:06-cv-00978 TCM, Feb. 5, 2007, 3 pages.
*Memorandum in Support of Diebold Election Systems's Motion for Summary Judgement of Non-Infringement of U.S. Patent No. 7,036,730, Avante International Technology Corporation*, Plaintiff, v. *Diebold Election Systems*, et al, Defendants; United States Easter District of Missouri Eastern Division: Cause No. 4:06-cv-00978 TCM, Feb. 5, 2007, 22 pages.
*Statement of Uncontroverted Material Facts in Support of Diebold Election Systems's Motion for Summary Judgement of Non-Infringment U.S. Patent No. 7,036,730, Avante International Technology Corporation*, Plaintiff, v. *Diebold Election Systems*, et al, Defendants; United States Easter District of Missouri Eastern Division: Cause No. 4:06-cv-00978 TCM, Feb. 5, 2007, 77 pages.
*Defendant Hart Intercivic, Inc.'s Preliminary Invalidity Contentions for U.S. Patent Nos. 6,892,944, 7,036,730, and 7,077,313, Avante International Technology Corporation*, Plaintiff and Counter-Defendant, v. *Hart Intercivic, Inc*., Defendant and Counter-Plaintiff; United States Southern District of Illinois East St. Louis Division: Case No. 3:07-cv-00169-DRH-CJP, Sep. 10, 2007, 49 pages.

*Content Listing of Hart Intercivic's Invalidity Contentions, Exhibit F (disk), Avante International Technology Corporation*, Plaintiff and Counter-Defendant, v. *Hart Intercivic, Inc*., Defendent and Counter-Plaintiff; United States Southern District of Illinois East St. Louis Division: Case No. 3:07-cv-00169-DRH-CJP, Sep. 10, 2007, 3 pages.
Ramin Safari-Foroushani, "Form Registration: A Computer Vision Approach", © 1997, 121 pages.
Ashraf Nasr Sayed, "Extraction and Photogrammetric Exploitation of Features in Digital Images", Aug. 1990, 263 pages.
Granite Creek Technology Incorporated, "Certification Tests of OPSCAN 5/TeamWork Electronic Voting System", Dec. 15, 1993, 10 pages.
Granite Creek Technology Incorporated, "Certification Tests of OPTECH IV-C Model 400 Central Ballot Tabulator", Jul. 7, 1992, 14 pages.
"OPTECH IV-C Central Ballot Counter Operator's Manual", Jul. 29, 1990, 46 pages.
*Diebold Election Systems' Motion for Summary Judgment of Non-Infringement of U.S. Patent No. 7,036,730, Avante International Technology Corporation*, Plaintiff, v. *Diebold Election Systems*, et al, Defendants; United States Easter District of Missouri Eastern Division: Cause No. 4:06-cv-00978 TCM, Feb. 5, 2007, 3 pages.
*Memorandum In Support of Diebold Election Systems' Motion For Summary Judgment of Non-Infringement of U.S. Patent No. 7,036,730, Avante International Technology Corporation*, Plaintiff, v. *Diebold Election Systems*, et al, Defendants; United States Easter District of Missouri Eastern Division: Cause No. 4:06-cv-00978 TCM, Feb. 5, 2007, 22 pages.
*Statement of Uncontroverted Material Facts In Support of Diebold Election Systems' Motion For Summary and Judgment of Non-Infringement of U.S. Patent No. 7,036,730 (with Exhibits), Avante International Technology Corporation*, Plaintiff, v. *Diebold Election Systems*, et al, Defendants; United States Easter District of Missouri Eastern Division: Cause No. 4:06-cv-00978 TCM. Feb. 5, 2007, 77 pages.
*Reply Brief In Support of Defendant Diebold Election Systems' Motion For Summary Judgment of Non-Infringement of U.S. Patent No. 7,036,730, Avante International Technology Corporation*, Plaintiff, v. *Diebold Election Systems*, et al, Defendants; United States Easter District of Missouri Eastern Divison: Cause No. 4:06-cv-00978 TCM, Aug. 16, 2007, 10 pages.
*Avante International Technology Corporation's Motion for Leave to File A Sur-Reply In Support of Its Opposition of Diebold's Motion For Summary Judgment, Avante International Technology Corporation*, Plaintiff, v. *Diebold Election Systems*, et al, Defendants; United States Easter District of Missouri Eastern Division: Cause No. 4:06-cv-00978 TCM, Aug. 21, 2007, 5 pages.
*Avante's Sur-Reply In Support of Its Opposition to Diebold's Motion For Summary Judgment, Avante International Technology Corporation*, Plaintiff, v. *Diebold Election Systems*, et al, Defendants; United States Easter District of Missouri Eastern Division: Cause No. 4:06-cv-00978 TCM, Aug. 27, 2007, 7 pages.
*Memorandum and Order on Claim Construction, Avante International Technology Corporation*, Plaintiff, v. *Diebold Election Systems*, et al, Defendants; United States Easter District of Missouri Eastern Division: Cause No. 4:06-cv-00978 TCM, Aug. 20, 2007, 50 pages.
*Diebold Election Systems, Inc.'s Invalidity Contentions for the '944 and '730 Patents, Avante International Technology Corporation*, Plaintiff, v. *Diebold Election Systems*, et al, Defendants; United States Easter District of Missouri Eastern Division: Cause No. 4:06-cv-00978 TCM, Nov. 28, 2005.
*Defendant Election Systems and Software, Inc.'s Preliminary Invalidity Contentions, Avante International Technology Corporation*, Plaintiff, v. *Diebold Election Systems*, et al, Defendants; United States Easter District of Missouri Eastern Division: Cause No. 4:06-cv-00978 TCM, Nov. 30, 2006.
*Sequoia Voting Systems' Preliminary Invalidity Contentions, Avante International Technology Corporation*, Plaintiff, v. *Diebold Election Systems*, et al, Defendants; United States Easter District of Missouri Eastern Division: Cause No. 4:06-cv-00978 TCM, Nov. 28, 2006.
Letter, Pail A. Lesko, (Simons Cooper) to Clement Berard, "*Avante International Technology Corporation* vs. *Diebold Election Software* et al, Cause No. 4:06-cv-00978 TCM" dated Dec. 5, 2006.
Rebecca Mercuri, *Voting-Machine Risks*, Nov. 11, 1992.
*The Risks Digest*, vol. 2, Issue 22, Mar. 1986, 4 pages, includes inter alia: Michael McGlaughlin, *Voting Receipt*, http://catless.ncl.ac.uk/Risks/2.22.html Tom Benson, *Computerized Voting*, http://catless.ncl.ac.uk/Risks/2.22.html.
*The Risks Digest*, vol. 2, Issue 24, Mar. 1986, 4 pages, includes inter alia: Kurt Hyde, *Progress Report on Computerized Voting*, http://catless.ncl.ac.uk/Risks/2.24.html.
*The Risks Digest*, vol. 10, Issue 78, Jan. 1991, 6 pages, includes inter alia, Evan Ravitz, *Voting by Phone*, http://catless.ncl.ac.uk/Risks/10.78.html.
Strini Giorgio, *Data Capture for Processing Device, Particularly For Voting and Associated Polling*, Abstract of IT No. 1234224, Patent for Industrial Invention, Date: May 6, 1992.
Bruce Schneier, *Applied Cryptography*, Second Edition 1996, Cover and title pages, Chapter 6, pp. 125-147, 170-175, 185-187, and 587.
Rebecca Mercuri, *Physical Verifyability of Computer Systems, Secure Networks*, Proceedings: Fifth International Computer Virus & Security Conference, 1992,11 pages.
*The Risks Digest*, vol. 2, Issue 23, Mar. 1986, 5 pages.
*The Risks Digest*, vol. 16, Issue 52, Oct. 1994, 11 pages.
*The Risks Digest*, vol. 21, Issue 10, Nov. 7, 2000, 10 pages.
*The Risks Digest*, vol. 22, Issue 66, Apr. 1, 2003, 11 pages.
*The Risks Digest*, vol. 22, Issue 54, Feb. 3, 2003, 11 pages.
*Sequoia Voting Systems' Updated Invalidity Contentions, Avante International Technology Corporation*, Plaintiff, v. *Premier Election Solutions, et al.*, Defendants; United States Eastern District of Missouri Eastern Division: Case No. 4:06-cv-00978 TCM, Oct. 22, 2007, 42 pages.
*Premier Election Solution, Inc.'s Invalidity Contentions for the* '944 *and* '313 *Patents, Avante International Technology Corporation*, Plaintiff, v. *Premier Election Solutions, et al*, Defendants; United States Eastern District of Missouri Eastern Division: Case No. 4:06-cv-00978 TCM, Oct. 23, 2007, 39 pages.
*Defendant Election Systems & Software, Inc.'s Updated Invalidity Contentions, Avante International Technology Corporation*, Plaintiff, v. *Premier Election Solutions, et al*, Defendants; United States Eastern District of Missouri Eastern Division: Case No. 4:06-cv-00978 TCM, Oct. 22, 2007, 32 pages.
*Defendant's Premier Election Solutions, Inc. And Election Systems & Software, Inc's Memorandum of Law in Support of its Motion for Summary Judgement of Non-Infrigement on Claims* 26-28, 30 *and* 49-51 *of U.S. Patent No.* 6,892,944, *Avante International Technology Corporation*, Plaintiff, v. *Premier Election Solutions, et al*, Defendants; United States Eastern District of Missouri Eastern Division: Case No. 4:06-cv-00978 TCM, Document 334, Nov. 2, 2007, 14 pages.
*Memorandum in Support of Defendants' Joint Motion for Summary Judgement of Invalidity of Claims* 26-28, 30 *and* 49-51 *of U.S. Patent No.* 6,892,944, *Avante International Technology Corporation*, Plaintiff, v. *Premier Election Solution, et al*, Defendants; United States Eastern District of Missouri Eastern Division: Case No. 4:06-cv-00978 TCM, Document 337, Nov. 2, 2007, 20 pages.
*Memoradum in Support of Defendants' Joint Motion for Summaery Judgement of Invalidity of the Asserted Claims from U.S. Patent Nos.* 6,892,944 *and* 7,077,313 *Under* 35 *U.S.C. §§* 102 *and* 103, *Avante International Technology Corporation*, Plaintiff, v. *Premier Election Solutions, et al.*, Defendants; United States Eastern District of Missouri Eastern Division: Canuse No. 4:06-cv-00978 TCM, Document 339, Nov. 2, 2007, 26 pages.
*Statement of Uncontroverted Material Facts in Support of Defendants' Joint Motion for Summary Judgement that U.S. Patent Nos.* 6,892,944 *and* 7,077,313 *Are Invalid Under* 35 *U.S.C. §§* 102 *and* 103, *Avante International Technology Corporation*, Plaintiff, v. *Premier Election Solutions, et al*, Defendants; United States Eastern District of Missouri Eastern Division: Case No. 4:06-cv-00978 TCM Document 340, Nov. 2, 2007, 192 pages.
Roy G. Saltman, "Effective Use of Computing Technology in Vote-Tallying", Mar. 1975, 139 pgs.

Douglass Jones, "A Brief Illustrated History of Voting", 2001, 18 pages.
North American Professional Technologies, "Vote Tally System Ballot Production Guide", Jun. 1989, 16 pages.
Michael I. Shamos, "American Information Systems, AIS 115 and 315 Vote Tabulation Systems, An Evaluation", Dec. 1989, 9 pages.
Michael I. Shamos, "American Information Systems, AIS 150 and 550 Mark-Sense Vote Tabulation Systems and Election Reporting System (ERS), An Evaluation", Mar. 1994, 5 pages.
Michael I. Shamos, "Business Records Corporation, Optech IV-C Model 200 Mark-Sense Central Tabulation Unit, An Evaluation", Nov. 1991, 8 pages.
Michael I. Shamos, "American Information Systems, AIS 315 Ballot Counter, An Evaluation", Nov. 1983, 5 pages.
Michael I. Shamos, "The Sequoia Pacific Datavote System, An Evaluation", Jun. 1984, 7 pages.
*Statement of Uncontroverted Material Facts in Support of Defendants' Election Systems and Software Inc. and Premier Election Solutions, Inc.'s Motion for Summary Judgment of Non-Infringement of Claims* 26-28, 30 *and* 49-51 *of U.S. Patent* 6,892,944, *Avante International Technology Corporation*, Plaintiff, v. *Premier Election Solutions, et al*, Defendants; United States Eastern District of Missouri Eastern Division: Case No. 4:06CV00978 TCM, Document 333, Nov. 2, 2007, 29 pages.
*Statement of Uncontroverted Material Facts in Support of Defendants' Joint Motion for Summary Judgment of Invalidity of Claims* 26-28, 30 *and* 49-51*of U.S. Patent No.* 6,892,944, *Avante International Technology Corporation*, Plaintiff, v. *Premier Election Solutions, et al*, Defendants; United States Eastern District of Missouri Eastern Divison: Case No. 4:06CV00978 TCM, Document 336, Nov. 2, 2007, 95 pages.
*Motion for Summary Judgment of Invalidity of the Asserted Claims from U.S. Patent Nos.* 6,892,944, *and* 7,077,313 *Under* 35 *U.S.C. §§* 102 and 103, *Avante International Technology Corporation*, Plaintiff, v. *Premier Election Solutions, et al*, Defendants; United States Eastern District of Missouri Eastern Division: Case No. 4:06CV00978 TCM, Document 338, Nov. 2, 2007, 3 pages.
*Declaration of Michael I. Shamos, Ph.D., J.D. in Support of Defendants' Joint Motion for Summary Judgment that U.S. Patent Nos.* 6,892,944, *and* 7,077,313 *are Invalid Under* 35 *U.S.C. §§*102(b) *and* 103(a), *Avante International Technology Corporation*, Plaintiff, v. *Premier Election Solutions, et al*, Defendants; United States Eastern District of Missouri Eastern Division: Case No. 4:06CV00978 TCM Document 342, Nov. 2, 2007, 332 pages.
*Plaintiff Avante International Technology, Corporation's Memorandum in Opposition to Defendants' Joint Motion for Summary Judgment of Invalidity of Claims* 26-28, 30 *and* 49-51 *of U.S. Patent No.* 6,892,944, *Avante International Technology Corporation*, Plaintiff, v. *Premier Election Solutions, et al*, Defendants; United States Eastern District of Missouri Eastern Division: Case No. 4:06CV00978 TCM, Document 388, Dec. 147, 2007, 180 pages.
*Defendants' Response to Plaintiff Avante International Technology Corporation's Statement of Uncontroverted Facts in Support of its Motion for Summary Judgement that U.S. Patent Nos.* 6,892,944 *and* 7,077,313 *are not invalid, in View of Defendant's References or* 35 *U.S.C. §* 112 *Arguments, Avante International Technology Corporation*, Plaintiff, v. *Premier Election Solutions, et al*, Defendants United States Eastern District of Missouri Eastern Division: Case No. 4:06CV00978 TCM, Document 395, Dec. 14, 2007, 90 pages.
*Premier Voting Solutions, Inc's Memorandum in Opposition to Avante International Technology Corporation's Motion for Summary Judgment that Premier Election Solutions, Inc's Equipment Infringes U.S. Patent Nos.* 6,892,944 *and* 7,077,313, *Avante International Technology Corporation*, Plaintiff, v. *Premier Election Solutions, et al*, Defendants; United States Eastern District of Missouri Eastern Division: Case No. 4:06CV00978 TCM, Document 396, Dec. 14, 2007, 10 pages.
*Seqoia Voting Systems' Opposition to Plaintiff's Motion for Summary Judgment that Sequoia's Equipment Infringes U.S. Patent Nos.* 6,892,944 *and* 7,077,313, *Avante International Technology Corporation*, Plaintiff, v. *Premier Election Solutions, et al*, Defendants; United States Eastern District Missouri Eastern Division: Case No. 4:06CV00978 TCM, Document 417, Jan. 9, 2008, 151 pg.
*Avante International Technology Corporation's Reply in Support of its Motion for Summary Judgment that Diebold Election Systems, Inc.'s Equipment Infringes U.S. Patent Nos.* 6,892,944 *and* 7,077,313, *Avante International Technology Corporation*, Plaintiff, v. *Premier Election Solutions, et al*, Defendants; United States Eastern District of Missouri Easterb Division: Case No. 4:06CV00978 TCM, Document 425, Jan. 11, 2008, 14 pages.
*Defendants' Reply in Support of Their Joint Motion for Summary Judgement of Invalidity of Claims* 26-28, 30 *and* 49-51 *U.S. Patent No.* 6,892,944 *Based on 35 U.S.C. §*112 ¶1, *Avante International Technology Corporation*, Plaintiff, v. *Premier Election Solutions, et al*, Defendants; United States Eastern District of Missouri Easterb Division; Case No. 4:06CV00978 TCM, Document 428, Jan 11, 2008, 101 pages.
*Defendants Premier Election Solutions, Inc. and Election Systems & Software, Inc.'s Reply in Support of Their Motion for Summary Judgement of Non-Infrigement of Claims* 26-28,30 *and* 49-51 *Of U.S. Patent No.* 6,892,944, *Avante International Technology Corporation*, Plaintiff, v. *Premier Election Solutions, et al*, Defendants; United States Eastern District of Missouri Easterb Division: Case No. 4:06CV00978 TCM, Document 429, Jan. 11, 2008, 17 pages.
Michael I. Shamos, "Shoup Corporation, Shouptronic Direct Recording Electronic Voting System, An Evaluation", Jul. 1991, 3 pages.
*Defendant Hart Intercivic, Inc.'s Response to Plaintiff's Claim Construction Brief for U.S. Patent Nos.* 6,892,944, 7,036,730, *and* 7,077,313, *Avante International Technology, Inc.*, Plaintiff, v. *Hart Intercivic, Inc.*, Defendant; United States Southern District of Illinois East St. Louis Division: Case No. 3:07-cv-00169-DRH-CJP, Document 58, Feb. 1, 2008, 304 pgs.
*Avante International Technology, Inc's Reply in Support of its Claim Construction Brief for U.S. Apatent No.* 7,036,730, *U.S. Patent No.* 6,892,944, *and U.S. Patent No.* 7,077,313, *Avante International Technology, Inc.*, Plaintiff, v. *Hart Intercivic, Inc.*, Defendant; United States Southern District of Illinois East St. Louis Division: Case No. 3:07-cv-00169-DRH-CJP, Document 60, Feb. 8, 2008, 71 pgs.
*Avante International Technology, Inc.'s Claim Construction Brief for U.S. Patent No.* 7,036,730, *U.S. Patent No.* 6,892,944, *and U.S Patent No.* 7,077,313, *Avante International Technology, Inc.*, Plaintiff, v. *Hart Intercivic, Inc.*, Defendant; United States Southern District of Illinois East St. Louis Division: Case No. 3:07-cv-00169-DRH-CJP, Document 57, Jan. 18, 2008, 364 pgs.
*Declaration of Peter G. Martin Filed in Support of Defendants' Joint Motion for Summary Judgement of Invalidity of the Asserted Claims from U.S. Patent Nos.* 6,892,944 *and* 7,077,313 *Under 35 U.S.C. §§* 102 *and* 103, *Avante International Technology Corporation*, Plaintiff, v. *Premier Election Solutions, et al*, Defendants; United States Eastern District of Missouri Eastern Division: Case No. 4:06CV00978 TCM, Document 341, Nov. 2, 2007, 105 pages.
*Defendants' Memorandum in Opposition to Avante International Technology Corporation's Motion for Summary Judgment that U.S. Patent Nos.* 6,892,944 *and* 7,077,313 *Are Not Invalid In View of Defendants' References or* 35 *U.S.C. §*112 *Arguments*, *Avante International Technology Corporation*, Plaintiff, v. *Premier Voting Solutions, Inc.*, et al, Defendants; United States Eastern District of Missouri Eastern Division: Case No. 4:06CV00978 TCM, Doc. 394, Dec. 14, 2007, 199 pages.
*Defendants Premier Voting Solutions, Inc.'s Response to Statement of Uncontroverted Facts in Support of Avante International Technololgy Corporation's Motion for Summary Judgment that Premier Voting Solutions, Inc. Equipment Infringes U.S. Patent Nos.* 6,892,944 *and* 7,077,313 *AND Additional Facts In Support of its Opposition to Avente's Motion for Summary Judgment, Avente International Technology Corporation*, Plaintiff, v. *Premier Voting Solutions, Inc.*, et al, Defendant; United States Eastern District of Missouri Eastern division: Case No. 4:06CV00978 TCM, Document 399, Dec. 15, 2007, 197 pages.
*Defendants' Response to Avante International Technology Corporations's Statement of Material Facts In Support of its Oppostion to Defendants' Joint Motion for Summary Judgment That U.S Patent Nos.* 6,892,944 *and* 7,077,313 *Are Inavlid Under 35 U.S.C. §§* 102 *and* 103, *Avante International Technology Corporation*, Plaintiff, v.

*Premier Voting Solutions, et al*, Defendants; United States Eastern District of Missouri Eastern Division: Case No. 4:06CV00978 TCM, Document 430, Jan. 11, 2008.

*Defendants' Reply In Support of Their Joint Motion for Summary Judgment of Invalidity of the Asserted Claims From U.S. Patent Nos.* 6,892,944 *and* 7,077,313 *Are Invalid Under U.S.C. §§* 102 and 103, *Avante International Technology Corporation*, Plaintiff, v. *Premier Election Solutions, et al*, Defendants; United States Eastern District of Missouri Eastern Division; Case No. 4:06CV00978 TCM, Document 431, Jan. 11, 2008, 66 pages.

*Defendant's Supplemental Responses and Objections to Plaintiff's First Requests for Admission, Avante International Technology, Inc.*, Plaintiff, v. *Hart Intercivic, Inc.*, Defendant; United States Southern District of Illinois East St. Louis Division: Case No. 3:07-cv-00169-DRH-CJO, Document 102, Jun. 4, 2008, 6 pgs.

*Defendant's Supplemental Responses to Plaintiff's First Set of Interrogatories, Avante International Technology, Inc.*, Plaintiff, v. *Hart Intercivic, Inc.*, Defendant; United States Southern District of Illinois East St. Louis Division: Case No. 3:07-cv-00169-DRH-CJP, Jun. 4, 2008, 88 pgs.

* cited by examiner

PR-1

| | |
|---|---|
| 08-012-035-02-XXXXXXXX<br>15:30 @November 7, 2000 | |
| George W. BUSH<br>Dick Cheney | President<br>/Vice President |
| Bob FRANKS | US Senator |
| Christopher H.<br>SMITH | House of<br>Representative |
| Cathay "D" Di<br>COSTANZO | County Clerk |
| Chris CHIANESE | Board of Chosen<br>Freeholders |
| Shirley GUERIERI | Board of Chosen<br>Freeholders |
| Keith CROWELL | Board of Chosen<br>Freeholders |
| Yes | Public Question No. 1 |
| Yes | Public Question No. 2 |
| Yes | Public Question No. 3 |
| | |

PR-2

| | |
|---|---|
| 08-012-035-02-YYYYYYYY<br>15:30 @November 7, 2000 | |
| Al GORE<br>Joe Lieberman | President<br>/Vice President |
| Jon S. CORZINE | US Senator |
| Reed GUSCIORA | House of<br>Representative |
| Kathleen Culliton<br>WOLLERT | County Clerk |
| Ann CANNON | Board of Chosen<br>Freeholders |
| Brian M. HUGHES | Board of Chosen<br>Freeholders |
| Elizabeth Maher<br>MUOIO | Board of Chosen<br>Freeholders |
| Yes | Public Question No. 1 |
| Yes | Public Question No. 2 |
| Yes | Public Question No. 3 |
| | |

PR

FIG. 2A

380

| STATE | COUNTY | MUNICIPALITY | PRECINCT | WARD | POLITICAL PARTY | VOTER NUMBER |
|---|---|---|---|---|---|---|
| 3-DIGIT IDENTIFIER | 3-DIGIT IDENTIFIER | 4-DIGIT IDENTIFIER | 2-DIGIT IDENTIFIER | 2-DIGIT IDENTIFIER | 2-DIGIT IDENTIFIER | 4-10 DIGIT IDENTIFIER |

381 382 383 384 385 386 387

FIG. 10

ELECTRONIC VOTING APPARATUS, SYSTEM AND METHOD

This Application is the National Stage of PCT Application PCT/US01/45769 filed Nov. 1, 2001, which application claims the benefit of:

U.S. Provisional Application No. 60/252,012 filed Nov. 20, 2000, of

U.S. Provisional Application No. 60/253,480 filed Nov. 28, 2000, of

U.S. Provisional Application No. 60/253,778 filed Nov. 29, 2000, of

U.S. Provisional Application No. 60/250,178 filed Nov. 30, 2000, of

U.S. Provisional Application No. 60/251,920 filed Dec. 7, 2000, of

U.S. Provisional Application No. 60/266,627 filed Feb. 6, 2001, of

U.S. Provisional Application No. 60/272,567 filed Mar. 1, 2001, of

U.S. Provisional Application No. 60/278,017 filed Mar. 22, 2001, of

U.S. Provisional Application No. 60/278,527 filed Mar. 24, 2001, and of

U.S. patent application Ser. No. 09/737,306 filed Dec. 15, 2000.

The present invention relates to voting apparatus, systems and methods.

BACKGROUND

Current election processes using paper cards and/or ballots have been subject of controversy because of questions concerning their accuracy, potential for voter confusion, and potential for fraud. This is true for machine voting as well as for hand-marked ballots or punch card ("chad" or "chip" removal type) ballots, whether counted by optical scanning or mechanical scanning, which introduce the additional difficulty of determining what is and is not a voted ballot due to incomplete or partial marking of a box or spot or due to the partial or incomplete punching out of a chad or chip. The accuracy and integrity of the voting process and of the counting of ballots is of great concern in any election. As is perhaps most convincingly evidenced by the events surrounding the United States Presidential Election for the year 2000, and particularly in the State of Florida, the lack or perceived lack of accuracy and integrity can cause fear, doubt, distrust and divisiveness and can undermine confidence in government and its institutions.

While some of the foregoing is alleviated by conventional mechanical and more recently by computer-based electronic voting machines utilizing proven and applicable means of data entry such as special keyboards or touch-screens that have been constructed for conventional electronic voting machines, these do not allow or provide any way for personal checking of votes cast to increase the voter's confidence. While the use of computers for vote tabulation and record keeping for each voting machine and/or election can be done with almost zero error, voter confidence in the process is still a subject to be considered. A particular concern relates to the nature of records stored in electronic and magnetic form which are intangible and can be changed without leaving any evidence thereof.

In addition to potential machine and human error, present election and ballot systems do not provide any traceable record for the election choices of individual voters. While the secrecy of each personal ballot is important for various reasons and must be maintained, a voting system and method that would provide confirmation of his or her voting choice(s) to each individual voter and that would further allow the individual voter to compare what has been tallied during the election as his vote to such confirmation would be extremely useful and increase confidence in the integrity and accuracy of the outcome of the voting.

The following cannot be easily addressed to eliminate potential human error and the possibilities for mischief or tampering with conventional voting systems and methods:

1. Voter registration verification when the voter shows up at the polls to vote may be very strict or may be loose, without any uniform or satisfactory standard. Conventional systems simply lack any simple means to verify registration electronically and instantly before the voter is allowed to vote. This lack of certainty is magnified in the case of "provisional" ballots, as well as in the case of "domestic absentee" and "overseas absentee" ballots, particularly when such ballots are challenged.
2. The voter does not have any record of his voting selections. There is currently no sure way to allow the voter to verify and have confidence that the vote he/she cast has indeed been tallied properly.
3. If an electronic voting booth is used, there is no feasible way to challenge or recount the voting records since the votes are accumulated electronically in electronic memories and, if stored as individual records, are stored in a random order to preserve voter anonymity. Voting machines, and particularly electronic voting machines wherein an intangible electronic or magnetic record may be altered (either intentionally or accidentally) without any telltale evidence thereof, must be totally devoid of possible tampering or other problem in order that the confidence of the voting public and of each individual voter can be preserved.

In view of the recent problems and issues in properly and accurately counting votes in the U.S. Presidential election, voters are likely asking questions such as:

How do you know that your paper, electronic, or mechanical ballot or vote was actually counted? And that it was counted correctly?

Are you comfortable that multiple voting (i.e. the old saying, "Vote early! Vote often!") has really been eliminated?

Are you sure that your absentee ballot or overseas absentee ballot was counted? And that it was counted correctly?

Are you sure that provisional ballots are properly verified and qualified, and then are counted correctly?

Can you be sure that the vote count in extremely close election, e.g., an election where the difference is a mere hundreds of votes out of many millions of votes cast or one or two votes out of several thousands of votes cast, is really correct and legitimate?

It would be desirable to have a voting apparatus, system and method that could substantially eliminate doubts and fears, whether real or imagined, concerning the accuracy and integrity of the voting apparatus, system and method. People who are among those that do not or cannot trust a voting machine or system completely, whether it utilize an electronic or mechanical voting machine, or marked or punched paper ballots, would be more likely to trust the voting system if it was "transparent," i.e. if the voting system provided a way for each individual vote to be independently verified. Of course, transparency should be provided without compromising the secrecy of any individual vote or the confidentiality of the voting booth.

Accordingly, a voting apparatus, system and method that avoids at least some of the problems associated with conventional voting apparatus, systems and methods is needed.

To this end, the voting apparatus of the present invention comprises a processor for processing voting information and providing a voting session identifier, and a voter interface for displaying voting information and receiving voting selections made by a voter and coupling same to the processor. The processor provides a voting record including the voting selections and a memory is coupled to the processor for storing the voting record and the voting session identifier. The apparatus further comprises one or more of: a means for storing a voting indicia and the voting session identifier in a tangible medium separate from the memory, the processor requiring selection of at least one of the possible voting selections before proceeding from a present contest to a next contest and/or to ending a voting session, and the processor being responsive to a representation corresponding to one or more of a plurality of voting jurisdictions for selecting from a database voting ballots for the one or more of the plurality of voting jurisdictions corresponding thereto.

BRIEF DESCRIPTION OF THE DRAWING

The detailed description of the preferred embodiments of the present invention will be more easily and better understood when read in conjunction with the FIGURES of the Drawing which include:

FIG. 2A illustrates example tangible receipts therefrom;

FIG. 10 is a schematic diagram illustrating an example format for a voter identifier (VID).

Figure 1A:
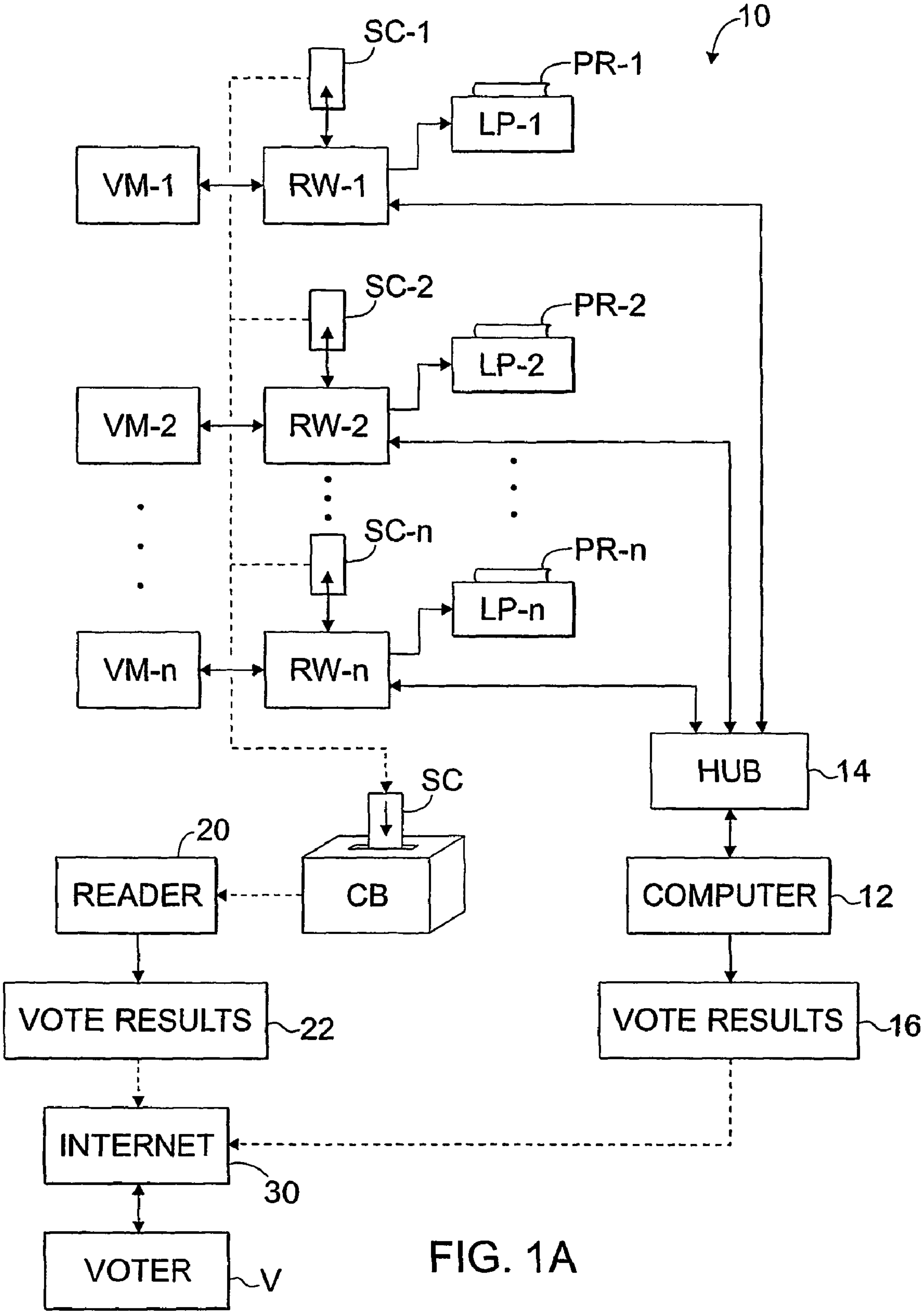
FIG. 1A is a schematic block diagram of an example embodiment of a voting apparatus and system according to the invention and utilizing the method of the invention.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. It is noted that, according to common practice, the various features of the drawing are not to scale, and the dimensions of the various features are arbitrarily expanded or reduced for clarity.

DESCRIPTION OF THE PREFERRED EMBODIMENT(S)

FIG. 1A is a schematic block diagram of an example embodiment of a voting apparatus and system 10 according to the invention and utilizing the method of the invention. The present invention addresses the problems and challenges set forth above with a voting machine VM that includes a logical use of a computer or processor in conjunction with firmware and/or other hardware. In particular, the processor provides a unique identifier for each voting session that is associated with the voting record of that voting session. A printer LP provides a tangible record or receipt of each voter's voting session and the voting session identifier. An optional smart card or secured memory card SC or other card or device with an embedded electronic chip provides a suitable amount of memory for storing voting information including but not limited to a record of the voter's voting session and the voting session identifier. The foregoing facilitates the accomplishing of the goals of a fast, low cost, and secure transparent voting system.

As used herein, "smart card" refers to an article having at least a memory capable of storing information. Typically, a smart card includes an electronic memory device, such as a semiconductor die or chip including an electronic memory circuit, attached to or embedded in a substrate of convenient size for handling and for printing desired indicia or other information on the surfaces thereof. Smart cards may also include other electronic devices such as processors, transmitters and receivers, as is conventional for providing a desired degree of security, for communicating information to and from the memory of the smart card, and for processing the information such information. Also typically, the card is about the size of a conventional credit card or the like, but may be larger or smaller. Smart cards are sometimes referred to by other names, such as chip cards and access cards.

As used herein, "transparent" and "transparency" refer to a voting apparatus, system or method that provides a way for each individual vote to be verified independently of the accumulated voting result(s). Preferably, transparency should be provided without compromising the secrecy of any individual vote or the privacy and confidentiality of the voting booth. More preferably, transparency can be provided that does not rely upon the security of official voting records or the actions of any individual, even an election official.

One or more voting machines VM-1, VM-2, . . . VM-n are provided for voters to enter and to cast their votes, such as for candidates for office, or for or against public questions, referenda, constitutional amendments and the like, in accordance with governing law. Voting machines VM-1, VM-2, . . . VM-n may be together at a common location, e.g., a polling place, or may be dispersed in any convenient number of places. Operatively associated with each of voting machines VM-1, VM-2, . . . VM-n is a decoder reader/writer RW-1, RW-2, . . . RW-n, respectively, into which is inserted an optional smart card SC-1. SC-2, . . . SC-n each containing at least an electronic chip providing a memory of suitable capacity.

In order to vote, each voter must insert an optional smart card SC into reader/writer RW or otherwise enter a voter identification number into voting machine VM to activate voting machine VM to allow voting. The card or tag or device SC with embedded electronic memory chip preferably has security features so that the memory chip cannot be tampered with. Typically, information stored in smart cards SC may include a voter identification or serial number, e.g., relating to the rolls of registered voters, and/or voter name and address or other identifying information, identification of the voting district and/or polling place for which the smart card is valid, and/or the date of the election for which the smart card is valid, and/or a security code representative of any one or more of the foregoing by which validity and authenticity of the smart card may be validated.

It is noted that while the voter identifier and voting session identifier, as well as other information herein, may be referred to as "numbers," it is not intended that such be limited to numerical characters, but any alphanumeric, numeric or symbols may be utilized in such identifier(s). Further, while such identifiers may also be referred to as "serial numbers," they may not be numbers or true serial numbers in a numerical or other sequence, but may be in any order or in no identifiable order. Unlike a conventional bar-code or magnetic stripe card, which is easily tampered with, the secure memory or smart card SC cannot be readily tampered with or copied. This is an important difference provided by utilizing a smart card SC as a medium for both verification of voter identification as well as record keeping of the votes cast. Either a contact type smart card SC or a contact-less (wireless) type smart card may be utilized. Typical contact type and wireless (contact-less) type cards suitable for smart card SC are available from many sources. For example, cards employing electronic chips such as types SLE4442 and SLE4428 are available from Siemens located in Germany. Microprocessor chip cards available from Atmel Corporation located in Colorado and "Mifare" wireless/contact-less cards contain an electronic chip from Philips located in the Netherlands or from Siemens.

Smart card decoding reader/writer devices RW available with suitable firmware utilizing standard smart card reading and/or coding protocols can be utilized or may be modified to provide additional security. A typical decoder reader/writer unit RW is, for example, similar to those made for access control applications by Avante International Technology, Inc. located in Princeton, N.J., Fargo Electronics, Inc., of Eden Prairie, Minn., and others, is suitable for this type of secure voting system application. Devices RW need only write a record of voting information to the memory of smart card SC, which may be a blank card issued to each voter at the polling place or otherwise, or have information as described above stored therein, in accordance with the invention. Device RW need not be able to read information stored in the memory of smart card SC unless it is desired to have information stored therein that is to be utilized by voting machine VM in connection with the process of allowing a particular person to vote, e.g., such as a name, password or other personal identifier, or other information as described above.

A processor within voting machine VM employs application specific computer software or an applications shell in conjunction with a standard relational data base computer program to operatively function with decoder reader writers RW-1, RW-2, . . . RW-n for reading data stored in the memory thereof and for writing data to be stored in the memory thereof. In addition, the processor also includes or has associated with it a random number generator or pseudo-random number generator or a list or sequence of unique numbers that are utilized to provide a unique voting session identifier to the voting session of each voter. Processor P may associate such voting session identifier with the voting session either at the commencement thereof or at the conclusion thereof or at any other convenient time substantially contemporaneous therewith. The computer software for processor P is typically similar to that employed in access control systems such as the trade-show retrieval systems and access control systems available from Avante International Technology, Inc. located in Princeton, N.J. and from others. Typically, such software utilizes the "Visual Basic" programming language and a relational data base such as the "Access" data base, both of which are available from Microsoft Corporation located in Redmond, Wash., and may be stored on any convenient medium, such as software stored on a floppy disk or a hard drive or as firmware stored in an electronic memory or the like. The flow chart of an example embodiment of such voting system and computer program is described, for example, in relation to FIGS. 3-5 below.

Also operatively associated with each of voting machines VM-1, VM-2, . . . VM-n is a respective printer LP-1, LP-2, . . . LP-n, respectively, for providing a respective tangible voting record PR-1, PR-2, . . . PR-n, such as a printed receipt, for each voter at the conclusion of his voting. Each voting record PR-1, PR-2, . . . PR-n includes the randomly assigned identifying or serial number unique to the particular voting session and a listing of the votes that the voter has cast (the voting record) that is identical to the voting record and identifying number stored in voting machine VM. The information (voting record and voting session identifier) that is printed on the printed voting receipt PR is identical to the information written into the memory of smart card SC. As a result, there are three separate and independent identical records of the voter's votes and voting session identifier, i.e., one stored in the memory (memories) of voting machine VM, one stored in the memory of smart card SC, and one printed of the voting receipt PR.

Alternatively, the information on printed receipt PR and/or stored in smart card SC, may include a voting indicia wherein the voting indicia is either the voting record or an indication in place of the voting record, i.e. in place of the actual voting selections. In other words, instead of a voting record listing the candidates selected and/or questions voted, the receipt PR and/or smart card SC may contain a message such as "All contests voted" or "All contests voted except . . . [listing of exceptions]" or "Your vote has been recorded" wherein confirmation of voting is provided, but confidentiality of the voting selections and voter privacy is maintained.

Voting machines VM may store an individual voting record for each voter or may simply accumulate the cumulative voting results as each voter casts his ballot, thereby having no record of individual voting, or may store both. Preferably, such voting record and voting session identifier are stored in the at least two independent non-volatile memory devices of voting machine VM, only one of which is typically coupled to the central computer 12 at the time for transferring voting records thereto. Preferably, the voting information stored in the smart card SC is written over any identifying information relating to the particular voter or such information is erased by voting machine VM, thereby assuring that identity of the voter cannot be ascertained from the information stored in voting machine VM, in smart card SC and on printed receipt PR.

Each voter deposits his smart card SC into a secure collection box CB before leaving the polling place (if voting machine VM and/or smart card encoder RW do not automatically collect smart card SC, which is preferable) and the voter retains the printed voting receipt. The smart cards SC in the secure collection box CB are an independent and separate re-countable electronic record of the voting, i.e. of each vote cast. Preferably, all three independent records, voting machine VM, smart card SC and printed receipt identify the voting record of the particular voter by the same unique voting session identifier which, because it is randomly assigned, is not and cannot be associated with the personal identity of the voter. Two independent identical records of the voting are held securely by the voting authorities, i.e. those in the voting machine VM and those in smart cards SC, while the third is held by the individual voters.

Figure 1B:
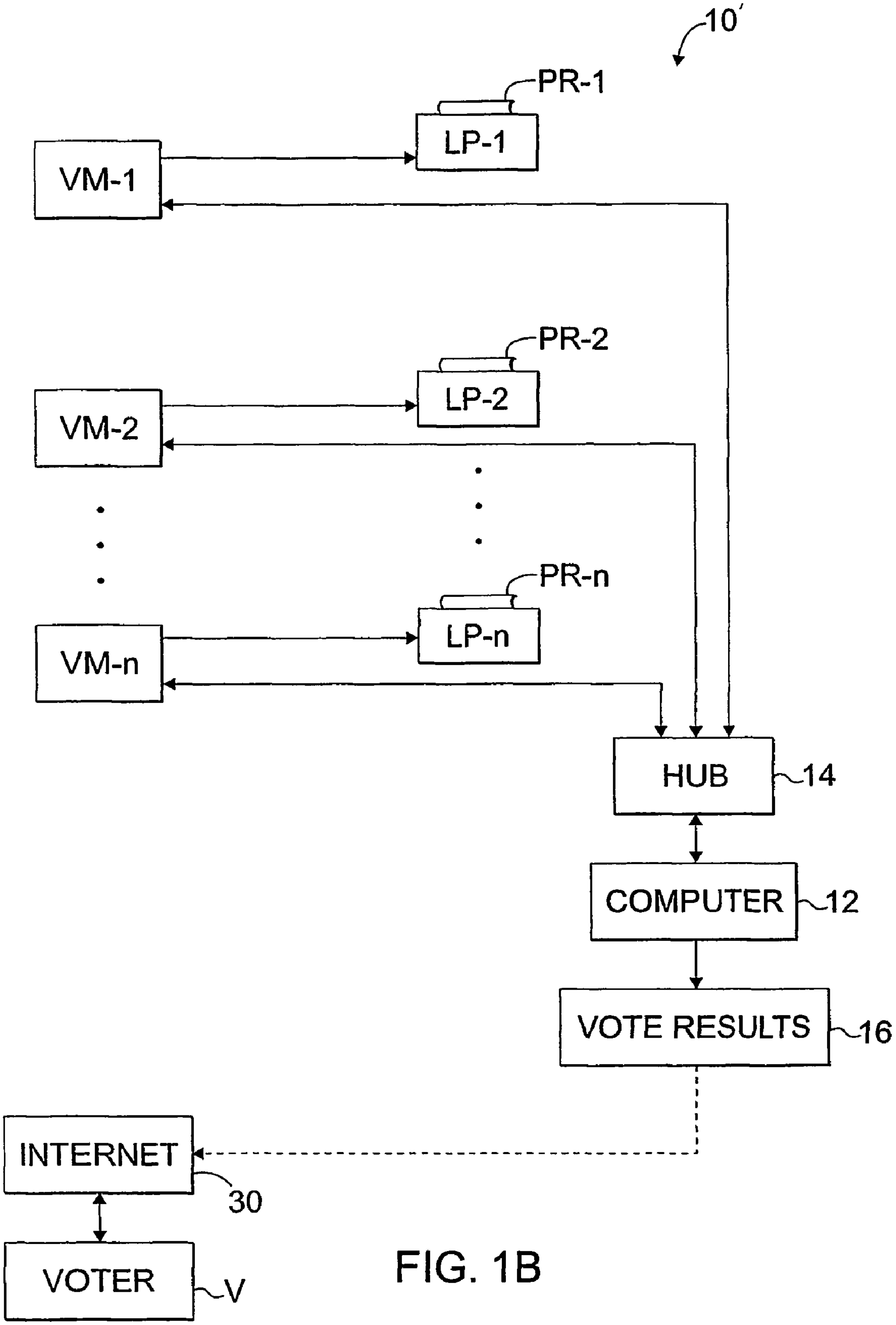
FIG. 1B is a schematic block diagram of an alternative example embodiment of a voting apparatus and system according to the invention and utilizing the method of the invention.

FIG. 1B is a schematic block diagram of an alternative example embodiment of a voting apparatus and system 10' according to the invention and utilizing the method of the invention. Voting system 10' is like voting system 10 of FIG. 1A described above, except that smart card encoder RW and smart cards SC are not utilized. To the extent that smart cards SC may have been utilized to verify voter information and/or initiate a voting session on voting machine VM, such is accomplished in the system 10' of FIG. 1B by an election official, as is conventional, or by the voter entering a number or other identifier or identifying information into voting machine VM, or by any other suitable arrangement.

At the conclusion of a voter's voting session, voting machine VM stores the voting record of a voting session and the voting session identifier associated therewith by its processor in its internal memory or memories and provides same to local printer LP which provides a tangible record PR, e.g., in the form of a printer\d receipt PR, to the voter. Note that system 10' still provides at least two independent and separate identical voting records for each voting session and that these are associated with a voting session identifier by which vote tabulation may be verified independently and on a vote-by-vote basis. In particular, any voter may utilize the voting session identifier on his printed receipt PR to check the published vote results 16 to verify that his vote has been correctly recorded, thereby providing transparency of voting results 16. I.e. the election results are posted (e.g., paper copy or electronic copy) and are accessible (in person or electronically or via the Internet) by using the voting session identifier known only to the particular voter.

With respect to both FIGS. 1A and 1B, at the end of the prescribed period for voting, e.g., when the polls close, voting machines VM are coupled to a central computer 12 and communicate either the accumulated voting result or individual voting records, or both, to central computer 12 which then combines the voting data from voting machines VM to tabulate and produce vote results 16. Typically, central computer 12 would be located in a secure area or facility, such as a county or state election office, or both. Where plural voting machines VM are located in close proximity, such as at one polling place or in a central facility to which they are brought at the conclusion of voting, communication by such machines with computer 12 may be through a hub 14, such as a local communication hub, a local area network, a server, the public telephone network, an electrical cable, or the like, or the memory or memories M may be removed from the voting machine VM and inserted into a reader associated with computer 12 for reading the voting results stored in such memory or memories M.

It is noted that the present invention provides complete freedom to the voting (election) authorities as to how and when the voting data is communicated to the central computer 12. It may be communicated essentially in real time as each vote is cast, or at the end of each voting session, i.e. immediately and sequentially, or may be communicated periodically either through out the appointed period for voting or at the conclusion of voting, either from the voting machines while still at the polling places or from a central or other facility to which the voting machines VM are transported. Vote results 16 may be announced or may be posted on the Internet 20 or otherwise communicated as is desirable and convenient, either as cumulative results and/or as a collection of individual voting records. Note that where the results are published as individual voting records with the voting session identifier associated therewith, the results are 100% transparent because each individual voter may use the voting session identifier printed on his tangible receipt to check the voting record posted against that on the printed receipt.

For security and confidentiality, voting information communicated from one apparatus to another, whether such is in a common location or in separate or distant locations, is preferably encoded or encrypted, such as by public key and/or private key encryption or other encryption, as is conventional. Even where the voting information is communicated over communication links to which an unauthorized person may gain access, such as public telephone lines, radio communication or the Internet, the apparatus according to the present invention provides additional security because there is always at least one separate set of records stored in the memories of smart cards SC against which the otherwise communicated voting information can be compared and verified. Thus, whether the election is local, regional, statewide or nationwide, the arrangement of the apparatus of the invention is arranged for avoiding and circumventing any possible tampering and/or hacker attack. Of course, transporting the voting machines to a central facility with appropriate security avoids the possibility of tampering or hacking.

In the event any question arises as to the outcome of the voting, such as where the result is a very close or where the integrity of the primary vote results 16 are challenged or questioned, a parallel and independent counting of the vote may be made utilizing the collected smart cards SC collected in secure collection box CB. The collected cards CB are processed through and are read by a smart card reader 20 and the voting results, either as a cumulative vote result or as a collection of individual voting records, or both, are produced as vote result 22 which is available for comparison to the primary vote result 16.

In accordance with the invention, the collected set of individual voting records from the primary vote result 16 and/or the backup vote result 22, may be made available, such as via the Internet 20, so that an individual voter V can log on to an election web site and, using the unique voting session identifying number recorded on his printed receipt PR, verify that his vote as printed on his confirmatory receipt PR has in fact been accurately recorded and tallied in the vote results 16 and/or 22.

The present invention provides complete transparency to the voting process because the voter receives positive confirmation that his vote has been properly recognized and recorded before he leaves the polling place, and because any voter V can verify that his vote was tallied in the vote results 16, 22. Moreover, voting confidentiality is maintained because the only information that can associate any voter and his vote is the randomly assigned unique voting session identifier that is unrelated to his personal identity. Further, voting integrity is improved because at least two separate and independent, but identical, records of the voting are provided and can be independently tallied and compared in case of challenge or question. Should vote tampering or other illegal practice be suspected or alleged, any voter can confirm whether such is the case by comparing the posted record of his voting record posted on the Internet election web site with his individual printed receipt PR.

Where voting machines VM maintain records of each individual vote, authorities can cross compare vote-by-vote using the unique voting session identifier assigned to each voter's voting session and voting record without knowing or being able to ascertain the identity of the individual voter. Such comparison can be to the voting records stored in one of the preferably two independent memories of voting machine VM or to the printed voting record receipt PR of an individual voter, or both, or to the voting records stored on the collected smart cards SC, if utilized. Moreover, such checking and comparison is private, e.g., whether by voting officials, or the public, e.g., via the Internet, because the voting session identifiers are preferably not related to voter identity.

Figure 2:
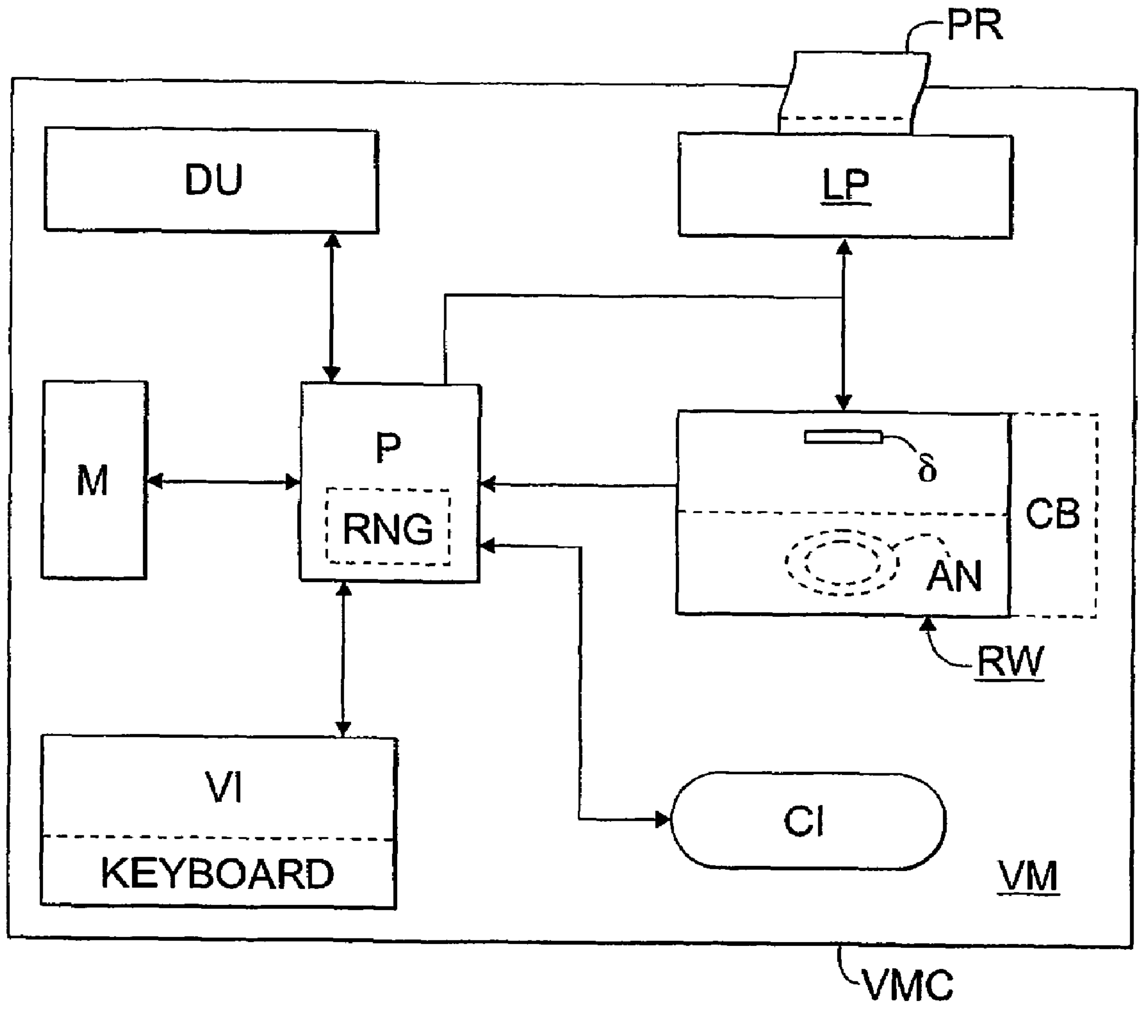
FIG. 2 is a schematic block diagram of voting apparatus according to the invention and utilizing the method of the invention.

FIG. 2 is a schematic block diagram of voting apparatus VM according to the invention and utilizing the method of the invention. Voting machine VM includes a processor P for processing information relative to a voter and/or voting and for providing a voting session identifier, a non/volatile memory M for storing and providing such information, a display unit DU for displaying information to the voter, and a voter interface VI whereby the voter can enter information into voting machine VM for processor P and/or memory M. It is noted that the components of voting machine VM are similar to the components of a personal computer and so a conventional personal computer, with or without modification, may be utilized in voting machine VM, although it is likely that conventional computer components, particularly processor P and memory M, may be utilized in conjunction with displays DU and input devices VI adapted to or customized for the voting machine application, for example, for ruggedness, resistance to tampering and/or abuse. In addition, processor P includes a function for providing unique voting session identifiers for each voting session, for example, a random-number or random-character generator RNG or a look-up table or other suitable generator.

Memory M may also be of any suitable non-volatile memory type. Suitable memory devices include floppy disks, computer hard disk drives, writeable optical disks, memory cards, memory modules and flash memory modules (such as those utilized in electronic cameras), magnetic and optical tapes and disks, as well as semiconductor memories such as non-volatile random-access memory (RAM), programmable read-only memory (PROM), electronically erasable programmable read-only memory (EEPROM) and the like. Memory M or a separate memory contains the operating system, data base and application software that operates processor P as voting machine VM.

Alternatively, various programming information, a voting session identifier generator or list, voting information, candidate and office information and the like may be provided in firmware, such as in an EPROM, which provides additional resistance to tampering and/or hacking attack. Such firmware may be utilized, for example, for controlling the reading and writing of information to optional smart cards SC, the storing of voting record information in memory M, particularly, a specific memory device such as a memory chip card, an optical disk or tape, or other electronic, magnetic or optical media. Preferably, memory M of voting machine VM includes two independent non-volatile memory devices so that voting record information and a voting session identifier are stored on two separate, independent memory devices for redundancy and preservation of at least one copy of the accumulated voting records in the event one of the memory devices fails or otherwise becomes inoperative. Desirably, the two non-volatile memories are of different types, such as a semiconductor memory and a hard disk, or a memory card and an optical disk, or any other convenient combination.

Voter interface VI may be a standard or custom keyboard, as may facilitate write-in voting, or may be dedicated vote buttons or switches similar to conventional mechanical voting machines, for example, or may be a touch-screen interface associated with display unit DU, and is typically connected to processor P via cabling. Special keys can be provided for voting functions such as "Elect" or "Select" or "Vote," or for "Erase" or "Change," or for "Write-in." Alternative voter interfaces VI may include voice recognition apparatus, Braille keyboards or pen systems with writing recognition interfaces, each preferably with confirmation of the data entered displayed on display unit DU or even aurally via headphones. For a "standard" computer keyboard, for example, it is preferred that the "function keys," i.e. those keys that can be used for a purpose other than voting, such as to access and/or control the operating system and other programs, e.g., the F1-F12 keys, be disabled or rendered inoperative, either by software control or physical means.

In addition, a voter interface VI for allowing visually impaired voters to vote without assistance may employ a modified standard keyboard of which only certain keys are responded to in combination with an aural device. E.g., only the four keys (buttons) at the corners of a numeric keypad or the four areas (buttons) in the four corners of a touch screen may be enabled to indicate possible selections such as vote, skip, next, previous, and the like, with audible voice instructions and confirmation of buttons pressed provided via a headphone. A typical function assignment to the corner keys can include: upper right key="repeat" (to hear voice message again), lower right key="Enter" (to make a selection within the allotted time), lower left key="Cast Vote" (and proceed to the next contest), and upper right key="Increase Speed" (to increase the rate at which contests and/or voice indications are presented). Any or all of these functional keys may be exaggerated in size or otherwise made easily distinguished by tactile feel. Such keyboard/button programming is commonly provided by software.

Display unit DU may be of any suitable type, such as a conventional cathode ray tube or computer display, an LCD display, a touch-screen display or other suitable device, for displaying alphanumeric and/or graphical information, or a set of illuminated buttons, as desired, and is typically connected to processor P via cabling. Display unit DU may also include Braille devices, aural information via headphones, or other devices specially suited for people with handicaps.

Operatively associated with or coupled to processor P and memory M are a printer LP for providing a tangible record of the voting session, e.g., a printed paper receipt and an optional smart card reader/writer RW for writing and/or reading information from/to a smart card. Preferably, local printer LP and optional reader/writer RW are built into the physical container VMC of voting machine VM along with processor P, memory or memories M, display DU and voter interface VI, and that physical container VMC is rugged and sealable for security and to prevent unauthorized access to the components therein, thereby being resistant to tampering. Other voting booth components, such as a privacy curtain, the opening and closing mechanism therefor, or a floor stand, need not be part of voting machine container VMC, but may be permanently or demountably attached thereto as is convenient.

Optional smart card reader/writer RW is operatively associated with or coupled to processor P and memory M for writing information including at least a unique voting session identifier and a voting record into the memory of a smart card SC and optionally for reading information, such as voter registration and/or identifying information, from a smart card. Each voting session identifier is a randomly-generated unique identifying or serial number or character sequence (e.g., a pseudo-random number) of at least eight characters or digits, and preferably of 12 or more characters or digits. Such voting session identifiers are generated for each voting session of each election, either centrally and then loaded into memories M of voting machines VM or by processor P as each voter participates in a voting session. It may be desirable for the voting session identifiers to include additional characters identifying voting district and /or the polling place and/or the voting machine VM on which the vote associated with the identifying number was cast, and/or the date and time of the voting session, but not the voter, so as to preserve voter anonymity while providing traceability of voting records. If any information particular to an individual voter is stored in the memory of smart card SC, as may be the case where information confirming voter registration or an identifying PIN number, security code or other personal data is utilized, such information is written over or erased or otherwise rendered permanently unrecoverable either before or at the time that voting record and voting session identifier information is stored in the memory of smart card SC by reader/writer RW of voting machine VM.

If reader/writer RW is a contact-type reader for use with contact-type smart cards, then the smart card SC is inserted into slot S thereof to be read and/or written to. If reader/writer RW is a wireless or contact-less-type reader for use with wireless or contact-less-type smart cards, then the smart card SC is placed proximate to antenna AN of reader/writer RW to be read from and/or written to. If reader/writer RW is of a type for use with both contact-type and wireless or contact-less-type smart cards, then the smart card SC is inserted into slot S if it is a contact-type smart card and is placed proximate to antenna AN if it is a wireless-type smart card, or is either inserted into slot S or is placed proximate antenna AN if it is a so-called "combi-card" that combines both external contacts and an internal antenna so that it can be read from or written to either via contacts or a wireless communication.

Further, while optional smart card encoder RW need only be able to write information to a smart card, it may also read information stored in a smart card SC and provide same to processor P. Reader/writer RW may also be a decoder to decode information read from a smart card SC in encrypted or encoded form, and/or may also be a coder that encrypts or encodes information being written to the smart card SC. Such encryption and/or encoding may use public key encryption or any other suitable encryption and/or coding arrangement. Optionally, and preferably, reader/writer RW may include a "take-in" or capture mechanism that grabs smart card SC when it is inserted into slot S and, after the voting record and voting session identifier information is stored in the memory of smart card SC, deposits smart card SC into a secure collection box CB operatively associated with reader/writer RW and located in voting machine cabinet VMC. If this option is utilized, and it may be utilized with either contact-type or wireless smart cards SC, a separate collection box CB and action by each voter to deposit his or her smart card SC therein is not needed.

Local printer LP provides a tangible independent record of each individual voter's voting selections associated with the voter's unique identifying number. Printer LP is of a type that retains no record of the data printed (e.g., is not a daisy wheel or other printer employing a ribbon or other sheet-type ink source from which information printed may be extracted or reconstructed) such as a thermal printer, a dot matrix printer, an ink-jet printer, a bubble jet printer, a laser printer and the like, which are conventional. A specialty or security-type of paper, or other medium making authentication of a printed receipt easier and counterfeiting of altering of same more difficult, can be utilized, thereby reducing the likelihood of counterfeiting or fraud. Desirably, printer LP also prints information identifying the election district, the date and time of voting and similar information that may help to authenticate printed receipt PR. Example voting receipts are illustrated in FIG. 2A.

Preferably, voting machine VM displays on display DU the voting record of the voter and requires at least one confirmation, and preferably a second confirmation, of by the voter that the displayed voting record is indeed the vote(s) the voter intended to cast, in order to end a voting session. Information as to any offices or questions or referenda with respect to which a vote has not been cast can also be displayed and called to the voter's attention before the voting session is concluded. Upon the voter confirming the voting record, the electronic data thereof is provided to the memory M of voting machine VM and to printer LP to be recorded on the voter's printed receipt with the voter's unique voting session identifier. Where optional smart card reader/writer RW is employed, the same data as is stored in memory M is encoded into the memory of smart card SC. Preferably, the same electronic data provided to display unit DU to be displayed to the voter is communicated to both printer LP and to optional reader/writer RW over a common path so there is certainty of consistency, although this is not necessary as it may be convenient for processor P to provide such electronic data in the particular forms required by a standard card reader/writer RW and a standard printer LP, rather than to provide a customized reader/writer RW and a customized printer LP each having a customized electronic data interface.

"Write-in" ballots can be accommodated by a special entry column that comes after the listing of the named candidates. Any write-in voting can be done through the use of the keyboard or touch screen or other suitable means of data entry associated with voter interface VI and/or display DU. In this case, the "write-in" will typically include the last name along with first name of the person for whom a write-in vote is being cast, and, optionally, a middle name or initial, as is required by law and is common in conventional write in voting. The tabulation of write-in votes can be done manually or through processor P utilizing the same data base and polling software that records non-write-in votes, or by any other suitable methods and means.

The preferred VOTE-TRAKKER™ voting system and apparatus as illustrated by FIGS. 1B and 2 provides at least double redundancy for voting record and voting session identifier data in that each vote is recorded by at least two independent and verifiable means: to wit, by electronic recording in one or more electronic memories included in each voting machine, and by a confirmatory printed or other tangible record provided to each individual voter. Desirably, the preferred VOTE-TRAKKER™ voting system and apparatus as illustrated by FIGS. 1A and 2 provides triple redundancy for voting record and voting session identifier data in that each vote is recorded by at least one additional independent and verifiable means: to wit, by electronic recording in the memory of a smart card separate from the voting machine and the printed record. This apparatus, and the process and method it performs, can provide 100% transparency of each and every vote and can maintain 100% privacy and confidentiality of each and every voter and vote, although embodiments including the invention may not do so.

Figure 3:
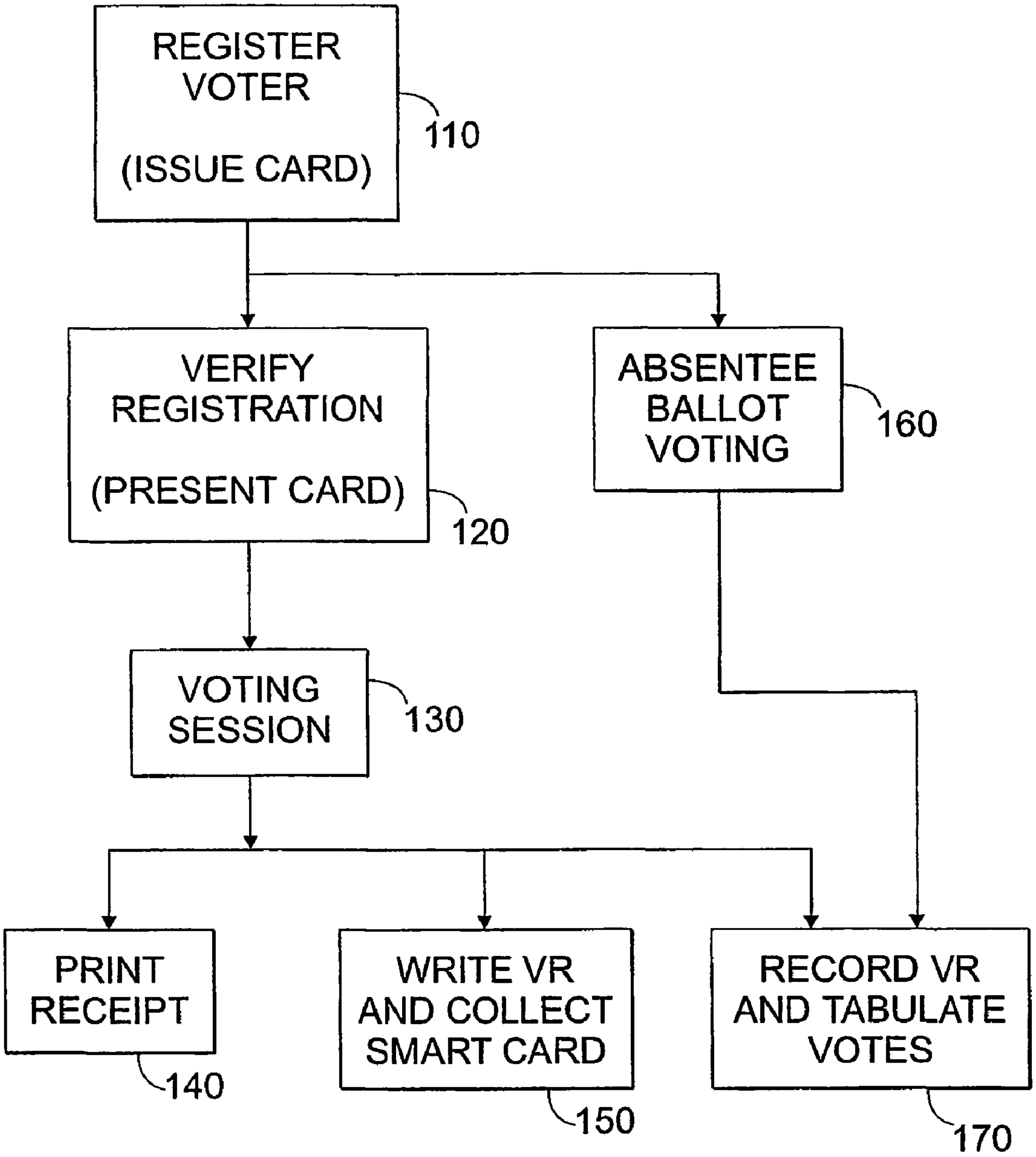
FIG. 3 is a schematic flow diagram illustrating the voting method according to the invention.

FIG. 3 is a schematic flow diagram illustrating the voting method 100 according to the invention. A voter registers to vote 110 and during the appointed times for voting, presents appropriate identification at the polling place so that his or her voter registration is verified 120 in accordance with the applicable law and procedure. Having properly done so, the voter is authorized to vote by the election officials and utilizes the voting machine provided for having a voting session 130 during which the voter makes his or her voting selections. As part of the voting session 130, a unique voting session identifier as described herein is provided for each voter and is associated with the voting record of that voting session which represents the voting selections made by the voter.

If an optional smart card or secured identity card is utilized, it is provided to each voter to serve as identification of the voter and proof of registration to vote. Each smart card is encoded with at least a specific assigned unique voter identifying number of at least eight digits, and preferably at least 12 digits, for tracking and future reference, and smart cards for a particular election and polling place may also include the same particular security code or identifier that cannot be changed and that identifies the authorized polling location and election for which the smart card is valid. Each voter's smart card is utilized at the end of that voter's voting session 130 to record that specific voter's voting choices (voting record) and voting session identifier for subsequent use, if necessary, in recounting or verifying the votes cast, or for other challenges to the voting process. The voting record and/or voting session identifier is preferably written over any information such as a voter identification number that if not rendered unreadable would or could be utilized to ascertain from the smart card the identity of the particular voter who used it to vote. Optionally, an electronic marker, which may be the voting record or voting session identifier or any part thereof, is written into the memory of the smart card when it is utilized to cast a vote, to avoid its use for more than one voting session. Because the smart card includes a read/write memory, it may be erased and thus be recycled and reused for subsequent elections.

If utilized, a secured memory or processor chip card (or tag), i.e. a smart card, is issued 110 to each registered voter before the time for voting, i.e. prior to commencement of the period during which voters may cast their votes or at registration. A secured memory or smart card with an embedded electronic integrated circuit (IC) having substantial memory capacity, for example, over 1 kilobyte of memory, is preferred. For example, types SLE4442 or SLE4428 memory ICs available from Siemens, or other suitable equivalent, may be utilized. This memory bank IC is used for storing the voter's identifying number (ID) and the election/polling place security code before the card is used to vote, and after being used in a voting session stores the voter's voting selections, i.e. a voting record, and the voting session identifier, for subsequent recount, if necessary. The secured memory card should be issued anew with a new suitable and specific "Personal Security Code" or other unique identifying number for each election, for the purpose of providing a high level of security. Voting district or other political sub-divisional information, or other personal or social data, such as the voter's name, address, height and weight, eye and hair color, sex, birth date and age, a digitized photo, and the like, may also be stored in other portions of the smart card memory and may be utilized for providing a more secure election and election records as well as a improved identification of the voter, however, such information is preferably erased or otherwise rendered unreadable when the card is utilized in a voting session so as to preserve the voter's anonymity.

On election day, if the optional smart card is utilized, each registered voter presents 120 the pre-issued smart card with appropriate identification, if required, to the election officials at the polling place. A smart card reader may be utilized to verify the identity of the voter (i.e. of the person to whom the particular smart card was issued) and the validity of the smart card, as for confirming proof of identity. This optional verification and confirmation may be performed prior to the voter entering the voting booth or in the voting booth by the voting apparatus thereof, either by comparison to registration and/or personal information previously stored in the memory M of the voting machine VM or by communication link to a computer having a memory containing such information.

The voter now enters the voting booth or voting apparatus in order to vote 130. The voting session generally includes inserting the optional smart card, if utilized, into the voting apparatus, optionally verifying the voter's registration to vote, the voter making his or her voting selections, and the voter confirming the voting selections to end the voting session and establish the voting record of such selections. Specifically, the voter may enter an identifying number or may insert the smart card into the voting booth smart card reader to initiate a voting session 130. Based upon the information entered or read from the smart card, the voting apparatus through the voting system, may optionally make comparison of such information with official registration information. If the voter is correctly and properly registered to vote and if the information and/or smart card is proven valid, voting information will appear on a display screen of the voting apparatus for voter selection and voting. Voting information may appear at one time for all offices, referenda, public questions and the like, or may be presented to the voter sequentially one office or question at a time. Once the voter makes a selection, the selection may continue to appear on a portion of display screen, e.g., with highlighting, while other selections are made or are made available one category at a time.

Once the voter has responded to all selections, the selections made will appear on the display screen for easy verification. If desiring to change any selection, either because a mistake has been made or he or she has changed his or her mind, the voter may select a "change button" to repeat a selection of a particular category or may select a "start-over button" to start the whole voting process again or may simply press the same button as previously pressed to make a selection to un-make that selection. The change and/or start-over buttons may be used at any time during the voting session, or at the end of making selections, and the button(s) may be physical buttons or touch zones on a touch screen display. If the voter confirms the selections by selecting a "confirmation" button or "confirmation" area on a touch-screen, the voting session is ended and the voting record and the voting session identifier generated by the voting machine are stored 170 in the non-volatile memory of the voting machine. If desired, a second confirmation could also be utilized. The same voting record and voting session identifier are also transferred 170 to a central computer via a local area network within the voting facility or at a central voting facility, either as each voter completes a voting session or at the end of the voting period, as desired. Continuous connection to a location outside the voting facility should be avoided to prevent and/or reduce the likelihood of computer hacking or other outside attack on voting information.

Substantially contemporaneously with termination of the voting session, the same voting record and associated voting session identifier as are stored in the voting machine non-volatile memory are also written 140 to a tangible record, i.e. a printed copy for ease of voter verification of the vote as recorded. The voter may keep the printed record for his/her own reference. The voting records of the voting sessions are tabulated or tallied 170 at the conclusion of the voting period for voting.

If the optional smart card is utilized, the same voting record and associated voting session identifier as are stored in the voting machine non-volatile memory are also written 150 to the memory of the smart card. After confirming his or her vote at the end of the voting session, if the voting apparatus does not automatically collect 150 the smart card, the voter is required to deposit 150 the smart card into a secure collection container before leaving the voting area. The smart cards containing the voting records of each specific voter are used for recounting 170 if the voting is challenged, and provide a separate and independent record of the voting records for such purpose. Once the election is over and the result officially certified, the information written to the smart card memory can be erased and, if desired, the smart card can be "recycled" for subsequent usage, e.g., in a later election.

Once the vote selections are confirmed, the voter is finished voting and the printed or other tangible record is made 140. If the law allows, however, the invention provides a safeguarded way for the voter to correct or change his or her vote, at least if the smart card, if utilized, has not yet been collected 150. A voter who realizes he or she has made a mistake or who has a change of heart regarding his or her vote may call upon an official in charge of the election for help to void or erase the previously cast voting record and to start his or her voting session over. Preferably, the voting record of the second (correction) voting session is recorded along with the voided voting record from the first voting session and the respective voting session identifiers for both the original voting session and the corrective voting session. The voided voting record from the first voting session is not actually erased, but is retained in the voting apparatus and is not counted in the vote tabulation, along with identifying information read from a smart identification or control card issued to the election official who authorizes the corrective voting session.

To enable the voting apparatus and system for such corrective voting session, the election official must insert his control card along with the voter's voted smart card, if utilized, to select and void the voting record already stored in the computer memory to remove it from the voting records to be tallied, and to allow the voter to repeat the voting process. The changed voting record is stored in a separate data base for use in constructing a history of the voting record, along with the voting session identifier and the identifying information from the election official's smart card.

In addition to the voting records of an election, the respective tabulations and tallies thereof may also include the voters' unique voting session identifiers for ease of inspection of voting records by the voter for confirming their accuracy. Such tabulated voting records serve as a public right-to-know record as well as maintaining the secrecy of voter's choice because only the voter knows his unique voting session identifier. If desired, demographic and other social data and the voter's corresponding choices may also be tallied as part of the voting record, if useful and allowed by the voting law and regulations, recognizing that such information is generally irrelevant under systems of law as in the United States and its maintenance derogates privacy.

A suitable relational data base, such as "Access" available from Microsoft Corporation or "Oracle" available from Oracle Corporation, may be utilized to record and tabulate voting records, depending on the size and complexity of the data being sought after. For most elections involving a population or political sub-division of less than about 10,000,000 people, a simple Microsoft Access data base may be adequate. Database software and other computer programs may be provided as firmware so as to better secure the programming and to reduce or eliminate the possibility of tampering.

For absentee voting 160, voters may request a voting registration number or smart card in advance of the election similarly to the timing for conventional absentee ballots. Absentees may vote in any compatible specially designated voting booth that may be located in any convenient location so long as it is under the necessary control as required by the voting law, e.g., under personal control of a state election official. Because demographic information, such as the voter's home address and voting district, may be stored in the smart card along with other voting information, such designated smart card voting machine may be utilized by voters from different voting districts, different counties, or even different states, if desired. For example, a smart card voting machine could be located on a military base or in an embassy or consulate in a foreign country for use by armed forces, embassy and civilian personnel assigned to the base, embassy or consulate, as well as by their authorized dependents.

Alternatively, absentee voters may use the traditional mail-in paper ballot in the conventional manner, with or without an officially-issued smart card for processing the absentee ballot. One or more election officials having one or more "official's cards" will insert such official's smart cards into the voting machine and cast a vote as prescribed by the paper absentee ballot for such person following exactly the same voting process as described above. The voting record and voting session number for each such absentee voting session, which include information from the official cards identifying the official entering the absentee voter's vote, are stored in a separate data base and are tabulated with the voting records from the standard voting 120-150. As a result, any subsequent challenge or recount can be easily monitored with detailed voting records of absentee votes and regular votes.

Figure 4:
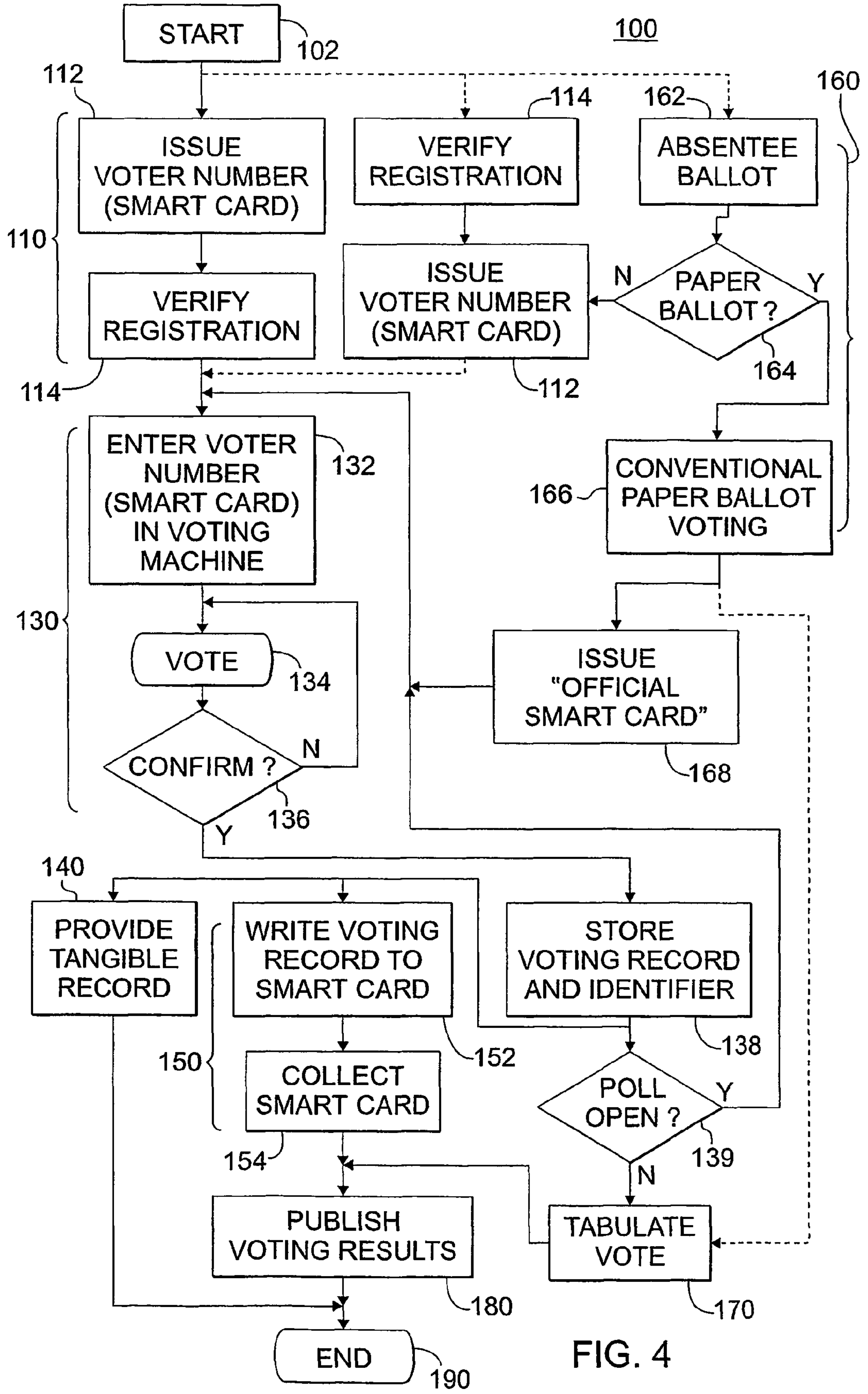
FIG. 4 is a schematic flow diagram illustrating the voting method according to the invention in greater detail.

FIG. 4 is a schematic flow diagram illustrating the voting method 100 according to the invention in greater detail. Although FIG. 4 illustrates the utilization of an optional smart card, it is understood that the method of FIG. 4 may be practiced with or without a smart card. Initially 102, the voter presents proof of citizenship and residence as is necessary for registration to vote, and alternatively, satisfies any other requirements for registration for voting and issuing 110 of a voter registration. If smart cards are utilized, the voter could be issued a smart card at this time or prior to the election, as is desired. Such registration may include, for example, connection and providing of information through a local area network with the computer that will ultimately be tabulating the voting along with the voters' unique identifying (serial) number, i.e. registration number, so that eventually, voter registrations are recorded on the central computer for the verification 114 of voter registration and/or ultimately, during and/or after an election, the storing/recording 138 of voting results. The stored voting results include but are not limited to each voter's voting record and voting session identifier, i.e. unique identifying character sets, which may be published 180 or/and posted in public location and/or posted 180 on a special election web site for examination by the voters and others of the public.

Election officials may issue a unique voter-identifying serial number or registration number or voter number for the registered voter, or a voter card or "voting ticket" with the voter's personal data thereon for verification 114 of voter identity. An election official may type in the serial or other number of the registered voter to verify 114 registration before allowing the voter to vote. This verification module may be linked to a registration data base that is separate from the voting machine, such as in a central election computer. The election official then issues 112 to the voter an authorization to vote. If smart cards are utilized, such authorization may include a chip card or smart card with the same unique identifying serial number and personal identification data (e.g., similar data to that of driver license for ease of verification by the voting attendant or election official). Alternatively, any other suitable verification criteria, including signature comparison, driver's license identification or the like, may be utilized to authenticate 114 the voter's registration, in accordance with the applicable election law and voting procedure, and to issue 112 a voting authorization and/or smart card to the voter.

If utilized and alternatively, a chip card (i.e. smart card) is issued 112 to the voter with a unique identifying serial or registration number and, optionally, personal identification data (e.g., similar data to that of driver license) for ease of verification by the voting attendant or election official. The voter takes the smart card to the polling place, verifies registration 114 and then inserts the chip card into the smart card reader/writer of the voting machine to activate 132 the voting machine to initiate and engage in a voting session. Alternatively, the voter may insert the chip card into the smart card reader/writer of the voting machine to verify 114 registration to vote and activate 132 the voting machine to initiate a voting session. It is noted that while the chip card or smart card is preferably used as a repository of a separate voting record electronic file, its use is optional depending on the level of voting record redundancy required and/or desired.

The next step is for the voter to vote 130. The voter initiates 132 a voting session, such as by pressing a button, by moving a lever or handle or switch, or by entering an identifying number, personal security code (PSC), personal identifying number (PIN) or the like. If a smart card is utilized, inserting the chip card can activate the voting machine to begin/initiate a voting session 134. The voter votes 134 by making selections for election of the candidates for different posts or offices, and/or for public questions, constitutional amendments and the like. Alternatively, the voter can elect to make a write-in entry for a candidate not listed on the predetermined ballot. Suitable means of voting data entry include but are not limited to a touch-screen, a "point-of-sale"-type special keypad, a standard keyboard, voice-recognition, a specialty keyboard for handicapped persons (e.g., a Braille keyboard for the blind).

Before a voting session is completed, the voter confirms 136 the voting selections he has made. If the voter does not confirm 136 his selections (path "N"), the voting machine allows him to change his selections and/or make additional selections. If the voter confirms 136 his selections (path "Y"), the voting session is complete and the voting record along with a unique voting session identifier generated by the voting machine are stored 138 in the memory devices of the voting machine and are also provided to produce 150, 140 at least one separate tangible record of the voting session. A printer is utilized to provide 140 a tangible printed receipt including at least the voting record and voting session identifier, and may also include election and voting information such as date, time and polling place location. Where smart cards are employed, at least the voting record along with the unique voting session identifier is also provided 152 the smart card reader/writing device to be stored in the smart card which is collected 154. The "raw" voting records are preferably stored 138 within the voting machine by suitable means of electronic data storage that are redundant so as to provide a stored voting record and voting session identifier that are separate from and will be available as a back-up to the computer storage thereof. The stored 138 voting record data is available anytime later, should it be needed, as for a recount or challenge.

The tangible receipt device provides 140 a tangible receipt such as a printed receipt. The smart card reader/writer erases personal data, if any, stored on the voter's smart card and encodes 152 the voters selections 134 and voting session identifier on the card memory for future use, such as for electronic recounts. The smart card is collected 154, either automatically by the card reader/writer or by the voter depositing the smart card into a secure collection box. The voting machine memory as well as both the printed receipt and the encoded information stored in the smart card include the same voting session identifier which is a serial number as issued by the voting machine or a randomly generated unique identifying serial number generated from a defined set that is associated with the particular voting record if absolute privacy is preferred. The voting session identifier or serial number may include identification of state, county, precinct, or other appropriate political sub-division, along with the random portion of serial number assigned to assure privacy, such as is illustrated in FIG. 2A. The time and/or date of voting may also be optionally recorded on the printed receipt and in the voting record stored in the voting machine, the smart card, or both, for future inspection and/or verification.

If the period for voting has not ended, the poll open test 139 is affirmative (path "Y") and the voting machine is available to the next voter. If not, the voting machine accepts no further voters (path "N") and the vote is tabulated 170. The determination of poll open or not may be by local timer, voting official deactivation of the voting machine or signaling from a central election location and/or computer.

The confirmed 136 voter selections are tabulated 170, for example, via a local area network connection to a computer for tabulating the voting along with the voters' identifying serial numbers. Eventually voting records are tallied 170 along with the voters' voting session identifiers or serial numbers, and can be published 180 for examination by the voters or other members of the public. Such publication 180 may include distribution of printed copies and/or posting copies in a public location or on a special election web site on the Internet. The voting process ends 190 when the voting records are tabulated and the election results are certified or otherwise made official and final in accordance with the election law.

Absentee voting is provided 160 by conventional paper ballot 166 or by smart card issuance 168, as is desired. An absentee ballot is requested 162 and election officials determine 164 (or have predetermined) whether a conventional paper ballot or an optional smart card should be issued. If a paper absentee ballot is not to be utilized (path "N"), a smart card is issued 112 and the voter utilizes the smart cord to vote 130 as described above, for example, although the authorized voting machine may be in the voting district or remote from the voting district, as described above, or the voting 130 may be performed in advance of or at a different time from the normal election day voting period.

Figure 4A:
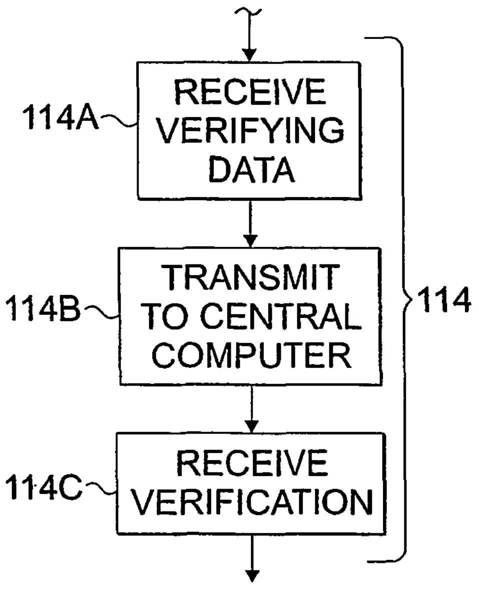
FIGS. 4A-4D are schematic flow diagrams illustrating further details and alternatives for the voting method of FIGS. 3 and 4.

FIGS. 4A-4D are schematic flow diagrams illustrating further details and alternatives for the voting method 100 of FIGS. 3 and 4. FIG. 4A illustrates an alternative to on-site verification 114 of voter registration by the election officials presiding at that place. The officials or a data entry device at the polling place receives 114A verifying data from the voter and that data is transmitted 114B to a central computer in which resides files identifying properly registered voters. The central computer checks the voter's data to verify registration to vote and provides 114C verification of registration to the polling place. If smart cards are utilized, verification 114 may be before or after issuance 112 of a smart card to the voter.

Figure 4B:
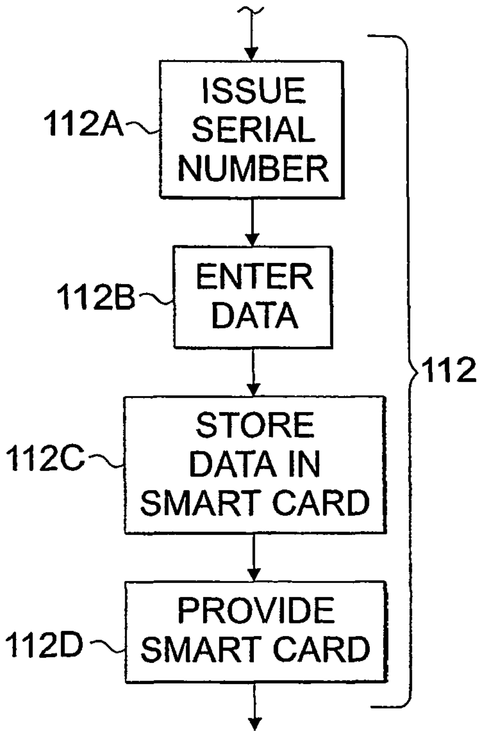

FIG. 4B illustrates alternative steps for issuing 112 an optional smart card in which a unique voter identification number is issued 112A and then voter data is entered 112B into the voting system. The data entered is stored 112C in the memory of the smart card and the smart card containing such data is then provided 112D to the voter, who may thereafter utilize it for verifying registration and/or in voting.

Figure 4C:
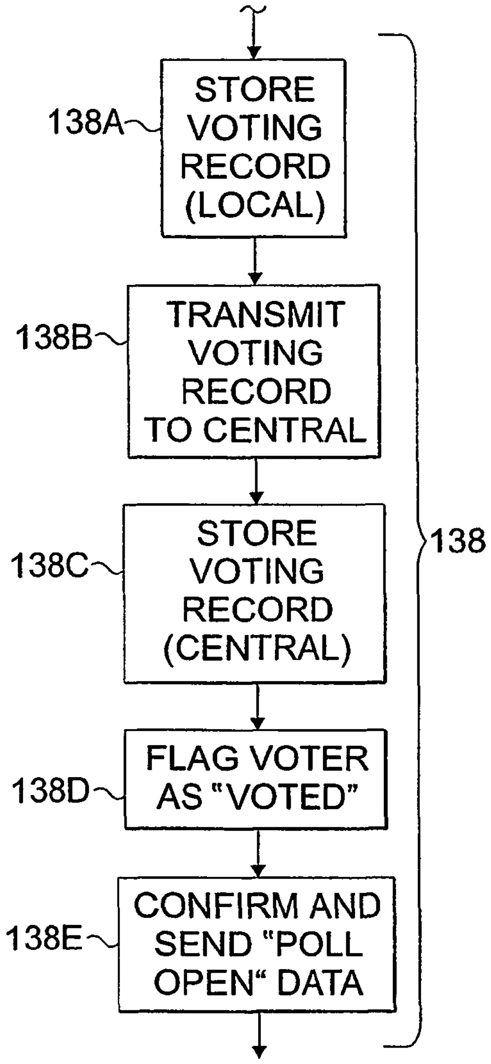

FIG. 4C illustrates alternative steps for storing 138 voting record and voting session identifier information at the conclusion of a voting session. When the voter has confirmed 136 his voting selections, the voting record thereof and the voter's voting session identifier are stored 138A in the memory device or devices of the voting machine, i.e. locally, and are also transmitted 138B to a central election computer. The central computer stores 138C the voting record and voting session identifier and also "flags" or marks 138D the registration record of that voter to indicate that the voter has voted in the election. Optionally, the central computer may confirm 138E to the voting machine computer that the voting record has been centrally stored and/or confirm 138E that the polls are still open to enable voting by additional voters. One advantage of this arrangement is that by marking the voter's registration to indicate that the voter has voted, further attempts by the voter to vote will be rejected, thereby eliminating any voter voting more than once. Thus the old cynical saw, "Vote early, vote often," can no longer be applicable.

Figure 4D:
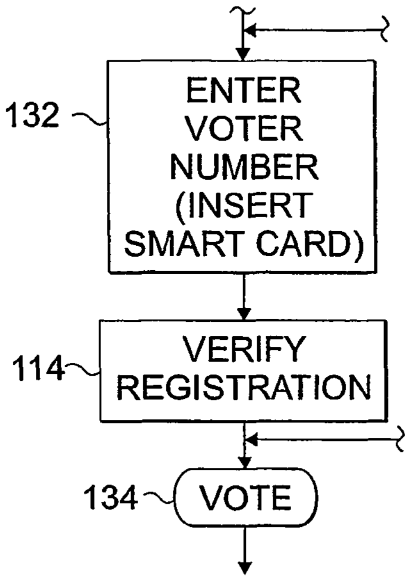

FIG. 4D illustrates alternative steps for verifying voter registration as part of each voter's voting session. In voting 130, the voter enters 132 his voter identification information or inserts 132 his smart card into the voting machine to open it for voting. Before the voting machine opens for voting 134, the voter's registration is verified 114, either by reference to registration data stored in the voting machine or via central verification 114 of the sort described in relation to FIG. 4A. A voting session is initiated only if and when the registration is verified 114.

The present invention can be embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the invention. Storage media for containing such computer program include, for example, floppy disks and diskettes, compact disks (CD)-ROMs (whether or not writeable), DVD digital disks, RAM and ROM memories, computer hard drives and back-up drives, and any other storage medium readable by a computer. The invention can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the invention. The invention may be implemented on a general purpose microprocessor or on a digital processor specifically configured to practice the invention. When a general-purpose microprocessor is employed, the computer program code configures the circuitry of the microprocessor to create specific logic circuit arrangements.

Accordingly, the voting system and method of the invention may be provided on such computer storage media for causing voting apparatus to operate responsive thereto in performing the invention. While the voting device utilized by the voter is referred to herein as a "voting machine," the voting machine is not wholly mechanical but is partially or wholly controlled and operated by a computer or processor. Thus, the invention may be implemented by providing an appropriate computer program to an existing voting machine or apparatus, such as in the form of a read-only memory device or module or other firmware, a floppy disk or other magnetic media, and CD-ROM or other optical media and the like, or by a communication utilizing an electronic and/or optical communication path.

Voter Registration and Smart Card Issuing: Similarly to the current voter registration process, each individual voter is mailed a voting ballot sample that reflects the actual voting ballot to be utilized in the official election. A smart card is encoded with a unique serial number, such as a voter identifying number, and is issued for each individual voter. This serial number has at least enough digits for representing the voting population, e.g., at least 8 digits, and preferably 9 or more digits, e.g., for anonymity. If the set of unique serial numbers may be utilized as voting session numbers, which is not preferred, the numbers should be independently generated anew for each election, and should not be related to the voter's traceable numbers, such as social security number, telephone number, address and the like. It should be used by and only be traceable, if at all, at the voter registration office, i.e. by election officials, and should be strictly controlled for security and protection of voter privacy.

Optionally, information regarding each voting district can be encoded into the smart card with another set of numbers that represent such district and its political sub-division, such as voting precinct or other specific voting related information. The serial numbers may be optionally published, for example, with the vote tallies and records of each individual voter's choice associated only with the anonymous voter's serial number (voting session identifier) may be posted in the Internet for absolute transparency of voting records and yet maintain the privacy and confidentiality of each voter's choices. Any dispute or challenge to any particular voting record, if permitted, must be made with the printed receipt that the voter was issued at completion of the voting session and is retained for verification, because the voter's printed receipt contains the same voting record and unique identifying number (voting session identifier) with which the voter's smart card was been encoded. The voting record stored in the smart card and printed on the voter's receipt may also include the date and time of voting and/or the identity of the polling place, voting district and voting machine, as desired. The medium on which the printed receipt is printed may have security indicia or other authentication or security features, if desired.

After the voting result has been certified and the time for challenge of the correctness of the election has passed, the information stored in the smart cards may be erased and the smart cards recycled for the next election. Each election should use a different identifying number or special personal security code (PSC) for each voter that cannot be modified easily without knowing the original code, which is known only to the election officials, and thus no confusion will ever occur, e.g., between voters in any one election or between voters in different elections.

The unique serial number assignment for each voter and the electronic record of the voting which includes the fact that particular serial numbers have been used to vote can, e.g., if utilized to verify eligibility to vote at the beginning of each voting session, eliminate any possible double voting or unauthorized voting.

If the smart card is mailed to the voter and is claimed to be lost, a separate replacement smart card may be issued to the voter at the election site, similar to the so-called "provisional" ballot utilized in some voting districts. The lost smart card serial number will be noted, and, optionally and preferably, may also be voided for the purpose of the present election.

More security and control may be exercised where the issuing of replacement smart cards is made only with two election officials inserting their special election officer smart cards to enable the issuance of the voter's replacement smart card. The record of issuance of a replacement smart card will be listed as a separate record in the voting records stored in the voting machine and/or the central voting computer for ease of inspection and verification.

Specialty voters such as the "domestic absentee" and "overseas absentee" are issued specially serialized paper ballots and optionally, corresponding smart cards. Their votes will be made on the paper ballot and mailed back to the respective voting district or other proper election authority. Alternatively, the same smart card electronic voting facilities as are utilized in the home election districts may be made available at dedicated places outside such districts. For example, special voting locations can be made available such as at a local consulate or embassy of the country, and citizens in that place during the time for voting may vote there utilizing the absentee smart card received by mail.

If serialized paper ballots are used along with the serialized smart cards, the actual voting tally may be made with appropriately secured and supervised official tabulation at the voting district. The same voting and tabulation process as described above may be utilized, and the same transparent voting records are also available for the voter's inspection, e.g., via the Internet. Ballots voided for whatever reason may also be likewise posted for the same transparency.

Off-site and/or off-day voting may also be permitted. If the local or national laws allow, voting machines may be placed at locations other then the conventional polling centers. These sites may include police stations, post offices, schools, banks, and other suitable public locations with reasonable supervision and assistance to the voters. The voting can be done anytime, including days other than the general voting date, and could be for an extended period, e.g., for one or two weeks. The votes so cast will be verified and approved if the voter's smart card (chip-card) has been returned (collected) and the voting record stored therein matches when compared with the voting record stored in the voting equipment and/or the optional central computer.

Electronic Re-Counting: If the electronic tallies of voters' choices as produced from the voting records stored in the voting machines is ever challenged, the optional collected smart cards may be read and easily tallied again for comparison, either as to accumulated voting results or on a vote-by-vote basis using the unique identifying number (voting session identifier). In fact, if desired, the collected smart cards may be read and counted after the electronic tallying to verify the accuracy of the voting machine results. If any smart cards are missing (e.g., not collected or lost), they can either be readily verified for the record from the voting records stored in the voting machine or the vote can be disqualified.

If there is any challenge or discrepancy claimed by any voter, the challenged vote can be compared with the printed receipt that must be presented by the voter for making such claim which includes the specific serial number (voting session identifier) and the voter's choices corresponding to those stored in the respective memories of the optional smart card and/or the voting machine. The electronic voting records can be easily tallied and listed, and corrected, if appropriate, and may be published and or posted via the Internet to ensure the absolute transparency of the voting. Where the receipt is collected, the collected receipt may be used for recounting the votes. Where the voter receipt includes an indicia of voting, the voter's unique voting session identifier can be used to access the voter's voting record.

It is noted that the smart card can be read accurately almost 100% of the time and can be essentially absolutely error free. Conventional error reduction techniques such as comparison of multiple readings and error checking codes, or both, may be employed as is convenient and desirable.

It is preferable that the voting machine be able to automatically take-in the smart card (chip card) once the voter is finished voting. In the case where a semi-manual voting machine is used, e.g., where the voter is required to deposit his smart card in a locked collection box after voting, it may be required that if the smart card is not returned, the validity of the vote is lost, i.e. the vote may or may not count, depending on the law. Alternatively, the voting machine can be programmed so that the return of the voter's smart card must be made before the next voter can use the voting machine, e.g. as part of a double checking process for collecting smart cards. Once the voting time is over, the electronic tally of voting is immediately available for each district from the voting machine(s) thereof and may be transmitted electronically to an election headquarters or other facility for making a total tally of the voting. Voting tallies may include the serial number (voting session identifier) of each voter for absolute transparency.

Smart cards utilized in voting are to be locked up and kept under security similar to that utilized for conventional paper ballots today. They can be automatically read and counted or recounted using an automatic smart card encoder unit or a smart card printer-encoder or reader such as those available from Fargo Electronics, Inc. located in Eden Prairie, Minnesota, or from Atlantek, Inc. located in Wakefield, R.I., or from Avante International Technology located in Princeton, N.J.

Alternative Media for Paper Ballot Replacement: The use of smart cards as part of the voting process can dramatically help to eliminate any doubt about the validity of the vote and the voting result, and is a great improvement over current election processes, especially those relying on paper ballots and punch card ballots. Instead of recording the voting record on an individual smart card that is mailed to the voter, the smart card may be utilized at the voting sites only. In that case, the unique serial number (voting session identifier) for each voter is generated and/or assigned during the voting process, e.g., by the voting machine during a voting session, with the voting record printed receipt having the same identifier for absolute transparency.

Alternatively, the individual voting record may be stored in the non-volatile memory built-in within the smart card (chip card) reader/writer, or alternatively, in the hard disk of the computer within the voting machine, preferably with built-in redundancy such as a parallel processor and/or non-volatile memory, or a combination of the above. In any case, the voting data should be stored as individual voter records associated with the voter's unique identifying serial number (voting session identifier) rather than as total or tally only. Also alternatively, the individual voting records may be stored in any other suitable electronic media, optical media, or even electronically or optically readable media printed on paper, as may be convenient, both within the voting machine or in the smart card.

Figure 5:
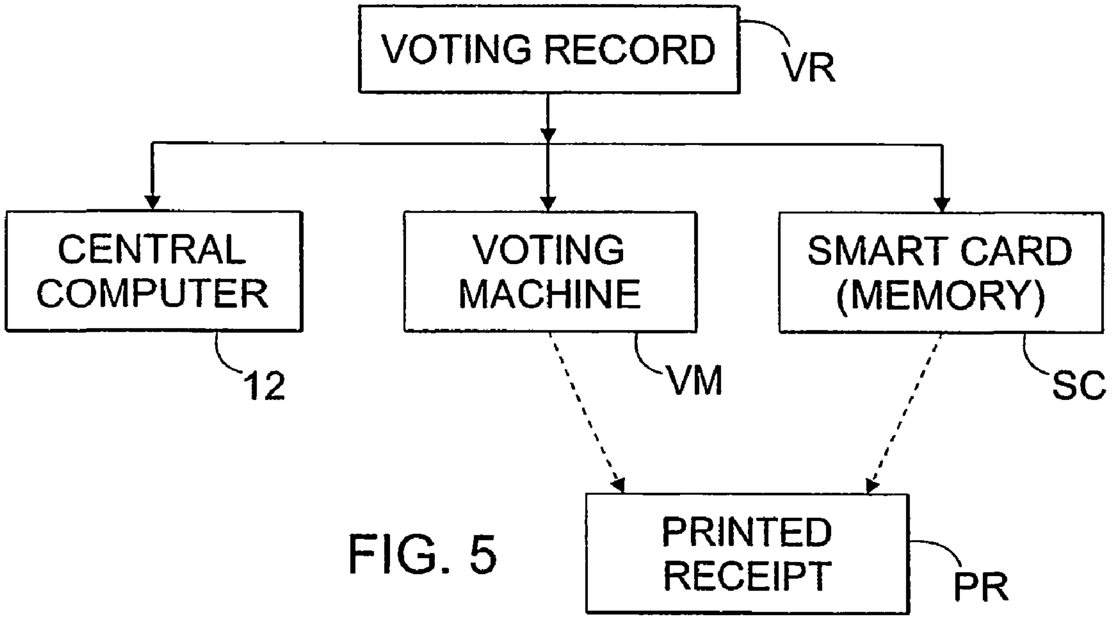
FIG. 5 is a schematic diagram illustrating a redundancy feature of the invention.

FIG. 5 is a schematic diagram illustrating a redundancy feature of the invention which includes triple voting record storage to ensure redundancy and security. Each voting record VR is produced by a voter making voting selections during a voting session and includes those selections as well as the unique identifying number (voting session identifier) issued to that voter. Voting record VR and the voting session identifier associated therewith are stored in three independent and separate memories: at least one (and preferably more than one) in central computer 12, at least one (and preferably more than one) in voting machine VM and one in optional smart card SC. Optionally, information relating to the voting session, such as the date and time of voting, the voting district and polling place, and the like may be associated with each voting record in any one or more of the separate memories and on the tangible receipt, as may be desired.

Computer 12 is typically linked to plural or multiple voting machines VM. Each of the voting records VR and voting session identifiers from each of the voting machines VM is down-loaded to computer 12 either immediately after each voting session or at the close of the voting period, such as via a conventional RS485 or RS232 electronic interface. The voting records VR and voting session identifiers are stored and tabulated by computer 12, such as by a relational data base such as "Access" or "Oracle" or Microsoft "QSL Server." The tallies are eventually combined at the election headquarters or other official election site, i.e. usually where computer 12 is located. Voting records, voting session identifiers, and tallies thereof are made public with reference to each voter's randomly generated serial number (voting session identifier) for 100% transparency of the voting.

Voting machine VM includes an independent memory storage device for storing for the raw voting data and the respective voter's serial number (voting session identifier) associated therewith. Preferably, voting machine VM includes at least two separate non-volatile memory devices so that the integrity of the stored voting records is maintained even if one of the memory devices should malfunction, fail, or be tampered with. Each of the voting records VR is also transmitted to the computer 12.

A printer or other device outputs a tangible record PR of the voting record VR that includes the information that is stored in and resides in the voting machine and in optional chip card SC. The printed-out receipt PR is retained by the voter for reference and for checking his or her vote against the final posted voting tallies which include the voters' identifying numbers (voting session identifier). The printed-out receipt PR typically includes, for example, the voter's unique randomly generated serial number (voting session identifier), the voter's voting choices (voting record or indicia), the time of voting, and other relevant data.

In addition, the same voting record VR and voter identifying number (voting session identifier) is optionally also recorded in the memory of smart card SC, i.e. using the chip card SC as a third separate and independent medium of storage. Each smart card SC represents one voting record VR and voting session identifier stored therein that can be electronically read even if the voting records stored in both computer 12 and voting machine VM are lost or corrupted for whatever reason, or if the election results need to be recounted or are challenged. Note that chip card SC stores an individual voting record VR including, for example, the voter's unique randomly generated serial number (voting session identifier), the voter's voting choices, the time of voting, and other relevant data.

Figure 6:
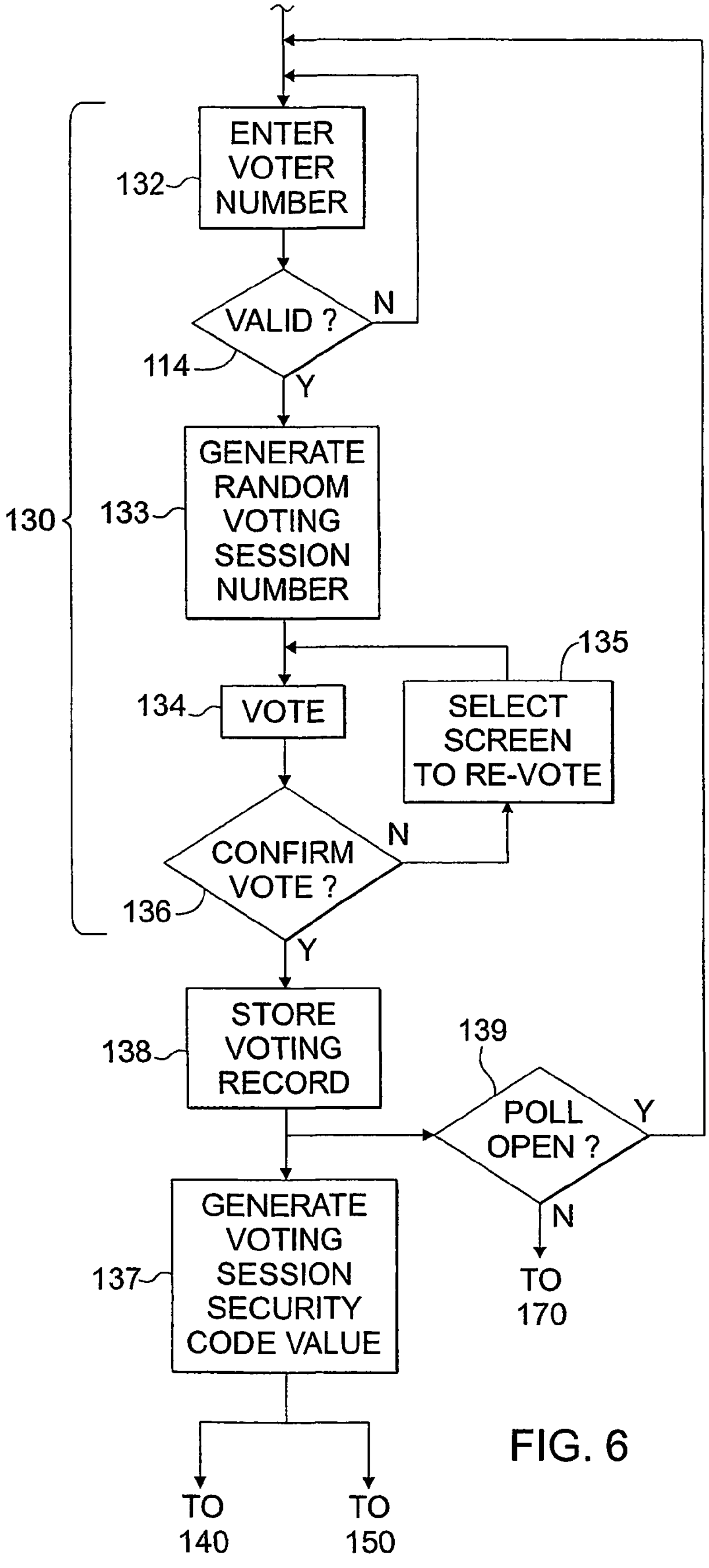
FIG. 6 is a schematic flow diagram illustrating details of the example voting session of FIG. 4.

FIG. 6 is a schematic flow diagram illustrating details of example voting session 130 of FIG. 4 including certain features for making the voting session more "voter friendly" while also satisfying the requirements of election law and the needs of election officials. In general, each voting session 130 comprises the presentation of a series or sequence of screens or pages of voting information to the voter, wherein each voting screen or page includes instructions or other procedural information and/or an array of voting objects from among which the voter makes a selection, i.e. votes. Each voting screen requires a response, whether it is a vote for a candidate or a response to a question, or is merely a response to proceed to the next screen. Typically, each voting screen will include a display of voting objects, e.g., candidates for a particular office, associated with specific touch zones on a touch screen display so that a vote is cast by touching the touch zone associated with the candidate for which the voter desires to cast a vote. Alternatively and/or additionally, a voting screen may present voting objects such as choices regarding a public question, issue, referendum, constitutional amendment, bonding proposal, voter initiative or any other question put before the voters, and selections, e.g., "Yes" or "No" or "For" or "Against," are made by touching touch zones associated with the desired selection.

Among these features is the inclusion of a mandatory voting requirement for each voting screen or page so that the voter must make a selection from among the choices offered, one of which is "No Vote" or "Abstain" or "Skip Contest." As a result, the voter is forced to respond to each voting screen so that the number of votes cast regarding each office or question must equal the number of voters voting, i.e. the number of voting sessions, thereby eliminating both under-voting and over-voting. An additional feature, which is optional but is preferred, is that each screen or page display on a first portion of the screen a voting screen as previously described and on a second portion of the screen a cumulative record of the votes already cast by the voter during the present voting session. Thus, the correct recording of the voter's selection is immediately confirmed visually in the cumulation voting record displayed in screen portion 210. Typically, the voting screen from which a voting selection is to be made is displayed on one portion of the touch screen display, e.g., the right-hand portion, and the cumulative voting record is displayed on the other portion thereof, e.g., the left-hand portion, as illustrated by the example voting screen shown in FIG. 7A.

Figure 7A:
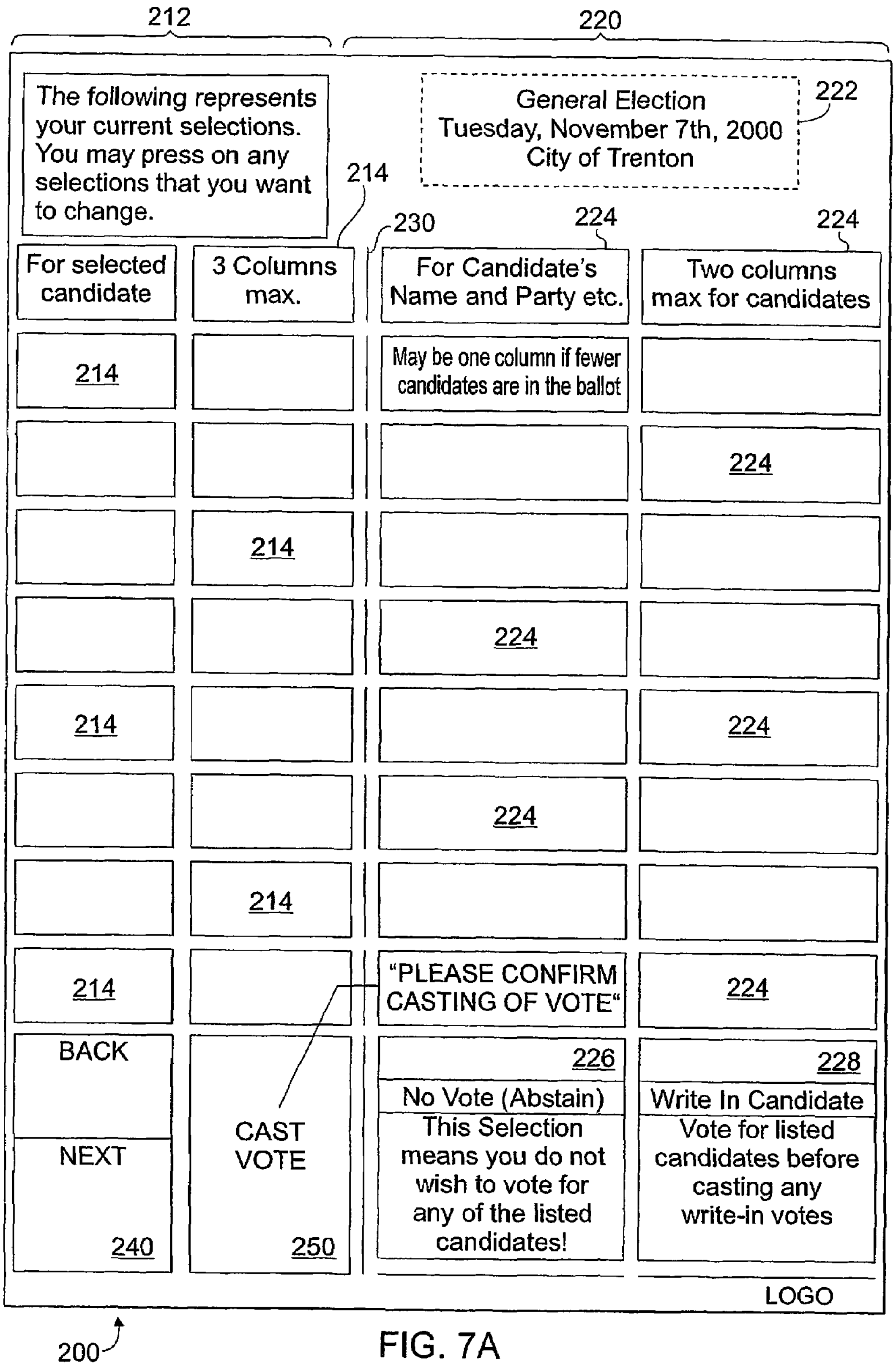
FIGS. 7A and 7B illustrate examples of screen displays as are provided to a voter in a voting session.

FIG. 7A illustrates an example screen display 200 as is provided to a voter in a voting session. Screen display 200 includes, e.g., two portions: a first portion 210 to the left and a second portion 220 to the right, which may be separated visually by a dividing line or other displayed indicia such as dashed line 230, and each of which preferably includes an informational region 212, 222 and a plurality of voting selection related regions as described below. A voting selection is made by touching the appropriate selection region, usually referred to a as a "button."

Screen portion 220 is for the casting of votes, i.e. selecting the candidates or positions on issues that are set before the voter. To that end, an information region 222, typically located near the top of portion 220, typically displays identifying information pertaining to the election and may also display instructional information for the voter. A plurality of selection regions or buttons 224 are provided, e.g., for selecting a candidate or responding to a question, either in one-column format or two-column format, depending upon the number of different choices that are to be displayed. For a typical two-column format as illustrated, each selection region 224 may be about 2.5 cm by 7.5 cm (about 1 inch by 3 inches). Preferably, two of the candidate regions 224 are reserved for special functions, in particular, a selection 226 for a "No Vote" or "Skip Contest" or abstention and a selection for a "Write-In Candidate" selection 228.

Each voter must make at least one selection for each contest or question offered by each screen display 200, whether that selection is by touching a candidate region 224, the write-in region 228 or the No Vote region 226, in order to progress to the next screen. Touching the "No Vote" button 226, or a "Skip Contest" or "Abstain" button, is the same in terms of operation of the voting system as selecting a candidate. If more than one selection is required, as where a number of candidates are to be selected for electing several positions, e.g., electing two or three members of a town council, county board or the like, the proper number of selections must be made. Making fewer than the required number of selections causes the screen to continue to be displayed and a prompt can be provided if excess time elapses. Attempting to make more than the number of selections required, i.e. the maximum number allowed, for any voting screen is not accepted by the voting system, and the next voting screen is displayed. As a result, the condition where the number of votes cast for any office or question differs from the number of voters voting (i.e. the number of voting sessions), also known as "under-voting" and "over-voting," is eliminated.

Touching the "Write-In Candidate" button 228 causes a screen display of buttons corresponding to the letters of the alphabet to be displayed, whether in Qwerty (typewriter) arrangement or some other desired arrangement. The voter may then type in by touching the appropriate letter buttons the name of the candidate to be voted for on a write-in basis. A confirmation button is provided for the voter to indicate completion of writing in a selection.

Screen portion 210 is for the displaying a cumulative record of the vote selections made by the voter during the voting session for the display screens voted prior to the presently displayed screen. Thus the voter is always presented with a visual indication of the voting selections made for offices and questions thus far voted. Screen portion 210 includes an informational region 212 wherein instructions and other information may be displayed. A plurality of regions or buttons 214 are provided, e.g., for displaying the candidate or choice made for each previous voting screen display 200 of a voting session. The display of buttons 214 may be either in one-column format or two-column format, depending upon the number of different choices that are to be displayed. For a typical two-column format as illustrated, each selection region 214 may be about 2.5 cm by 2.5 cm (about 1 inch by 1 inch). Preferably, each button 214 is an active button of the touch screen display that when touched returns the voter to the voting screen corresponding to the selection displayed on the touched button 214 so that the voter may reconsider and/or make the same or a different selection. The selection previously made may be highlighted or made to flash alerting the voter of the need to reconfirm that selection or to make another selection.

Also preferably, two of the regions 214 are reserved for special functions, in particular, a selection 240 for moving "Back" to a prior screen display 200 or forward to the "Next" screen display 200. If no selection has been made when either the Back or Next button 240 is touched, a "No Vote" may be registered for the voting screen and "NO Vote" is then displayed in one of buttons 214 of screen portion 210. Alternatively, nothing can be recorded regarding that voting screen and the screen is returned to later in the voting session without further action by the voter.

In addition, a "CAST VOTE" button 250 is provided for the voter to complete and/or terminate a voting session, and to cast the vote by storing a voting record in the voting apparatus memory and issuing a tangible receipt and/or coded smart card to the voter as described above. If a selection has been made for each possible selection, i.e. there are no un-voted candidates or questions, a reconfirm screen is preferably displayed requiring a second voter action to end the voting session. Thus, because two discrete and different actions are required of the voter in order to end the voting session, accidentally or unintentionally touching the "CAST VOTE" button 250 does not end the voting session prematurely and preclude the voter from making desired selections, i.e. casting the votes desired. Preferably, a pop-up screen is displayed upon the CAST VOTE button being touched prematurely requesting the voter to confirm an intention to prematurely terminate the voting session by selecting from terminating the voting session or returning to the voting screen sequence. If a selection has been made for less than all of the possible voting selections, a potential under-voting condition exists, then touching the CAST VOTE button 250 does not initiate termination of the voting session, but causes the then un-voted voting screens 200 to again be displayed for voter action until some selection, whether that be a candidate or a response to a question or an abstain/no vote/skip contest, is made.

Figure 7B:
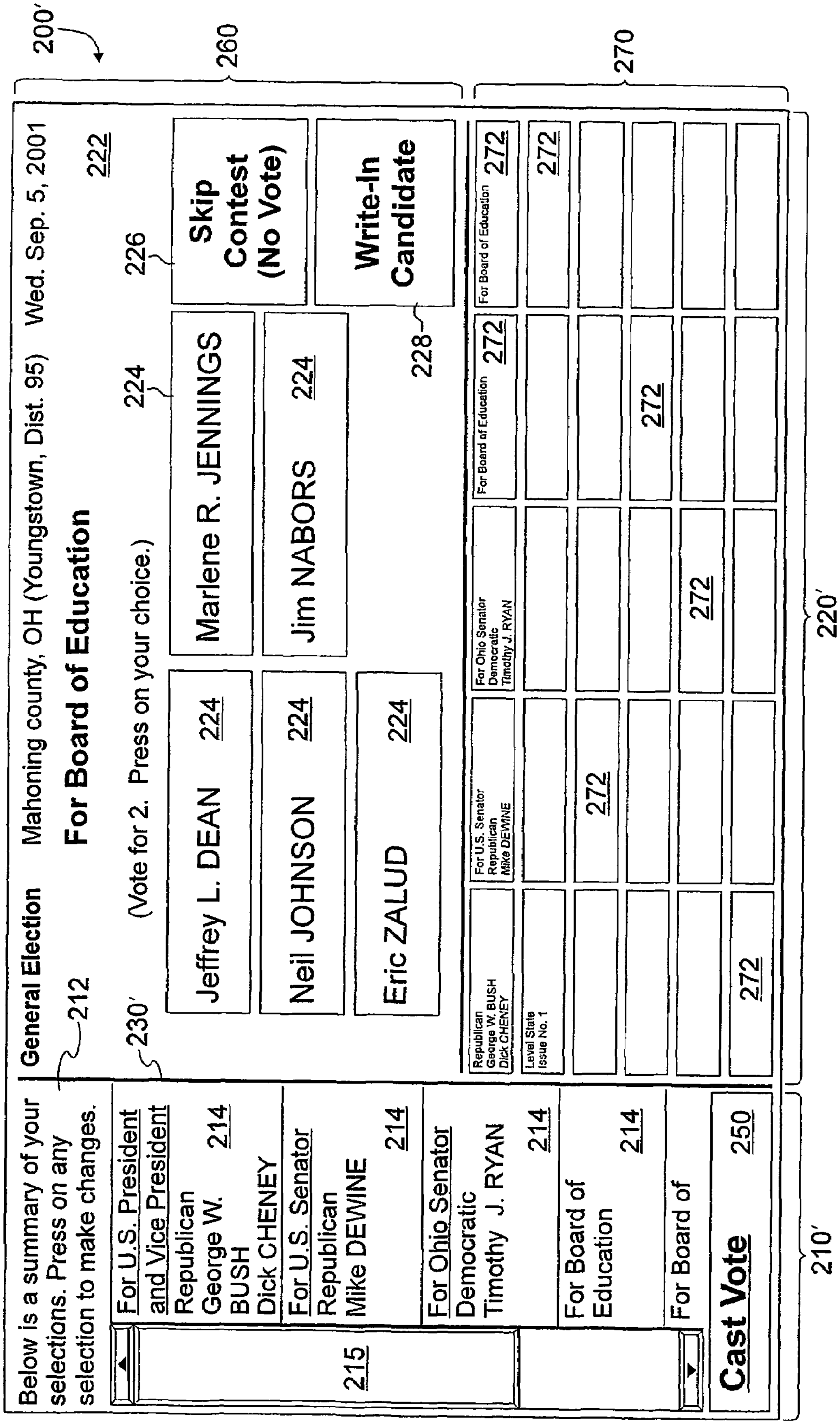

FIG. 7B illustrates an example screen display 200' as is provided to a voter in a voting session wherein all contests and questions of an election are presented on a single voting screen, also known as a "single page" or a "single face" ballot. Screen display 200' includes, e.g., four portions: a first portion 210 to the left and a second portion 220 to the right, which may be separated visually by a dividing line or other displayed indicia such as dashed line 230, and each of which preferably includes a plurality of voting selection related regions 214', 260, 270 as described below. A voting selection is made by touching the appropriate selection region, usually referred to a as a "button."

Screen portion 220' is for the casting of votes, i.e. selecting the candidates or positions on issues that are before the voter. Screen portion 220' includes an upper portion that is a pop-up window 260 in which are displayed election selections for a particular contest or question, and a lower portion which is a single-face ballot 270 wherein all of the contests and questions are displayed together. An information region 222, typically located near the top of portion 220', typically displays identifying information pertaining to the election and may also display instructional information for the voter. Single-face ballot 270 includes a plurality of defined regions 272 and each particular contest or question is displayed in a respective one of regions 272. Each contest region 272 is a button that, when touched, causes the particular candidates for the indicates contest to be displayed in pop-up window 260. The number of regions 272 displayed must equal or exceed the total number of contests and questions on the ballot in a given election, e.g., a predetermined number such as 30 or 50.

Each pop-up window 260 includes a plurality of selection regions or buttons 224, e.g., for selecting a candidate or for responding to a question. Preferably, two of the selection regions 224 are reserved for special functions, in particular, a selection 226 for a "No Vote" or "Skip Contest" or abstention, and a selection for a "Write-In Candidate" selection 228. Preferably, the contest regions 272 and selection buttons 224, 226, 228 are displayed in a manner that indicates whether they have been voted. To this end, the contest region 272 for which selections are displayed in pop-up window 260 may be displayed with a color and/or intensity different from the others of regions 272. Further, the contest regions 272 and selection buttons 224, 226, 228 for which voting selections have been made may be displayed with another different color and/or intensity and/or may display the candidate selection or question response voted. Typically, a large touch-screen display, e.g., a 20-22 inch (about 51-56 cm) diagonal measurement color display, is preferred.

At initiation of a voting session, a first or pre-selected contest or question on the ballot is enlarged, i.e. is displayed in a pop-up 260. The voter presses ones of buttons 272 to produce the pop-up window 260 corresponding thereto and vote that contest or question. Each voter must make at least one selection for each contest or question offered by each screen display 200' in each pop-up 260, whether that selection is by touching a candidate region 224, the write-in region 228 or the No Vote region 226, in order to progress to the next pop-up screen 260. Touching the "No Vote" button 226, or a "Skip Contest" or "Abstain" button, is the same in terms of operation of the voting system as selecting a candidate. If more than one selection is required, the proper number of selections must be made to complete or fully vote that contest.

Making fewer than the required number of selections causes pop-up screen 260 to continue to be displayed and a prompt can be provided if excess time elapses. Attempting to make more than the number of selections required for any voting screen is not accepted by the voting system, and the next pop-up voting screen 260 is displayed. As a result, "under-voting" and "over-voting" is eliminated. When the contest presented in pop-up screen 260 is fully voted, the pop-up screen 260 either diminishes in size or fades away or simply disappears and the vote case thereon is displayed in the appropriate region 214 of screen portion 210' and the pop-up screen 260 for the next contest to be voted is displayed. The voter may vote the contests in any order by touching the contest region 272 desired, however, each contest will be presented, typically in the order listed in buttons 272, and a response (vote or no vote or write in) required until voting is completed.

Touching the "Write-In Candidate" button 228 causes a screen display of buttons corresponding to the letters of the alphabet to be displayed, as above. The voter types in the name of the candidate to be voted for on a write-in basis, and touches a confirmation button to indicate completion of writing in a selection.

Screen portion 210' is for the displaying a cumulative record of the vote selections made by the voter during the voting session for the pop-up display screens 260 voted prior to the presently displayed pop-up screen 260. Thus the voter is always presented with a visual indication of the voting selections made for offices and questions thus far voted. Screen portion 210' includes an informational region 212 wherein instructions and other information may be displayed and a plurality of regions or buttons 214 for displaying the candidate or choice made for each previous contest voted. voting session. FIG. 7B illustrates an alternative display of buttons 214 wherein each button 214 may be made larger and the buttons 214 may be scrolled up or down using scrolling bar 215. Preferably, each button 214 is an active button of the touch screen display that when touched returns the voter to the voting screen corresponding to the selection displayed on the touched button 214 so that the voter may reconsider and/or make the same or a different selection. The selection previously made may be highlighted or made to flash alerting the voter of the need to reconfirm that selection or to make another selection.

The voting apparatus thus provides voting information to the touch screen voter interface for displaying one voting screen 200' thereon that includes all voting contests and questions. The one voting screen includes a plurality of voting buttons 272 for providing a pop-up voting screen 260 for each voting contest and question. The voting apparatus displays the one voting screen during and after a voting selection is made on the pop-up screen, and displays another un-voted pop-up voting screen 260 until all contests and questions are voted.

The security of the tangible receipt, e.g., the printed receipt and/or smart card issued to the voter at the end of the voting session to provide an independent tangible record of the voting session, is improved by being an "image" of the voting record stored in the voting machine memory devices. Because the stored voting record in the voting machine and the corresponding voting record on the tangible receipt are identical, they are sometimes referred to as an "image" or an "image ballot."

To the end of providing increased security against forgery of the tangible receipt, a value may be assigned before the election to each possible choice of each voting selection that can be made in any voting session, and these preassigned values are the same for all voting sessions in any given election. For each voting session, based upon the actual voting selections made by the voter, the preassigned values associated with those actual selections are processed at the end of the voting session to generate a voting session security code value that is directly correlated to the actual voting selections made in that particular voting session: The voting session security code value so generated is then made part of the voting record stored on the tangible receipt, either as a printed number or code or as some other unique printed indicia on a printed receipt or as a stored number in the case of a smart card or chip card receipt. Optionally, the voting session security code value may be included in the voting record stored in the voting machine, but need not be because the voting machine can regenerate such code value, if necessary.

As a result, forgery of a voting receipt is extremely difficult, if not practically impossible, because the information needed to correctly generate the voting session security code value correlating to a particular set of voting selections is unknown to the forger. In addition to the forger being unaware of the presence and of the particular form in which any particular voting session security code value is indicated on the tangible receipt, the forger does not have access to either the particular preassigned values associated with each possible voting selection or to the particular algorithm relating the actual voting selection preassigned values to the voting session security code value. It is noted that the voting session security code value may be indicated on a printed voting receipt in any one or more of different ways or by a combination thereof. For example, the voting session security code value can be presented as alphanumeric characters either separate from other alphanumeric printing or embedded therein, as a symbol or other indicia that varies in one or more of size, shape, color and/or position correlated to the voting session security code value in predetermined manner, as a subtle variation in size, placement, spacing, line spacing or font of alphanumeric characters, or as a subtle variation in the layout or format of the printed receipt, or any desired combination thereof. The manner in which the security code is indicated of the printed receipt may be varied or changed in predetermined manner, such as for given periods of time or for given numbers of voting sessions, e.g., changed after an hour or after 10 or 100 voting sessions. Thus forgery becomes evident because the indication of the security code value on a forged or altered receipt will not match the voting selections stated thereon.

In one alternative, it is preferable that the device that provides the tangible receipt automatically capture the receipt if it is not taken within a given time, e.g., 5-10 seconds and typically 8 seconds. Optionally, the device may shred or otherwise destroy such captured receipts for security. Optionally, a presence sensor may be included in the voting apparatus to detect the presence of a voter, and may be selectively activated by a voting official, if desired. Any suitable infrared (IR) or other proximity sensor may be employed. If the voter leaves without taking the printed or other tangible receipt, the presence sensor may cause the receipt to be captured by the voting apparatus and/or may require election official intervention to clear the voting apparatus for the next voting session, such as be entering a preassigned authorization code, and/or to take possession of the un-taken receipt.

In another alternative, it is preferable that the device that provides the tangible receipt do so in a manner that makes the receipt available for viewing by the voter for verifying the voting record information thereon prior to the voter terminating the voting session. The receipt is then captured in each case at the end of the voting session, as when the voter signals such end or opens the curtain of the voting machine or a given time has elapsed, and the collected receipts serve as an independent verification of the tabulated voting result, The arrangement of FIG. 4 also is useful for provisional voting, i.e. allowing a voter whose qualification to vote is in doubt or questioned or challenged to vote in a given election on a provisional basis, the provision being that the provisional voter's vote is counted if and only if, after investigation, the provisional voter is determined to be qualified to vote in that election. Circumstances under which provisional voting arises include, e.g., where a voter registers or moves residence too close in time to an election for the registration records at the polling place to reflect same, or an error or omission exists in the registration records at the polling place.

Where verifying registration 114 (in the alternative path 114-112 indicated by the dashed line) results in the voter's qualification being questioned, challenged or otherwise in doubt, the voter is deemed a provisional voter and is issued 112 a provisional voter smart card. The provisional voter smart card is the same as other voter smart cards except that voter information coded therein indicates that the voter is provisional and the voter's voting selections are not to be tabulated, but are to be kept separate from the normal voting record database. The provisional voter then votes 130 in the usual manner and the voting record is written 152 to the voter's provisional voter smart card, but is not stored 138 as a voting record (although it may optionally be stored 138 in a separate provisional voting record database). The coded provisional voter smart card is then secured for later counting similarly to that for conventional paper provisional ballots. Typically, the provisional voter smart card is sealed in an unmarked provisional ballot envelope (unmarked, except possibly as to election date and polling place) which is sealed in an outer provisional ballot envelope on which is entered the voter's information and any required declaration of the voter's right to vote, as required by the applicable law and regulations.

Election officials, typically after the election but before the vote is certified, investigate to determine whether the voter is or is not qualified to have voted in the election. If the voter is found to have been qualified, then the inner envelope containing the provisional voter smart card is provided for counting and tabulating 170 the voting selections stored on the provisional voter smart card. The provisional smart card may be read by a voting machine, which need not be the voting machine on which the provisional voting was voted, or a smart card reader for the purpose. If the provisional voter is found not to have been qualified, then the provisional ballot is handled and/or disposed of as required by applicable law and regulations. The provisional voter may be provided 140 with a tangible receipt, if desired.

In addition, security may be enhanced by printing the voting receipt on uniquely watermarked paper, paper with microprinted information, or other security-type paper, and this could be changed for each election, if desired.

A still further option is offered in the interest of precluding the use of the tangible receipt as a way for checking how any person has voted, e.g., as where one person has illegally "bought" the vote of a voter or has otherwise bribed the voter, and desires to use the receipt to verify that the vote "bought" had been cast. To this end, the tangible receipt may be limited to contain only the information provided in the header portion of the printed receipt and not information as to the particular voting selections made. For example, the receipt could contain only the polling location identifier, the randomly-generated voting session identifier, and the date and time of the election information, as illustrated on the example receipts PR-1 and PR-2 shown in FIG. 2A. Alternatively, the receipt can include the header information and an indication of "Voted" or "No Vote" or "Abstain" for each possible selection. The transparency with voter anonymity described above is maintained by allowing any voter to compare his voting tangible receipt to the official record of the election under controlled conditions, either by presenting the voting receipt at an election office under control of an election official or by inquiring via the Internet using the voting session identifier. In this arrangement, access to the official voting record is allowed for the holder of the printed receipt to the particular voting record corresponding to the voting session identifier printed on the receipt, whether by inspection by an election official or by data entry via the Internet, whereby persons holding a number of receipts are unlikely to be able to gain access to the voting records associated therewith without arousing suspicion. Where access is provided via the Internet, traceability can be provided by recording the Internet address of the computer from which the inquiry arises and blocking more than a given number of access attempts from that Internet address.

A further feature of particular interest to election officials is an abort provision for any voting session, apparently most often being necessary when a voter leaves the voting machine without completing the voting session, i.e. the so-called "fleeing voter" problem. An abort procedure allows an election official to take control of the voting machine during a voting session and to terminate that voting session in a particular manner with a record thereof being stored as a voting record in the voting record memory devices of the voting machine. Having thus cleared an aborted voting session, the voting machine is cleared to begin another voting session for another voter.

Returning to FIG. 6, a voter initiates a voting session 130 by entering 132 his voter identifier, also known as a "VID," whether by manual entry via an interface device such as a touch screen display or a keyboard, whether the keyboard is a physical keyboard or is a keyboard display on a touch screen display as is preferred, or by inserting a chip card or smart card voter identification into a card reader, as is also preferred. The VID having been entered 132, the voter's registration and eligibility to vote is validated 114, e.g., by access to a local data base of registered voters or of valid VIDs or the like, whether the data base is local, e.g., stored in the memory of the voting machine, or is remote and accessed via a communication network or other communication link. If the voter is eligible to vote, validation 114 enables the voting machine to continue the voting session and preferably updates the data base to reflect that the voter has voted in the present election. If validation 114 is negative, i.e. the voter is not eligible, the system returns to await the entry 132 of another VID.

When validation 114 finds the voter eligible, a random or pseudo-random unique voting session identifier is generated 133 and the making of vote selections (i.e. the casting of votes) 134 commences until the voter has made the selections he cares to make, in accordance with the applicable voting rules. The voting session identifier is generated, typically by a random-number generating computer program of known type, by the processor of the voting apparatus which maintains a record of the numbers so generated and used in a particular election. Each voting session identifier generated is verified against voting session identifiers previously issued in the particular election for uniqueness. If the identifier is not unique, i.e. it has been used previously in the particular election, another voting session identifier is randomly generated until a unique identifier is produced. If the voter does not confirm 136 the vote selections made, then a voting screen appears for selecting 135 the voting screen (i.e. the screen pertaining to an office, position or question) for which the voter desires to change his vote. Upon making the selection 135, the selected screen appears and the voter may re-vote that screen. Upon confirming 136 his voting selections, preferably at least twice, the record of selections made is stored 138 as a voting record in the memory devices of the voting machine. At this juncture, the process divides and follows two paths.

One path includes generating 137 a voting session security code value from the preassigned values associated with each one of the possible voting selections of each voting screen, including a "NO Vote" or "Abstain" selection. Generating 137 the voting session security code value may utilize any suitable algorithm. Even a simple algorithm of assigning the numbers one through N to the N possible voting selections and adding the preassigned numbers associated with the actual voting selections will provide a level of security against forgery if the number N is sufficiently large. When numbers of higher value than required are assigned to each possible voting selection, and not in the same order as the possible selections appear on the ballot, even a simple summing algorithm will generate 137 voting session security code values that are substantially greater than the number of possible voting selection combinations. While more complex algorithms may be utilized, such do not appear necessary. The generated 137 voting session security code value is provided along with the voting record for inclusion 140 in the tangible record and/or for inclusion 150 with the voting record stored in a smart card. Where the tangible medium is a smart card, for example, the security value is stored in the memory thereof. Where the tangible medium is a printed receipt, for example, the security value can be represented by a number or value printed thereon or an indicia and/or an omission from an indicia, e.g., an extra line or symbol or a gap or missing part of a line or symbol, printed on the receipt, and/or the position of any of the foregoing on the printed receipt, and/or a combination thereof.

The other path verifies 139 that the time for voting is still open. If so, another voting session may begin, and if not, the votes are tabulated 170 as described in relation to FIG. 4. The voting timer 139 is typically a timer resident within voting machine VM, either as a separate timing device or as a software-implemented timer in the processor thereof, that is set by the election officials to specify the exact period during which votes may be cast. The timing device may comprise a precision crystal oscillator or a radio-link-updated precision clock synchronized to an external source such as a broadcast governmental time standard, e.g., WWV or G.P.S. time signals. Selection is provided so that voting machine VM terminates voting at an exact time, e.g., 8:00 p.m. standard time, or at a relative time, e.g., 12.0 hours after voting was opened, so as to allow for imprecise or late starting of the voting period. Optionally, election officials may be permitted to extend the period for voting under restrictions consistent with applicable law, so as to accommodate the last minute arrival of a significant number of voters or voting delays caused by weather, power failure, or other voting problems. At the conclusion of voting, an election official may initiate compilation of the voting results, i.e., the complete set of voting records for the voting sessions conducted as well as a tabulation of the votes cast, onto a CD-ROM.

Figure 8:
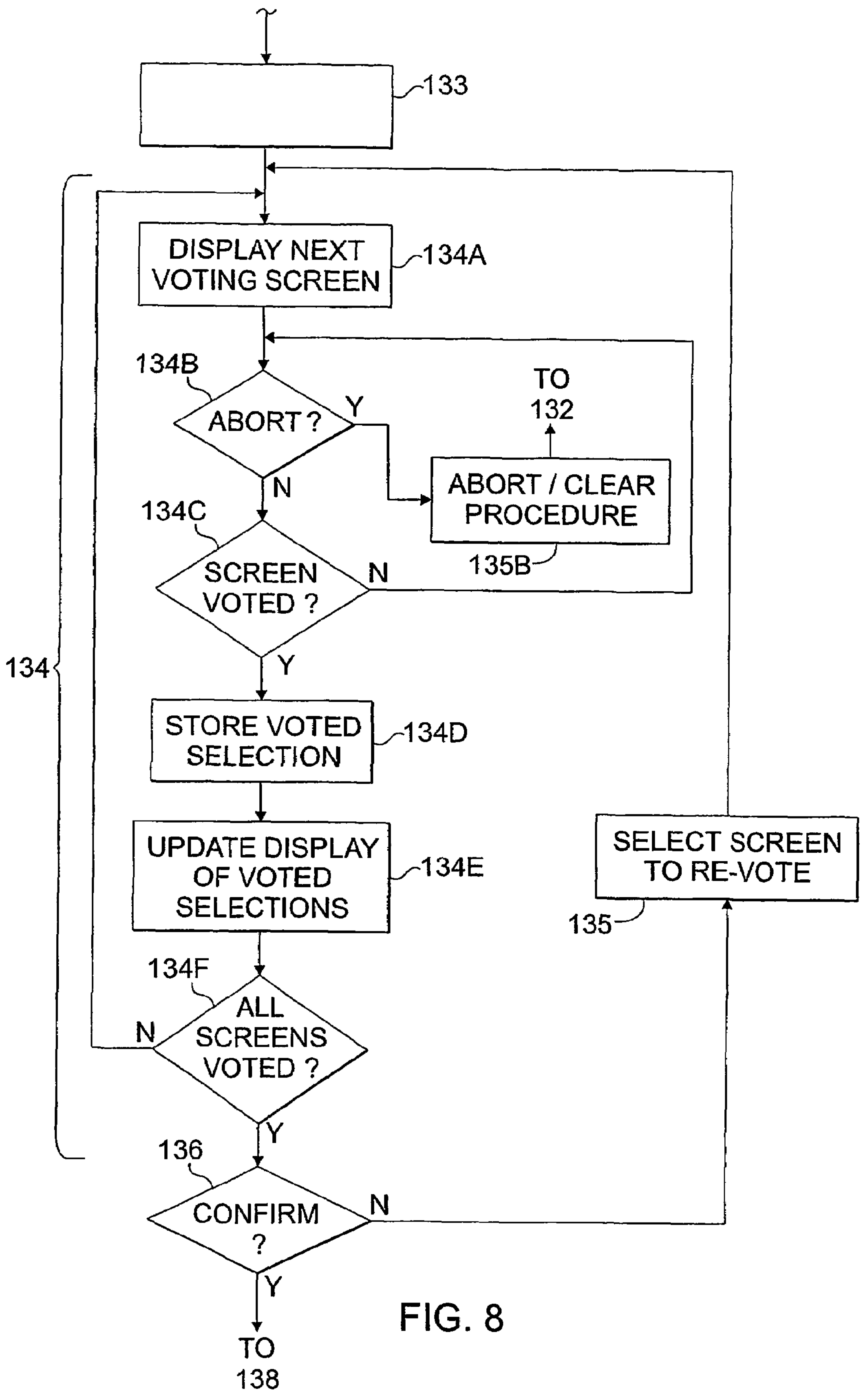
FIG. 8 is a schematic flow diagram illustrating details of the example voting session of FIG. 4 or 6.

FIG. 8 is a schematic flow diagram illustrating further details of the example voting session of FIG. 4 or 6, in particular, an example process of voting 134. After the unique random number voting session identifier is generated 133, the next voting screen is displayed 134A for response by the voter, beginning with the first voting screen which may be an introductory screen or an instructional screen, or may be a voting screen presenting voting selections for the voter to make. Assuming no abort condition 134B, the negative path "N" is followed to reach the screen voted 134C decision for a selection having been made, i.e. a vote having been cast, for the voting screen then displayed. The negative path "N" from decision 134C is a loop through the abort 134B and screen voted 134C decision blocks awaiting the voter making a selection with respect to the voting screen then displayed.

If no selection is made within a predetermined time, however, an abort condition obtains 134B and the abort decision 134B is affirmative to follow the "Y" path to abort/clear procedure 135B. Such condition may obtain, for example, in the case where a voter simply leaves without voting and a predetermined elapsed time (e.g., 30 seconds) has passed, or where the voting booth curtain or privacy screen is physically opened, or where an inappropriate sequence of buttons is touched. The, the abort/clear procedure causes the voting session to be suspended and freezes the voting selections thus far made, until an election official intervenes and follows the predetermined abort/clear procedure 135B to clear the voting machine in preparation for another voting session. Typically, the election official will press the CAST VOTE button, which is the only function operable once the abort/clear procedure is commences, to end the aborted voting session. Optionally, where the voter has not departed, he may be permitted to reenter his VID and to resume the voting session and finish voting. Preferably, the election official has a smart card that is inserted into the smart card reader of the voting apparatus so that full details of the aborted voting session including the time and date thereof, the selections made to the extent any selections have been made and the voting official's identification from the smart card, are stored as an aborted voting session record in the memory of the voting apparatus.

When the screen then displayed is voted, decision 134C is affirmative and is exited via the "Y" path causing the selection made to be stored 134D in the memory of the voting apparatus and the display of the voting selections made displayed in the portion 210 of screen 200 is updated 134E to add the latest voting selection to the cumulative voting selections already displayed. If a selection has been made for every screen for which a choice is presented, then the all-screens-voted decision 134F is affirmative and the "Y" path is followed for the voter to confirm 136 his voting selections and complete the voting session as described above. If a selection has not been made for every screen for which a choice is presented, then the all-screens-voted decision 134F is negative and the "N" path is followed for causing the next voting screen to be displayed 134A for the voter to continue making voting selections until the voting session is complete as described above.

When the voting session is completed and the voter has so confirmed, the voting record is completed and stored in the memory of the voting apparatus. With regard to a voting apparatus VM of the sort shown in FIG. 2, the record is stored in a plurality of different memory devices for redundancy and security of the stored voting records. Preferably at least three independent voting record storage memory devices are provided for providing triple redundancy. The first memory device is preferably a CD-ROM of the write-once, read many type, so as to be resistant to the altering of the data stored thereon or other tampering. The CD-ROM is removable after the election for reading the voting records stored thereon into a central computer or other processor for tabulating the election results or for being stored as a permanent record of the election. Another of such memory devices is preferably a non-volatile electronic memory such as a flash memory module. The flash memory module may be permanently a part of the voting apparatus or may be removable after the election, such as one in the format of a PCMCIA plug-in module. A third of such memory devices is a hard drive mounted internally to the voting apparatus, but which may also be mounted so as to be removable after the election. For providing resistance to tampering with the data stored thereon, the hard drive is configured or programmed so as to be write-once-only in the voting apparatus and to be many times readable.

One suitable data base software that is compatible with at least triple-redundant storage of voting records and the other features described herein is the SQL Server computer software commercially available from Microsoft Corporation of Redmond, Wash. Various databases of information that may be employed in an example voting apparatus and/or system according to the invention as follows.

A voter registration database, typically maintained on a separate computer at a governmental office, such as a state or county election department office, includes the names, addresses, residence information, political party affiliation, voter numbers, and other registration information pertaining to the registered voters in the appropriate jurisdiction, whether that be state, county, precinct, district of the like. From the registration database each voter is issued a voter identifier whether on a paper or plastic card or encoded in a smart card. An administrative data base may include the generation and maintaining of definitions and descriptions of political subdivisions, jurisdictions, political parties, voting districts, precincts and wards, and the like, and may also include information pertaining to control of logical and physical access to election records, voting apparatus and the like. A candidate and contest database typically includes the information pertaining to the candidates for offices, the offices, and public questions, constitutional questions, referenda and the like properly formatted for displaying voting screen ballots for each polling location within the political subdivision or jurisdiction. Such ballots may include general ballots and voting-criteria-specific ballots as described herein.

An election programming and voting database includes information pertaining to the activation or exclusion of any portion of the ballot to which entitlement to vote may vary by reason certain criteria, such as voter residence, or other administrative or geographic criteria, as well as to voting options such as party voting, slate voting, run-off voting and the number of choices to be made for each office and/or contest. In connection with the election programming and voting database, a random number voting session identifier is generated for each voter identifier (VID) entered to be associated with a voting session and printed on the tangible voting receipt to be issued, which voting session identifier is preferably not traceable to the VID after completion of the voting session. The voting portion of this data base also is utilized to verify exact correspondence between the voting selections made by the voter and the voting record stored in the voting machine memory devices and, upon detection of any error, to interrupt further use of the voting machine until the detected error is corrected.

A voting right identification database and ballot generating logic is stored in the memory of the voting machine, and includes the voter identifiers (VID) for the properly registered voters eligible to vote in a particular election, it being understood that the VID may remain the same for two or more elections or may change for each election, as desired. The VID entered by the voter at initiation of a voting session is checked against the voting right identification database and if found therein and not indicated as having voted previously in the present election, initiates the voting session. The VID includes information that is utilized by the ballot generating logic to produce for the voter the particular combination of general ballot voting screens and criteria-specific ballot voting screens for that particular voter in the particular election. The voting options relating to each office and/or question, for example, as described in relation to FIG. 9 below, is stored in the database and is utilized by the ballot generation logic in generating the ballots. Once a voting session is conducted using a particular VID, that VID is flagged as having been voted and any further attempt to vote using that VID is denied.

Another feature of voting apparatus VM is the inclusion of a public counter and display that displays the number of votes cast, i.e. voting sessions occurring, for a particular election. The number so displayed on the public counter cannot be changed except by another voting session being conducted. In addition, a protective counter accumulates every vote ever made, i.e. the total number of voting sessions conducted on the voting machine over its life, using the voting machine VM. The protective counter is incapable of being disabled or reset, and the count of the protective counter cannot be changed or reset.

Figure 9:
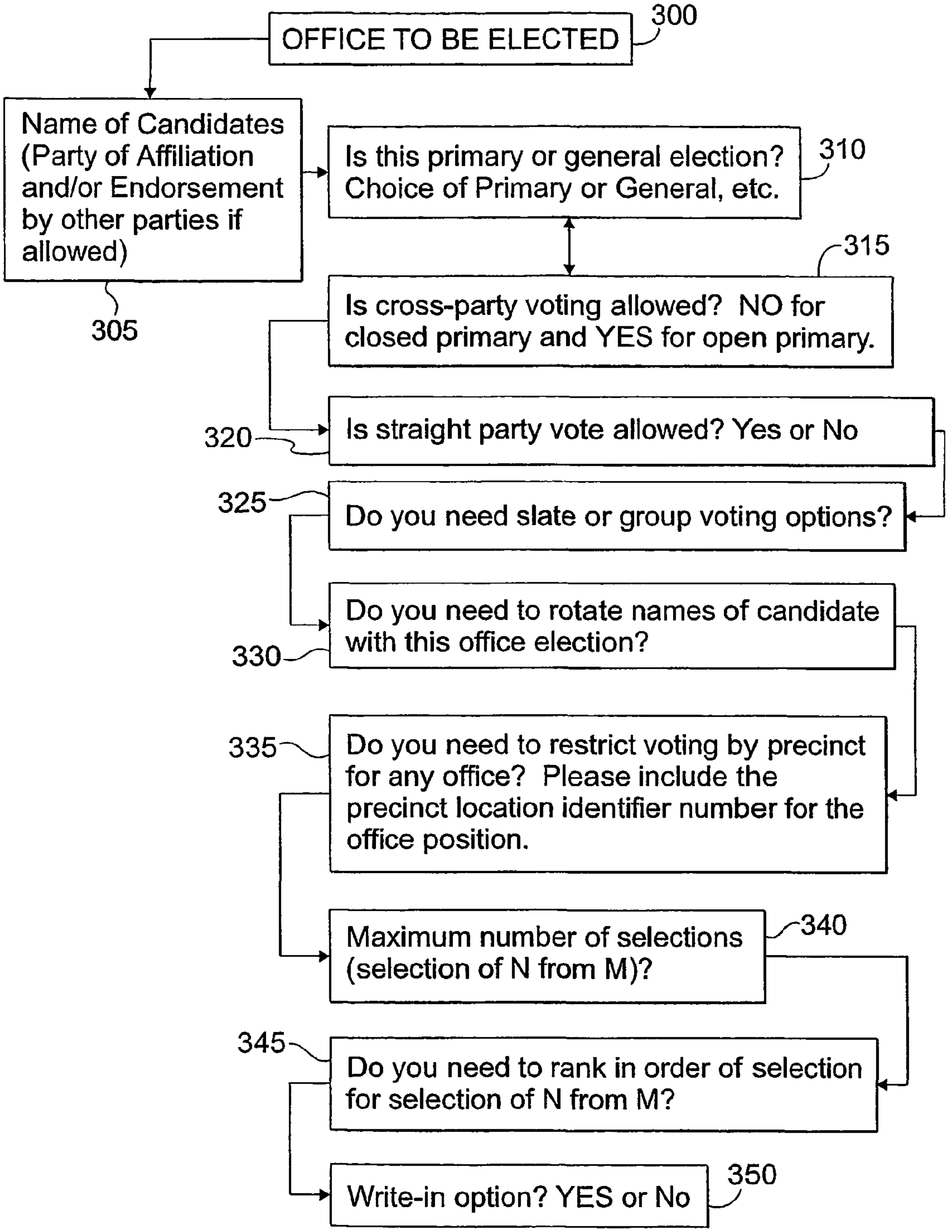
FIG. 9 is a schematic flow diagram illustrating an example process for generating a ballot.

FIG. 9 is a schematic flow diagram illustrating an example process for generating a ballot. A complete election ballot includes separate ballots for each position or office included in the election and for each question, constitutional amendment or other question to be presented to the voters in that election. In an electronic voting machine VM of the sort described herein, such as an electronic direct recording election (DRE) voting machine, each separate ballot typically is displayed for the voter as a voting screen on a touch-screen display, wherein the complete sequence of voting screens comprises the complete election ballot. The voting machine VM preferably should have a capacity for storing voting screens corresponding to at least 1000 different offices and/or issues to be voted on in an election, particularly where regional or remote voting as described below is permitted, and such voting screens may be provided in the form of data on a hard drive or a CD-ROM that is inserted into an appropriate receiver therein.

In generating the separate ballot for each position or office, for example, the office to be elected 300 is specified as are the names of the candidates 305 therefor (and possibly their party affiliation and other information), and whether the election is a general election, a special election or a primary election 310. For the election, the voting options to be allowed the voters are determined consistently with the applicable election law and the type of election. For example, these include whether cross party voting 315 is or is not allowed as is often the case for primary elections, whether straight party voting is permitted 320, and whether slate or other group voting is permitted 325 (and if so, the names of the parties, slates or groups involved). Other options, such as whether the names of the candidates are to be rotated 330 so that each voter is presented with voting screens with the candidates listed in a different order or not rotated so that every voter is presented the same voting screen with the candidates names listed in the same order, can be selected. Voting may also be restricted by precinct or voting district 335 for each office as is necessary where voters from different precincts or voting districts are to vote on the same voting machine and based upon their voter identifiers will be presented with different ballots, i.e. different sequences of different voting screens, as for regional or remote voting as described below. A selection is also made for specifying the maximum number of selections 340 that each voter can make, as where a number N candidates are to be elected from a group of M candidates to fill N positions, or where ranking 345 of the voter's selections is desired, as where preference voting and/or run-off voting is to be provided. Finally, provision is made for allowing a write-in selection 350 if such is to be allowed. Other information that may be entered as part of ballot generation includes the dates and times of the commencement and termination of the voting period, whether a local official may override the time specified, the passwords and identifiers for election officials to activate, clear, or otherwise control a voting machine and/or to perform a clear/abort procedure, a compilation and/or tabulation of the vote, and/or the transferring of voting records from an internal memory to an externally removable memory media such as a CD-ROM or a flash memory module.

FIG. 10 is a schematic diagram illustrating an example format for a voter identifier (VID) 380. VID 380 is a sequence of numbers or other alphanumeric characters that uniquely identify a voter and provide voting information relating to the voter that may be utilized by a voting machine VM or by election officials. VID 380 includes, for example, six different informational fields 381-386. Field 381 includes a number of characters, typically 3, that uniquely identify the voter's state of residence and field 382 includes a number of characters, typically 3, that uniquely identify the voter's county of residence. Fields 381-382 are indicated as "reserved" because they need not be used, but are necessary for regional and remote voting. While a three-digit field is typical, providing up to 999 different entries, two-digit fields may be utilized where a lesser number (i.e. 99 or less) of possible entries are needed, as in the United States where there are only 50 states.

Field 383 includes a number of characters, typically 4, that uniquely identify the voter's municipality of residence. Field 384 includes a number of characters, typically 2, that uniquely identify the voter's voting precinct or district within the county or municipality, and field 385 includes a number of characters, typically 2, that uniquely identify the voter's voting ward, if any, within the voting precinct or district. Field 386 includes a number of characters, typically 2, that uniquely identify the voter's political party affiliation if any has been declared and may be utilized for presenting the ballot of the declared political party for voting in a party primary election.

Field 387 includes a number of characters, typically 4-10, that uniquely identifies the particular voter in the applicable county, voting precinct, district and/or ward, as the case may be. While the VID information may be provided to the voter on a paper or other identification card, or may be entered by an election official at the polling place, it is preferred that such information be provided coded into the memory of a smart card as described above, and that voting machine VM include a smart card reader for reading the coded VID stored therein. Identification of the voter at the time for voting may utilize the VID information stored in the voter's smart card, or may be by traditional identification methods, such as signature verification, conventionally utilized by various jurisdictions.

The voter number, field 387, may be a randomly-generated unique identifier that is stored in voting machine VM prior to the election, and may or may not be traceable to the identity of a particular voter, as desired for security and privacy. The same unique identifier may be stored also in the voter's smart card and matched at the time of voting. Alternatively, the unique identifier stored in voting machine VM may be read into the voter's smart card and may either supplement or replace the voter number stored therein at issuance, whereby the pre-stored voter number may be used to verify registration and/or the unique identifier may be utilized to preserve voter anonymity and privacy. Preferably for voter privacy, only the unique identifier is stored in the voter smart card at the completion of a voting session. A database of unique identifiers valid only for a particular election may be pre-loaded into the voting machines prior to that election, and/or smart cards may be collected when voted, for security.

In the United States, voting is typically conducted on a state by state basis, and most states delegate to its counties the conduct of elections. In local voting, i.e. voting wherein a particular voting machine VM is dedicated for voting by voters of a particular county, municipality, precinct, district or ward, fields 382-385 are utilized by voting machine VM to verify that the voter is using the proper machine before a voting session is commenced for voting. Typically in local voting, voting machine VM is situated in a location in a particular precinct, district or ward and voters from that particular voting precinct, district or ward come to that location to vote. Thus, local voting is relative inflexible and most likely originated due to the limitations of printed paper ballots, and later punch card ballots and mechanical voting machines for which the ballot information was provided by printed paper strips.

Voting machine VM utilizes data from fields 381-387 to select the voting screens to be presented that together comprise a proper complete election ballot for that voter in a given election. Each voting machine VM generates on a voter-by-voter basis a complete election ballot by selectively combining a "general ballot" including the voting screens that are to be presented to all voters, a "residence-specific ballot" including those voting screens to be presented to voters according to their residence, and a "party-specific ballot" including voting screens to be presented to voters in a party primary election according to their party affiliation. Thus voting machine VM is not constrained or limited to local voting, but may be used in regional voting and/or remote voting.

In regional voting, each voting machine VM in a region contains the ballots for the offices and questions to be presented to voters in every subdivision of the region, and each voting machine VM is typically under the control of election officials of that region. A region for regional voting may be, for example, a county, state or nation. For county-wide regional voting, for example, each voting machine VM includes ballot voting screens for national, state, county, municipal and other offices and questions and generates the proper ballots for national, state and county contests to voters properly identified. Ballot voting screens for municipal, and other offices and questions, such as the election of precinct and ward representatives, are selectively presented to those voters whose voter VID corresponds to the municipality, precinct, district, ward and/or other voting criteria to which the voting screen ballot pertains. Thus any voter may vote at any voting machine VM located anywhere in the county and vote being presented with only the proper ballot voting screens corresponding to that voter's residence and circumstances.

Regional voting is a great advantage for county election officials who prepare one common ballot for all of the voting machines to be used, rather than having to prepare uniquely different ballots for each district, precinct and ward or other mutually exclusive jurisdiction. Similar common ballot generation may be done on a state-wide basis so that any in-state voter may vote anywhere in the state and be presented with a sequence of voting screens comprising the proper complete election ballot for that voters residence and circumstances. Moreover, the resulting ballot information may be distributed to county or local election officials simply and inexpensively using a write-once CD-ROM disc or other write-once, read many media for storing electronic files.

In remote voting, a voting machine VM located outside the borders or boundaries of a region contains the general ballots, residence-specific ballots and/or party-specific ballots for the offices and questions to be presented to voters in every subdivision of a region from which a voter might come. In that respect, remote voting is similar to regional voting except for the location of the voting machine VM and the fact that the voting machine is not under the direct supervision of state or county election officials. One application to which remote voting is particularly well suited is for military personnel voting in a national or state or local election from wherever they are stationed or posted. As in state-wide or county-wide regional voting, for example, each state or county prepares general, residence-specific, political party-specific, and/or other criteria-specific ballot voting screens for national, state, county, municipal and other offices and questions and provides the same on write-once, read-many CD-ROMS to federal election or military election officials who combine the national, state and local ballots onto a CD-ROM which is then distributed to military and other government facilities (e.g., military bases, large ships, embassies, consulates and the like) worldwide. Voting machines VM at each such facility then will include the national, state, county and local contests and will present the proper sequence of voting screens to each voter properly identified. Ballot voting screens for state, county, municipal, and other offices and questions, such as the election of precinct and ward representatives, are selectively presented to those voters whose voter VID corresponds to the state, county, municipality, precinct, district and/or ward to which the voting screen pertains.

Remote voting can accommodate travelers, workers abroad, and others desiring to vote by absentee ballot, as well as military and government personnel who are away from their place of residence when an election is conducted. Thus any voter may vote at any voting machine VM located anywhere in the world and be presented with only the proper ballot voting screens corresponding to that voter's residence and circumstances, i.e. as if he went to the local polling place in his home town.

A further feature of voting machine VM is an optional instant run-off capability that may be utilized where a run-off election is required and an instant run-off election is authorized by the applicable election law. A run-off election may be required where the law requires that a candidate or question receive at least a given percentage, e.g., 40% or 50%, of the votes cast to be elected or passed, respectively, or where a super-majority, e.g., 60% or 75%, of the votes cast is required for election or passage. When this option is activated, each voter is requested to vote for the number of candidates corresponding to the number of offices to be filled, e.g. one for a typical office or more than one where plural seats on a board are to be filled, as first choice for such office. In addition, each voter is requested to vote conditionally for a number of additional candidates in order of preference and the conditional votes are to be counted if and only if a run-off is conducted. In tabulating the vote at the conclusion of the election, the first-choice votes cast are counted and the winner, if any, of the contest is determined. If no winner results under the applicable election standards, whether by receiving a predetermined plurality or a majority of the votes cast, then an election official may initiate tabulation of run-off election in which the votes for candidates not meeting the requirements for continuing to the run-off election are disregarded and the run-off vote is tabulated from the votes for the candidates remaining.

The process for conducting such voting and run-off is as follows. A number N is determined corresponding to the maximum number of votes that may be cast by any voter regarding the particular office or position. Each first choice vote is associated with the number N, the next choice vote with the number N-1, and so forth with the last choice vote being associated with the number one. Where candidates are to be elected from a group of candidates running for a plurality P of offices or seats, numbers one through p may be associated with each voter's ranked P selections for those positions, or the number N may associated with each of each voter's P choices for those positions. In compiling and tabulating the vote, only the first choice votes, i.e. those votes associated with the number N, for each voting record are tabulated and the result compared to the applicable standard for election or passage. If a winner or legally acceptable result emerges, the tabulation is complete. If not, then votes for those candidates not meeting the legal requirements for continuing in the run-off election (e.g., those who received less than a given percentage of the votes cast or who were not among the designated number of candidates receiving the highest vote totals) are disregarded for each voting record and the next choice vote or votes for each voting record are then compiled and tabulated until a winner is elected.

By way of example, if three choices are allowed, each voter's first choice selection is assigned a value 3 (or a multiple of 3), each voter's second choice selection is assigned a value 2 (or a multiple of 2), and each voter's third choice selection is assigned a value 1. First, the votes (selections) assigned the value 3 (or the multiple of 3) are tabulated and a winner or winners are determined. If there is no winner or if there are less than the required number of winners, then the candidates to be eliminated are determined. For those voters whose voting records include selections with the number 3 associated with the eliminated candidate, that selection is disregarded and the selection associated with the number 2 vote is next considered and tabulated in the run-off tabulation, if it is not for another eliminated candidate. If the number 2 selection is also eliminated, ten that voter's selection associated with the number 1 is tabulated in the run-off tabulation. In other words, those candidates that do not make the cut for the run-off are dropped from consideration and the balance of the voters' choices are moved up to be counted in a process that may be repeated until one candidate wins the election. In this manner, only one election need be conducted for conducting both an election and a run-off election.

While the present invention has been described in terms of the foregoing example embodiments, variations within the scope and spirit of the present invention as defined by the s following will be apparent to those skilled in the art. For example, the articles issued to individual voter's are referred to as cards, but need not be a card per se, but may be tags, sheets or articles of other suitable form providing a suitable voting record storage memory. Further, while the voting record is said to include the voter's identifying number and the voter's voting selections, the voting record may be related entries of the identifying number (voting session identifier) and the voting selections in a memory, such as in a computer relational data base.

Generators of the security value, the voting screens, the ballots, and the sequence of voting screen displays, are preferably operatively associated with the processor, such as being computer programs performed by the processor and operating on data stored in and retrieved from a memory device, such as a CD-ROM, a hard drive, a flash memory or other device, but may be separate and independent of the processor, such as being embodied in plug-in modules or other devices.

The voting screens and ballots described are examples, and various other forms and formats as desired by election officials and/or law and/or regulation may be employed. For example, the scrollable voting display 210' of FIG. 7B may be used in the voting screens 200 of FIG. 7A and the fixed display 210 thereof may be employed with the pop-up voting screens 260 of FIG. 7B. Likewise, features described and/or illustrated in relation to one embodiment may be employed in other embodiment, whether or not described herein.

It is noted that while the specific number, i.e. voting session identifier, associated with each particular voting record may sometimes be referred to as a "serial number," it is preferred that such numbers not be sequential or in any order that would allow relation of the voting record to a particular individual voter. Thus, a set of randomly-generated unique numbers or pseudo-randomly-generated unique numbers may be utilized and is preferred. A series or sequence of unique numbers (i.e. true serial numbers) could be utilized if the resulting loss of protection of voter privacy is acceptable, or if privacy is sufficiently provided for by security/secrecy of the numbers assigned. In addition, while "numbers" are referred to, such numbers need not be numerical, but may be any combination of alphanumeric or other characters or symbols. Similarly, voter identifying numbers, security codes and the like may also be numeric, alphanumeric or symbolic, as is desired.

The apparatus, system and method of the invention provides a degree of security, privacy and transparency that is at least desirable, if not preferable or necessary for official governmental elections. The invention may also be utilized for private voting, labor representation and union elections and any other polling even though such unofficial or non-governmental polling does not require such security, privacy and/or transparency.

What is claimed is:

1. Voting apparatus comprising:

a processor for processing voting information and presenting a ballot to be voted for each of plural voting sessions;

a voter interface for displaying the ballot to be voted received from said processor and for receiving voting selections made and coupling the voting selections to said processor, said processor providing for each voting session a voting record including the voting selections made;

said processor including a generator for displaying on said user interface one voting screen including all voting contests and/or questions of the ballot to be voted, the one voting screen having voting buttons corresponding to each voting contest and/or question for providing pop-up voting screens including voting selections to be made in that voting contest and/or question; and a memory coupled to said processor for storing the voting record for each of the plural voting sessions.

2. The voting apparatus of claim 1 further comprising a printer coupled to said processor for printing in a respective printed paper the voting record for each of the plural voting sessions.

3. The voting apparatus of claim 2 wherein the printed paper includes a security code value represented by one or more of: a number or value printed thereon; an indicia and/or an omission from an indicia; an extra line or symbol; a gap or missing part of an indicia, line or symbol; the position of any of the foregoing on the printed receipt; and/or any combination thereof.

4. The voting apparatus of claim 1 further comprising a generator of a voting session identifier for each voting session, wherein the voting session identifier for each voting session is unique.

5. The voting apparatus of claim 1 further comprising a generator of a voting session identifier for each voting session, which voting session identifier is unrelated to the personal identity of a particular voter conducting that voting session and is unique for each voting session.

6. The voting apparatus of claim 1 wherein the voting information for each contest of a voting session includes possible voting selections for at least one candidate and/or at least one question, and further includes possible voting selections for a "no vote", a "skip contest" and/or an "abstain" selection, wherein said processor requires selection of at least one of the possible voting selections before proceeding from a present contest to a next contest and/or to ending a voting session.

7. The voting apparatus of claim 1 including a database of a plurality of ballots to be voted, ones of the plurality of ballots to be voted corresponding to respective ones of a plurality of voting jurisdictions;

means for entering a voter identifier including a representation corresponding to one or more of the plurality of voting jurisdictions, wherein said processor is responsive to the representation corresponding to one or more of the plurality of voting jurisdictions for selecting from the database a ballot or ballots to be voted for the one or more of the plurality of voting jurisdictions corresponding thereto.

8. The voting apparatus of claim 1 in combination with a chip card providing registration information for a voter, said voting apparatus further comprising:

a chip-card reader for coupling the registration information from the chip card to said processor, wherein said processor is responsive to the registration information for initiating a voting session.

9. The voting apparatus of claim 1 in combination with a chip card providing jurisdiction information, said voting apparatus further comprising:

a chip-card reader for coupling the jurisdiction information from the chip card to said processor, wherein the jurisdiction information represents one or more voting jurisdictions, and wherein said processor is responsive to the representation of one or more voting jurisdictions for selecting a ballot or ballots to be voted corresponding to the one or more voting jurisdictions.

10. Voting apparatus comprising:

a processor for processing voting information and presenting a ballot to be voted for each of plural voting sessions;

a voter interface for displaying the ballot to be voted received from said processor and for receiving voting selections made and coupling the voting selections to said processor, said processor providing for each voting session a voting record including the voting selections made;

said processor including a generator for displaying on said user interface one voting screen including all voting contests and/or questions of the ballot to be voted, the one voting screen having voting buttons corresponding to each voting contest and/or question for providing pop-up voting screens including voting selections to be made in that voting contest and/or question; and a memory coupled to said processor for storing the voting record for each of the plural voting sessions, wherein each possible voting selection has an associated pre-assigned value that is the same for that voting selection for all voting sessions, and wherein said processor generates a security code value for each voting session that correlates to the voting selections made therein and the pre-assigned value of the voting selections made therein.

11. Voting apparatus comprising:

a processor for processing voting information for each of plural voting sessions, wherein the voting information includes a database of a plurality of ballots, wherein ones of the plurality of ballots correspond to respective ones of a plurality of voting jurisdictions;

means for entering a voter identifier, the voter identifier for each voting session including a representation of one or more of the voting jurisdictions for that voting session, wherein said processor is responsive to the representation of the one or more voting jurisdictions for generating from the database a ballot or ballots for the one or more voting jurisdictions for each voting session;

a voter interface for displaying the ballot or ballots generated by said processor for each voting session and for receiving voting selections for each voting session and coupling the voting selections to said processor, said processor providing a voting record including the voting selections for each voting session; and a memory coupled to said processor for storing the voting record for each voting session.

12. The voting apparatus of claim 11 in combination with a chip card providing registration information for a voter, said voting apparatus further comprising:

a chip-card reader for coupling the registration information from the chip card to said processor, wherein said processor is responsive to the registration information for initiating a voting session.

13. The voting apparatus of claim 11 in combination with a chip card providing the voter identifier including a representation of one or more of the voting jurisdictions, wherein said means for entering comprises:

a chip-card reader for coupling the representation of one or more voting jurisdictions from the chip card to said processor.

14. The voting apparatus of claim 11 wherein said means for entering comprises a touch screen or a keyboard tat is included in said voter interface.

15. The voting apparatus of claim 11 wherein the plurality of jurisdictions include:

a national jurisdiction and state jurisdictions thereunder; or a state jurisdiction and county jurisdictions thereunder; or a county jurisdiction and local jurisdictions thereunder, or a local jurisdiction and precincts thereunder; or a first jurisdiction and at least one jurisdiction thereunder; or a jurisdiction and subdivisions thereof; or a regional jurisdiction and every subdivision thereof; or any combination of the foregoing.

16. Voting apparatus comprising:

a processor for processing voting information for each of plural voting sessions;

a voter interface for displaying voting information including possible voting selections received from said processor and for receiving voting selections made for each voting session and coupling the voting selections to said processor;

said processor providing for each voting session a voting record including the voting selections made;

wherein each possible voting selection has an associated pre-assigned value that is the same for that voting selection for all voting sessions, and wherein said processor generates a security code value for each voting session that correlates to the voting selections made therein and the pro-assigned value of the voting selections made therein;

a non-volatile memory coupled to said processor for storing for each voting session the voting record for that voting session; and a printer coupled to said processor for printing for each voting session a machine readable paper that contains the voting selections made and an indication of the security code value for that voting session.

17. The voting apparatus of claim 16 wherein said processor stores the security code value in said non-volatile memory in the voting record for each voting session.

18. The voting apparatus of claim 16 wherein the security code value is presented on the printed machine readable paper as alphanumeric characters, as alphanumeric characters separate from other alphanumeric printing, as alphanumeric characters embedded in other printing, as a number or value, as a symbol, as an indicia, as an omission from an indicia, as an extra line or symbol, as a gap or missing part of a line or symbol, as an indicia that varies in size, shape, color and/or position, as an indicia that varies in size, shape, color and/or position correlated to the security code value in predetermined maimer, as a variation in size, placement, spacing, line spacing or font of alphanumeric characters or symbols, as a variation in the layout of the printed receipt, as a variation in the format of the printed receipt, or any combination of the foregoing.

19. The voting apparatus of claim 16 wherein said processor generates the security code value for each voting session by summing the pre-assigned value assigned to the voting selections made therein.

20. The voting apparatus of claim 16 wherein the numbers pre-assigned to the possible voting selections are each of higher value than the number of possible voting selections, or are not in the same order as the possible selections appear on the ballot, or are each of higher value than the number of possible voting selections and are not in the same order as the possible selections appear on the ballot.

21. Voting apparatus comprising:

a processor for processing voting information and providing a voting session identifier for each of plural voting sessions, wherein each voting session identifier includes a representation of the voting jurisdiction and a randomized unique identifier;

a voter interface for displaying voting information received from said processor and for receiving voting selections made for each voting session and coupling the voting selections to said processor, said processor providing for each voting session a voting record including the voting selections made;

a non-volatile memory coupled to said processor for storing for each voting session the voting record and the voting session identifier for that voting session; and a printer coupled to said processor for printing for each voting session a machine readable paper that contains the voting selections made and the voting session identifier for that voting session.

22. The voting apparatus of claim 21 wherein the voting record and the voting session identifier for each voting session is stored in said non-volatile memory and is printed on the machine-readable paper substantially at the conclusion of each voting session.

23. The voting apparatus of claim 21 wherein the machine-readable paper is presented for viewing substantially at the conclusion of each voting session before being collected in a collection container.

24. A method for voting comprising:

initiating a voting session;

displaying a sequence of voting screens each including voting selections to be made;

not displaying a next voting screen in the sequence of voting screens until after at least one voting selection is made on a presently displayed voting screen;

providing a unique identifier of the voting session;

generating a security code value correlating the voting selections made in the voting session;

creating a voting record including the voting selections made during the voting session, the unique voting session identifier and the security code value; and storing the voting record including the voting selections made during the voting session, the unique voting session identifier and the security code value in a voting apparatus memory.

25. The method of claim 24 wherein each possible voting selection has an associated pre-assigned value that is the same for that voting selection all voting sessions, wherein said generating a security code value for each voting session correlates the voting selections made therein and the pre-assigned value of the voting selections made therein.

26. The method of claim 24 wherein at least one of the voting screens includes at least a first portion displaying voting selections to be made and a second portion displaying a record of voting selections previously made.

27. The method of claim 24 wherein said displaying a sequence of voting screens includes displaying one voting screen including all voting contests and/or questions thereon and having a plurality of voting buttons for providing for each voting contest and/or question a pop-up voting screen including voting selections to be made.

28. A method for voting comprising:

providing a voter identifier, the voter identifier including a representation of one of a first and second voting criteria;

initiating a voting session utilizing the voter identifier;

providing a single voting screen of all contests including at least a general voting ballot contest and first and second voting criteria-specific voting ballot contests presenting first and voting selections pertaining to the first and second voting criteria, respectively;

displaying a single voting screen of all contests including the general voting ballot contest and the one of the first and second voting criteria-specific voting ballot contests corresponding to the one of the first and second voting criteria representations of the voter identifier;

creating a voting record including voting selections made during the voting session; and storing the voting record including the voting selections made in a voting apparatus memory.

29. The method of claim 28 wherein the single voting screen includes at least a first portion displaying voting selections to be made and a second portion displaying a record of voting selections previously made.

30. The method of claim 28 wherein said displaying a single voting screen having a plurality of voting buttons for providing for each voting contest and/or question a pop-up voting screen including voting selections to be made.

31. A voting machine comprising:

a processor for processing voting information for each of plural voting sessions;

a voter interface for displaying voting information received from said processor and for receiving voting selections made for each voting session and coupling the voting selections to said processor, said processor providing for each voting session a voting record including the voting selections made;

a non-volatile memory coupled to said processor for storing for each voting session the voting record of voting selections made for that voting session;

a printer coupled to said processor for printing for each voting session a machine readable paper that contains the voting selections made for that voting session; and a collection container for receiving the machine-readable paper at the conclusion of each voting session, wherein the machine-readable paper is presented for viewing substantially at the conclusion of each voting session before being collected in the collection container.

* * * * *